United States Patent [19]

Bachman et al.

[11] 4,024,508

[45] May 17, 1977

[54] DATABASE INSTRUCTION FIND SERIAL

[75] Inventors: Charles W. Bachman, Lexington; Benjamin S. Franklin, Cambridge, both of Mass.

[73] Assignee: Honeywell Information Systems, Inc., Waltham, Mass.

[22] Filed: June 19, 1975

[21] Appl. No.: 588,435

[52] U.S. Cl. .............................. 340/172.5; 444/1
[51] Int. Cl.$^2$ ............... G06F 9/20; G06F 9/16; G06F 13/00
[58] Field of Search ............... 444/1; 340/172.5; 445/1

[56] References Cited

UNITED STATES PATENTS

| | | | |
|---|---|---|---|
| 3,588,839 | 6/1971 | Belady et al. | 340/172.5 |
| 3,593,315 | 7/1971 | Patel | 340/172.5 |
| 3,601,809 | 8/1971 | Gray et al. | 340/172.5 |
| 3,614,746 | 10/1971 | Klinkhamer | 340/172.5 |
| 3,656,123 | 4/1972 | Carnevale et al. | 340/172.5 |
| 3,693,165 | 9/1972 | Reiley et al. | 340/172.5 |
| 3,787,813 | 1/1974 | Cole et al. | 340/172.5 |
| 3,821,708 | 6/1974 | Sokoloff | 340/172.5 |
| 3,878,513 | 4/1975 | Werner | 340/172.5 |
| 3,889,243 | 6/1975 | Drimak | 340/172.5 |
| 3,891,974 | 6/1975 | Coulter et al. | 340/172.5 |
| 3,900,834 | 8/1975 | Casey et al. | 340/172.5 |
| 3,909,798 | 9/1975 | Wallach et al. | 340/172.5 |
| 3,916,385 | 10/1975 | Parmar et al. | 340/172.5 |
| 3,916,387 | 10/1975 | Woodrum | 340/172.5 |
| 3,938,096 | 2/1976 | Brown et al. | 340/172.5 |
| 3,950,730 | 4/1976 | Bienvenu et al. | 340/172.5 |

*Primary Examiner*—Gareth D. Shaw
*Assistant Examiner*—Jan E. Rhoads
*Attorney, Agent, or Firm*—Nicholas Prasinos; Ronald T. Reiling

[57] ABSTRACT

One of a series of hardware/firmware primitives is disclosed for converting a general purpose digital computer into a database machine. The invention comprises a hardware/firmware implemented machine instruction which sequentially checks each database record in a database area beginning at the page/line number address (database address) contained in a register, until the next active record is located. The database address of that active record is then loaded into a register.

9 Claims, 78 Drawing Figures

FIG. 2

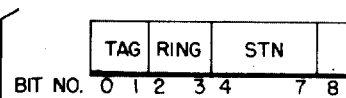

GENERAL REGISTER

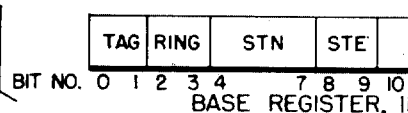

OR

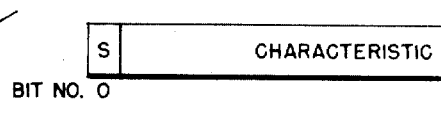

BASE REGISTER, INSTRUCTION COUNTER, AND STACK REGISTER

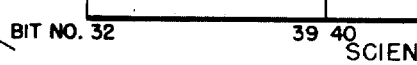

SCIENTIFIC REGISTER (DOUBLEWORD)

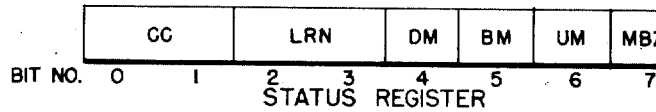

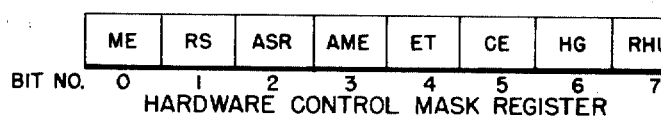

FIG. 3

LEGEND FOR RESERVED AREAS OF STORAGE IN REGISTERS

| | | | |
|---|---|---|---|
| AME = ACCOUNTING MECHANISM | HG = HARDWARE GATE | S = SIGN |
| ASR = AUTO STORAGE RECONFIGURATION | LRN = LAST RING NUMBER | STE = SEGMENT TABLE ENTRY |
| | MBZ = MUST BE ZERO | |
| BM = BINARY MASK | ME = MACHINE ERROR | STN = SEGMENT TABLE NUMBER |
| CC = CONDITION CODE | RING = RING NUMBER | TAG = DESCRIPTOR TYPE |
| CE = CORRECTED ERROR | RHU = RESERVED FOR HARDWARE USE | |
| DM = DECIMAL MASK | | UM = UNDERFLOW MASK |
| ET = ENVIRONMENT TOLERANCE | RS = RETRY SUCCESSFUL | |

| MEMORY LOCATION | | | | | NAME: | |
|---|---|---|---|---|---|---|
| -40 | CURRENT STATE ENTRY TIME ||||  CET | ⎫ |
| -32 | READY TIME ACCOUNTING |||| RTA | ⎬ OPTIONAL |
| -24 | WAITING TIME ACCOUNTING |||| WTA | |
| -16 | RUNNING TIME ACCOUNT |||| RUA | ⎭ |
| -8 | RESIDUAL TIME OUT |||| RTO | |
| PCB ADDRESS → 0 | CAPABILITY | PRIORITY | STATE | DEXT | PMW #0 | |
| 4 | STATUS | MBZ | MP | MBZ | PMW #1 | |
| 8 | |||| PMW #2 | |
| 12 | DETSZ | DETA ||| PMW #3 | |
| 16 | STWSZ | STWA ||| ASW #0 | |
| 20 | STWSZ | STWA ||| ASW #1 | |
| 24 | |||| EXW | |
| 28 | T CONTENTS |||| SKW | |
| 32 | IC CONTENTS |||| ICW | |
| 36 | MBZ |||| | |
| 40 | |||| SBW #0 | |
| 44 | |||| SBW #1 | |
| 48 | |||| SBW #2 | |
| 52 | BASE REGISTERS SAVING AREA (8 WORDS) |||| | |
| 80 | |||| | |
| 84 | GENERAL REGISTERS SAVING AREA (16 WORDS) |||| | 400 |
| 144 | |||| | |
| 148 | SCIENTIFIC REGISTERS SAVING AREA (8 WORDS) |||| | ⎫ |
| 176 | |||| | ⎬ OPTIONAL ⎭ |

FIG. 4

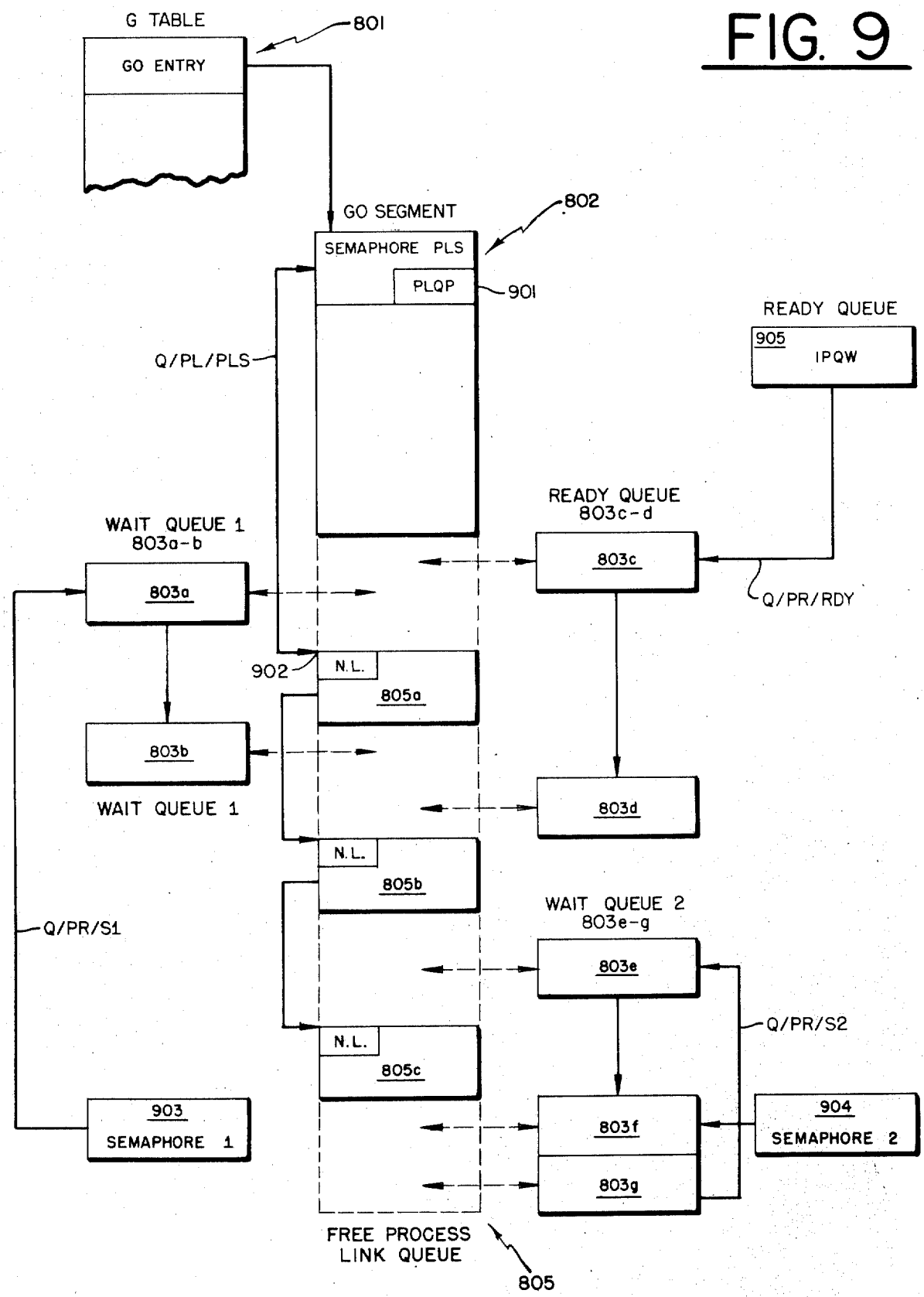

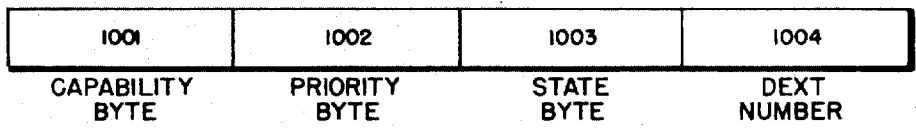
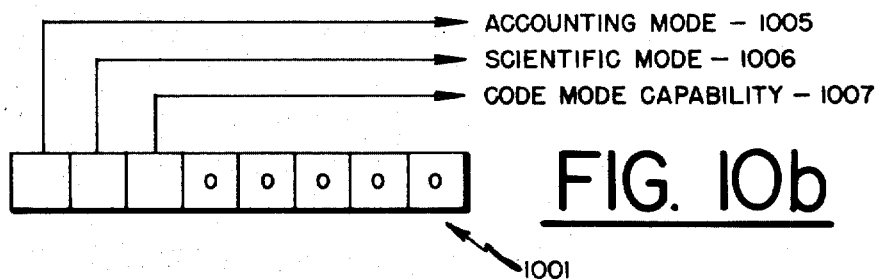
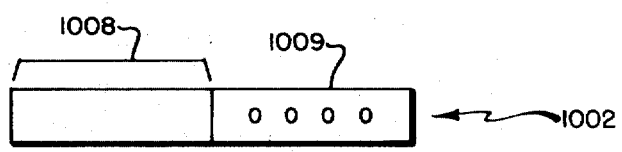
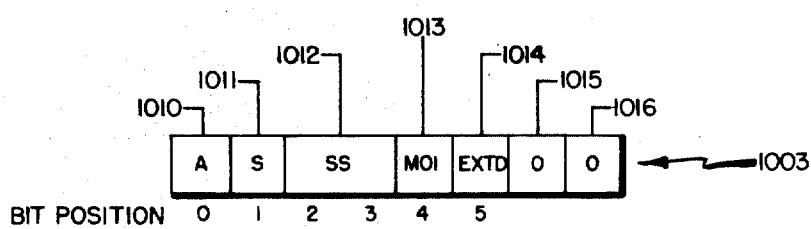
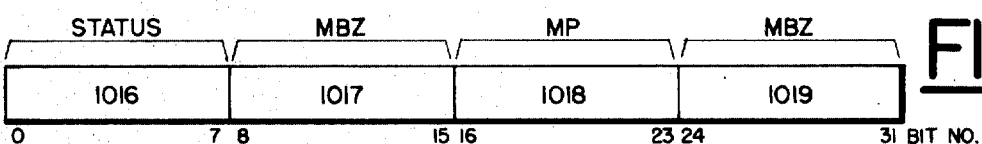
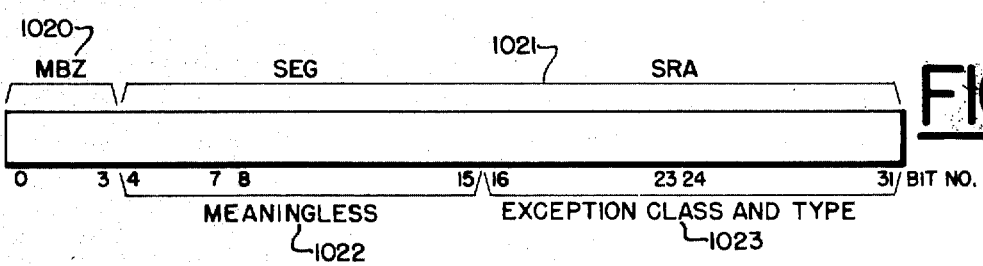

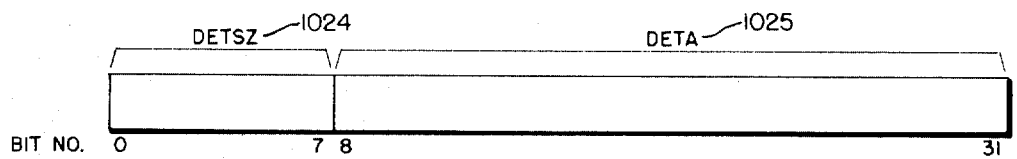
FIG. 10g
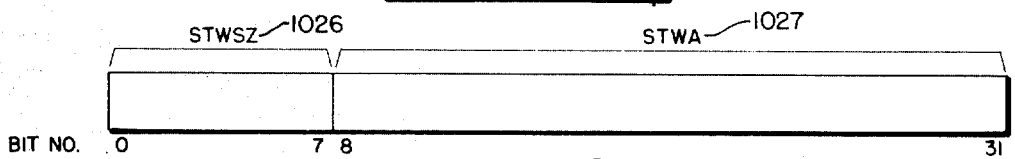
FIG. 10h
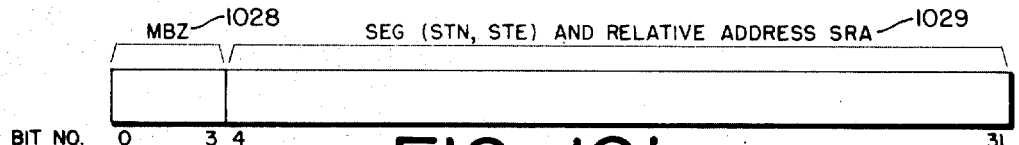
FIG. 10i
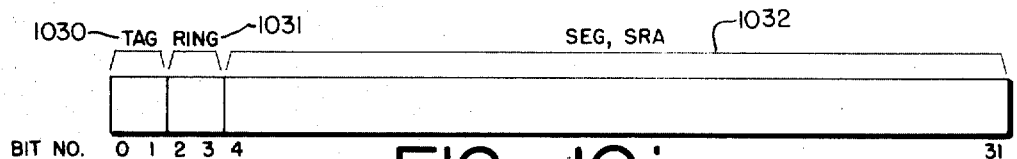
FIG. 10j
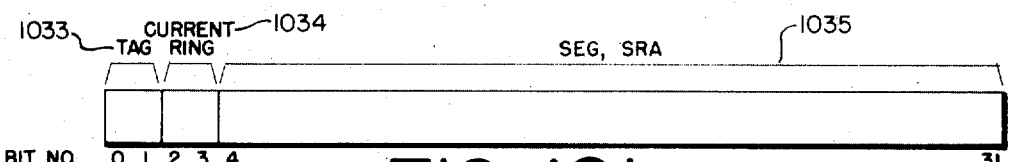
FIG. 10k
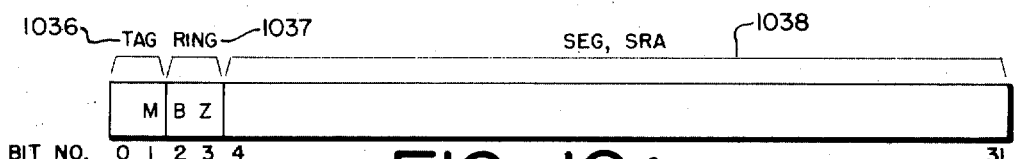
FIG. 10ℓ

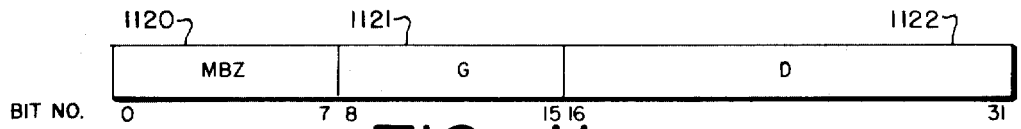
FIG. 11g
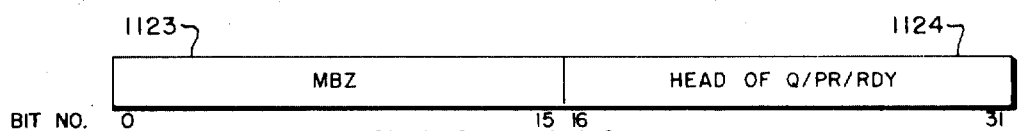
FIG. 11h
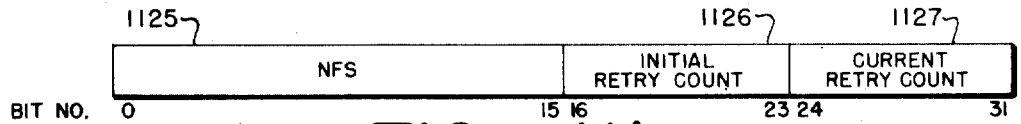
FIG. 11i
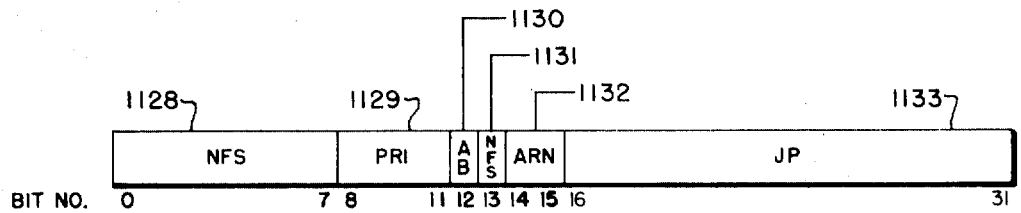
FIG. 11j
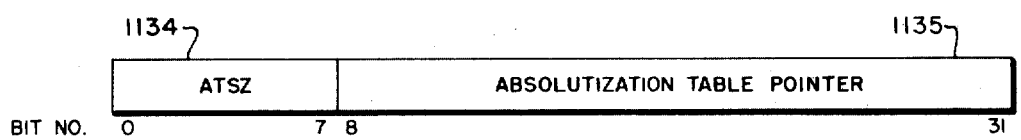
FIG. 11k
FIG. 11ℓ

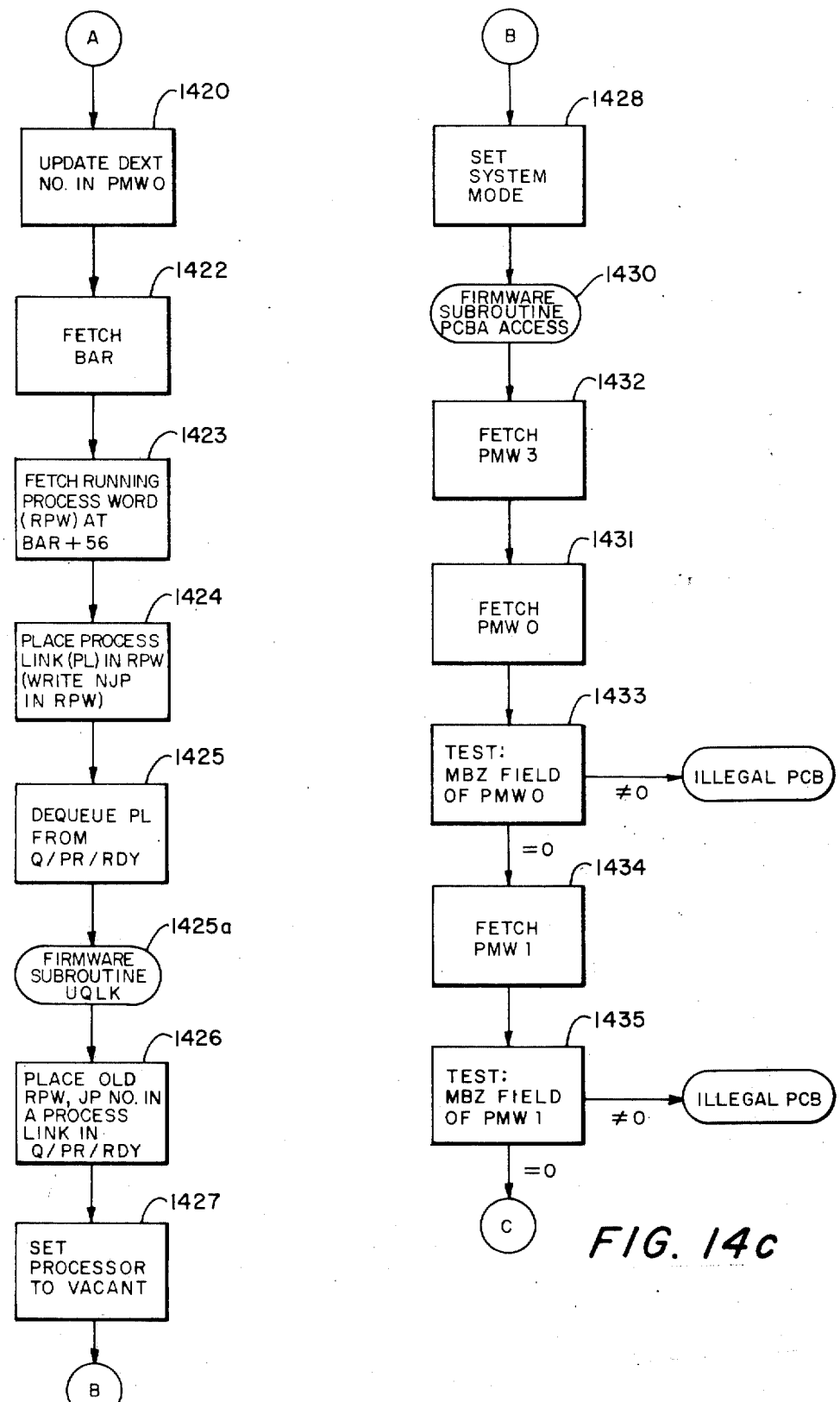

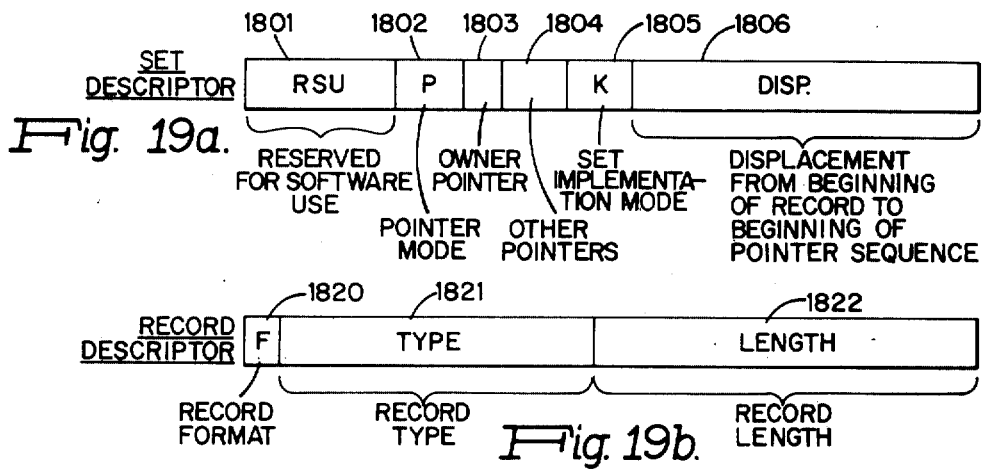
Fig. 19a.
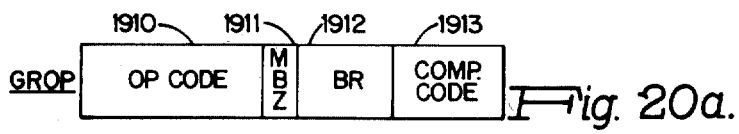
Fig. 19b.
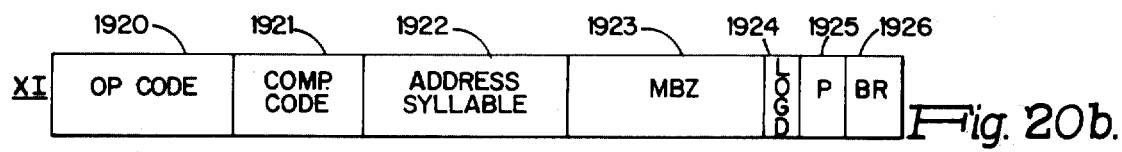
Fig. 20a.
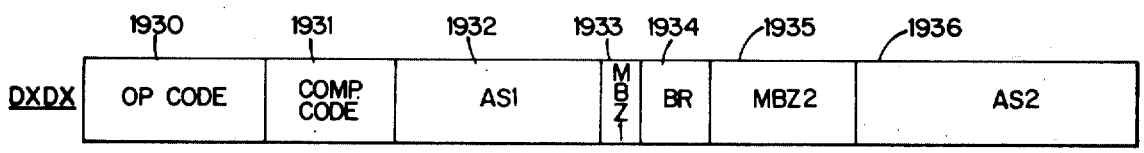
Fig. 20b.
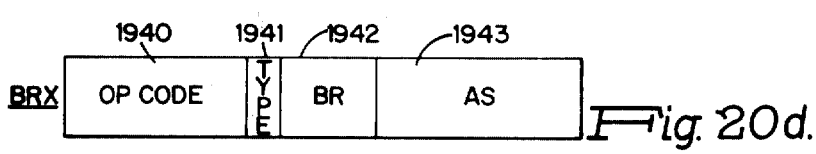
Fig. 20c.
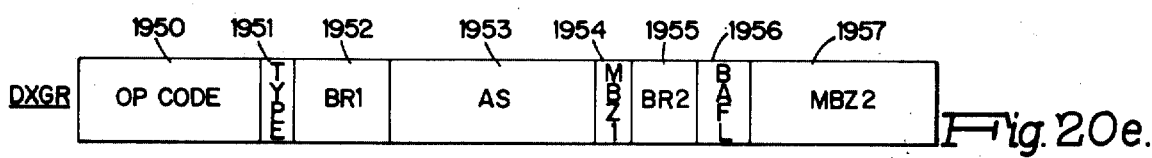
Fig. 20d.
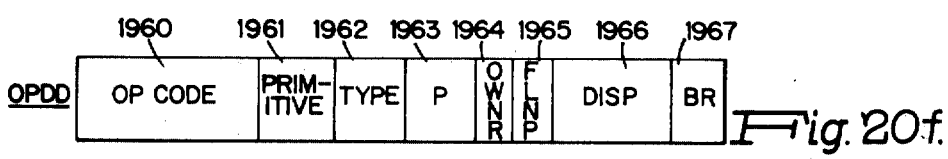
Fig. 20e.
Fig. 20f.

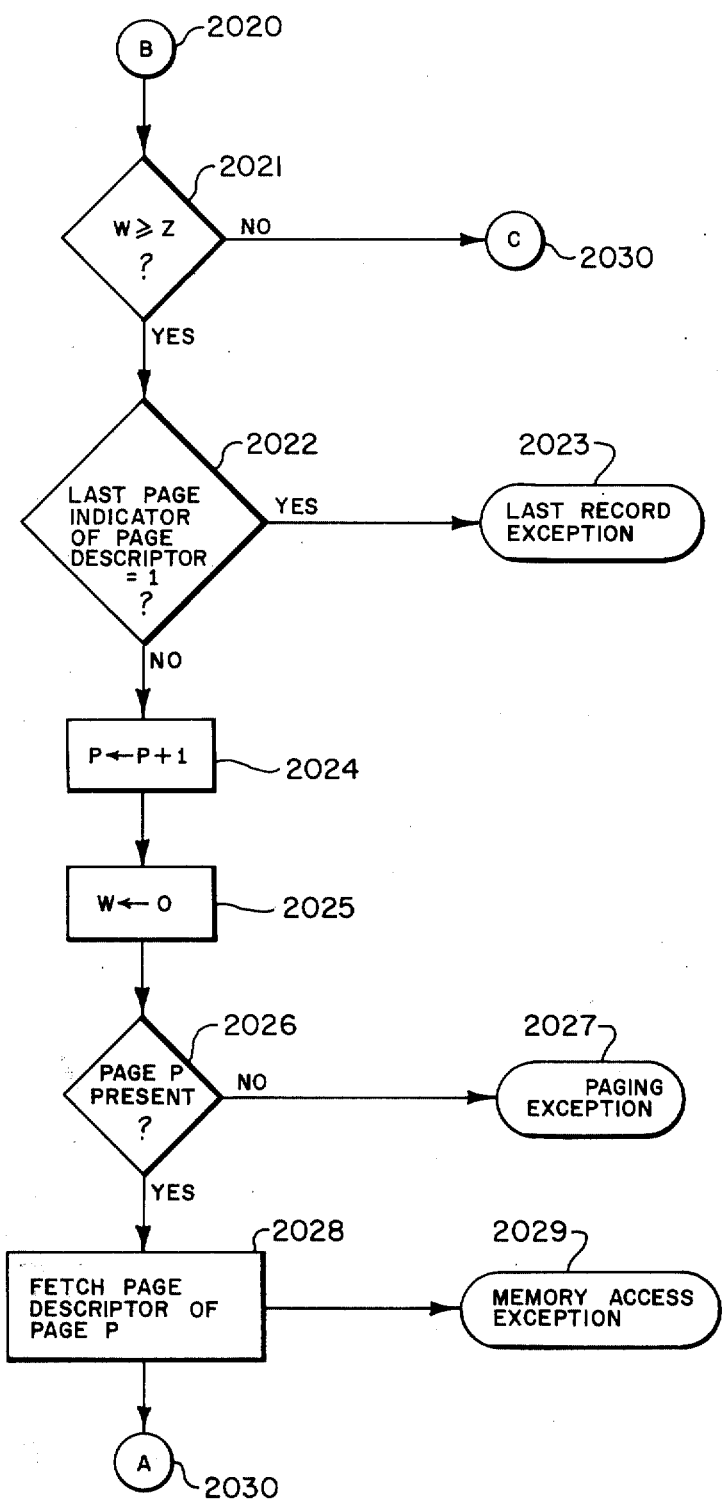
FIG. 21.b.

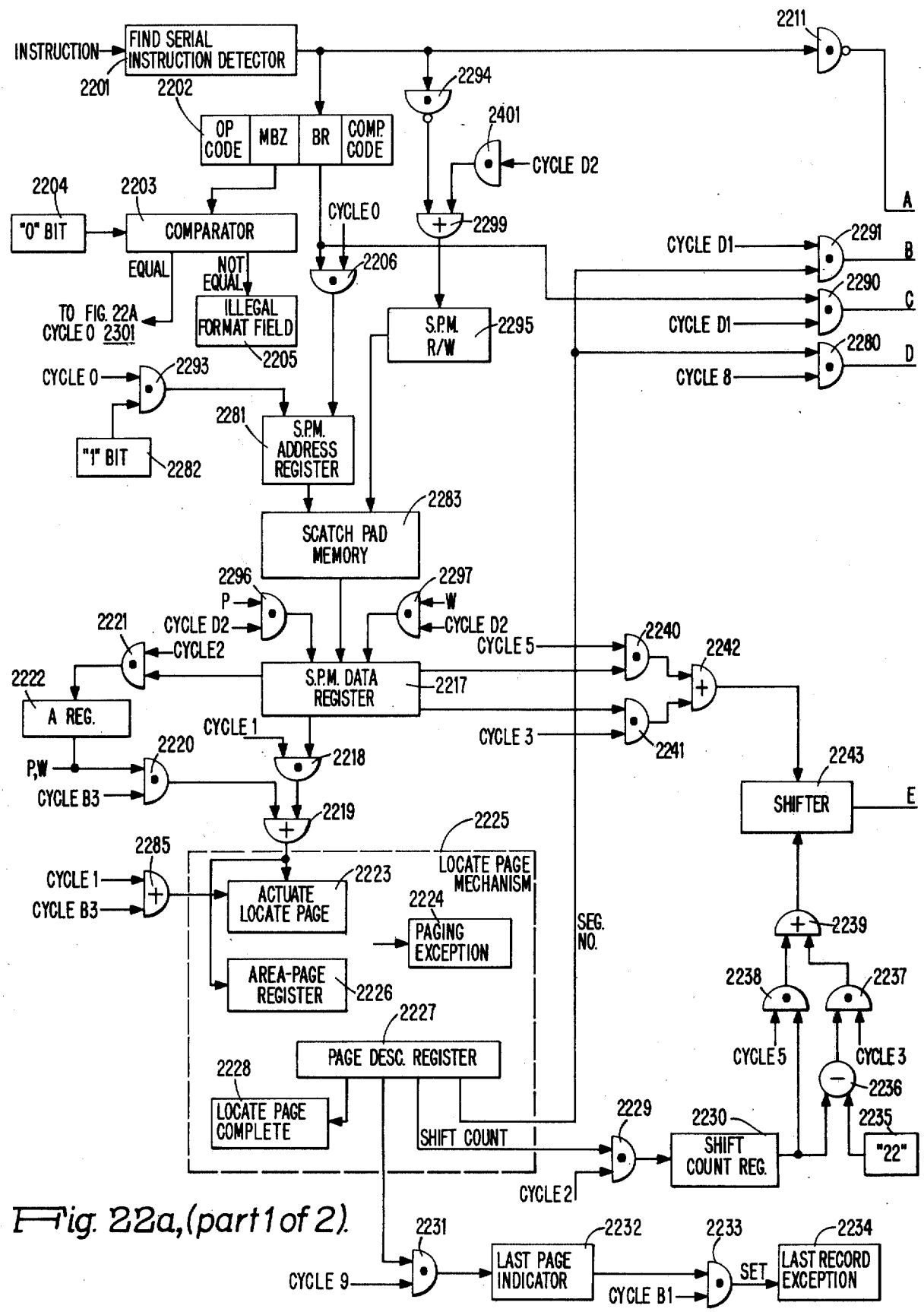
Fig. 22a, (part 1 of 2).

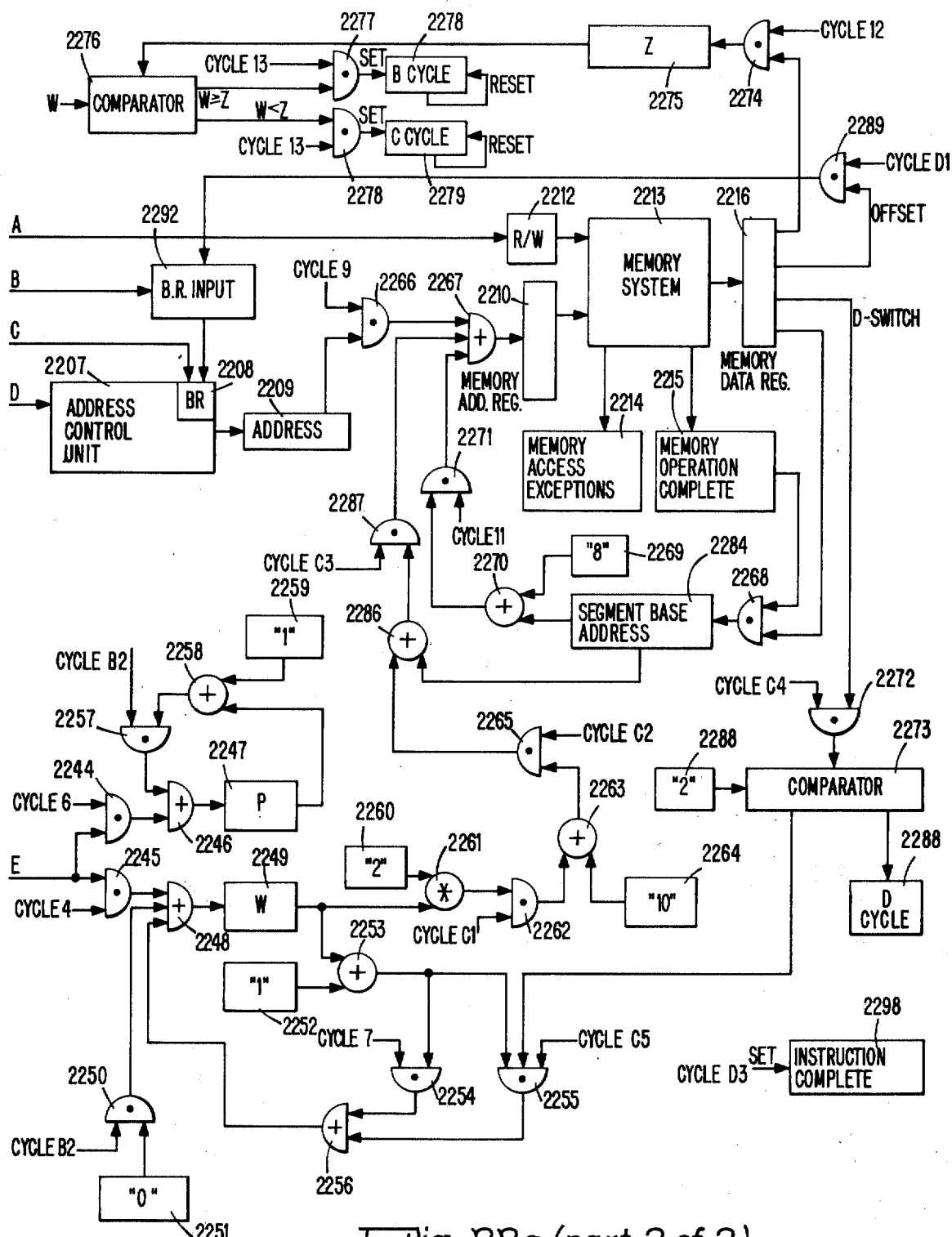
Fig. 22a, (part 2 of 2).

DATABASE INSTRUCTION FIND SERIAL

RELATED APPLICATIONS

The following U.S. applications filed on an even date with the instant application and assigned to the same assigneee as the instant application are incorporated herein by reference:

1. Database Instruction Test Record Type, having U.S. Ser. No. 588,523.
2. Database Instruction Find Owner, having U.S. Ser. No. 588,434.
3. Database Instruction Unload, having U.S. Ser. No. 588,522.

BACKGROUND

1. Field of the Invention

This invention relates generally to computer systems and more particularly to an improved digital computer in the area of database operations.

2. Description of the Prior Art

Electronic computers have grown from first generation hardware characterized mainly by vacuum tubes, to second generation hardware characterized by transistors, to third generation hardware characterized, in the main, by integrated circuits. Along with these different generations of hardware there were different generations of software, wherein first generation software was characterized mainly by machine language, assemblers and subroutines, and second generation software was characterized by high level languages, monitors and micro-assemblers. Third generation software is characterized by operating systems, on-line real-time systems, multiprogramming systems, and database management systems.

First generation hardware in combination with first generation software, and also the second generation hardware in combination with second generation software were primarily oriented toward batch processing where jobs were executed primarily in serial fashion. Moreover, the third generation of hardware/software systems are also batch process oriented; however, because of the advent of multiprogramming, several jobs may be executed in parallel rather than serial, and permits the acceptance of input information for processing as it is generated.

The fourth generation system will typically be classified as a communication and control system capable of widely diversified processor applications, and will be stimulated primarily by transmitted data rather than by batch programs (i.e. system control will be established primarily by input rather than by operator action) wherein submission of information will generally be in real-time.

In the evolution of the above generations of computer systems, a major requirement was to develop effective methods for accessing the databases of the computer systems. In the development of system databases, the initial result was the growth of many different databases for each use. As a result of this growing number of databases, problems were encountered in excess storage requirements and in redundant data storage which aggravates the problem by having redundant data being updated at different times correctly in one spot and incorrectly in another spot. Steps were taken to correct these problems by integrating the many databases of a system into one single database. The Honeywell Integrated Data Store (IDS) was an example of a system designed to alleviate these problems. The Integrated Data Store was composed of one central database which could be used, for example, by the inventory control system, the internal auditing procedures and payroll procedures for accessing their relevant data in the database. In this central integrated database, there would be a single record describing information which was common to several functional needs. For instance, inventory control and internal auditing would access the number of a given part in the warehouse.

Effective techniques using integrated databases were evolved through continually improving software techniques. The set concept is a technique which allows access to records in the integrated database on the basis of relationships between records. A typical relationship would be, say, all of the employees in a particular department, such as the manufacturing department. The manufacturing department would be described by what would be called an owner record and the employees in the department would be described by what would be called member records. The set which describes a relationship such as membership in the department could then be accessed through the owner record, which allows the software to obtain all of the member records and thus, for instance, print out all of the employees in the department.

At this state of development the integrated data store had solved some of the pure data problems mentioned above, i.e. redundant data in different databases and the problem of updating multiple copies of records. The problem had been solved by one single record which therefore allowed a reduction in data storage size and a single copy of data. Other problems in using databases still remain in the performance areas. The set concepts represented new techniques of utilizing the computer and henceforth there were no specialized hardware instructions which existed on current central processors to aid these new techniques. As a result, a set operation like find the first member of the set would be implemented in the software through a series of standard machine instructions such as add, load, stores, etc. The result was a long execution time for the rather simple set operations of find first member, insert a record in a set, and the other set operations.

What was needed was a database system which both solved the traditional data problems as had already been solved in the integrated data techniques using set operations and also an efficient database system in terms of execution time and other system performance parameters. To effect this specialized hardware/firmware supported instructions were needed to assist in the set operations. For instance, a single instruction to find the next active record in a database page would allow execution in a much smaller period of time than the series of 10 to 20 standard machine instructions required to perform the same operation in a traditional machine.

OBJECTS OF THE INVENTION

It is a primary object of the invention to provide an improved general purpose digital computer.

It is another object of the invention to provide an improved general purpose digital computer having improved performance of database management operations.

It is still a further object of the invention to provide a hardware/firmware instruction that finds the next active record in a database area and then loads the database address of that record into a base register.

It is still a further object of the invention to reduce the number of instructions in user and operating system programs.

SUMMARY OF THE INVENTION

The foregoing objects are achieved according to one embodiment of the invention providing one of a series of hardware/firmware implemented instructions that sequentially checks each database record in a database area beginning at the page/line number address (database address) contained in a register, until the next active record is located. The database address of that active record is then loaded into a register.

BRIEF DESCRIPTION OF THE DRAWINGS

The novel features which are characteristic of the invention are set forth with particularity in the appended claims. The invention itself, however, both as to organization and operation together with further objects and advantages thereof may best be understood by references to the following description taken in conjunction with the drawings in which:

FIG. 2 is a schematic representation of various hardware structures utilized by the invention.

FIG. 3 is a legend of terms used for reserved areas of storage in registers depicted in FIG. 2.

FIG. 4 is a schematic diagram of a process control block of a machine utilized by the invention.

FIG. 9 is an exploded schematic diagram of a G-O segment illustrating queue of processes and process linking of a computer system utilizing the invention.

FIGS. 10A through 10L are block diagrams of structures in the PCB.

FIGS. 13A through 13C are schematic diagrams of the control unit of the invention.

FIGS. 14A through 14I are flow diagrams of the dispatcher unit in firmware of the computer system utilizing the invention.

FIGS. 19A and 19B are diagrams of the descriptors describing sets and records used by database instructions.

FIGS. 20A through 20F are diagrams of the instruction formats used by the database instructions.

FIGS. 21A through 21C are the flow diagrams of the find serial database instruction in firmware/hardware.

FIGS. 22A through 22B are logic block diagrams of the find serial database instruction in hardware.

I. INTRODUCTION

Figure 1:
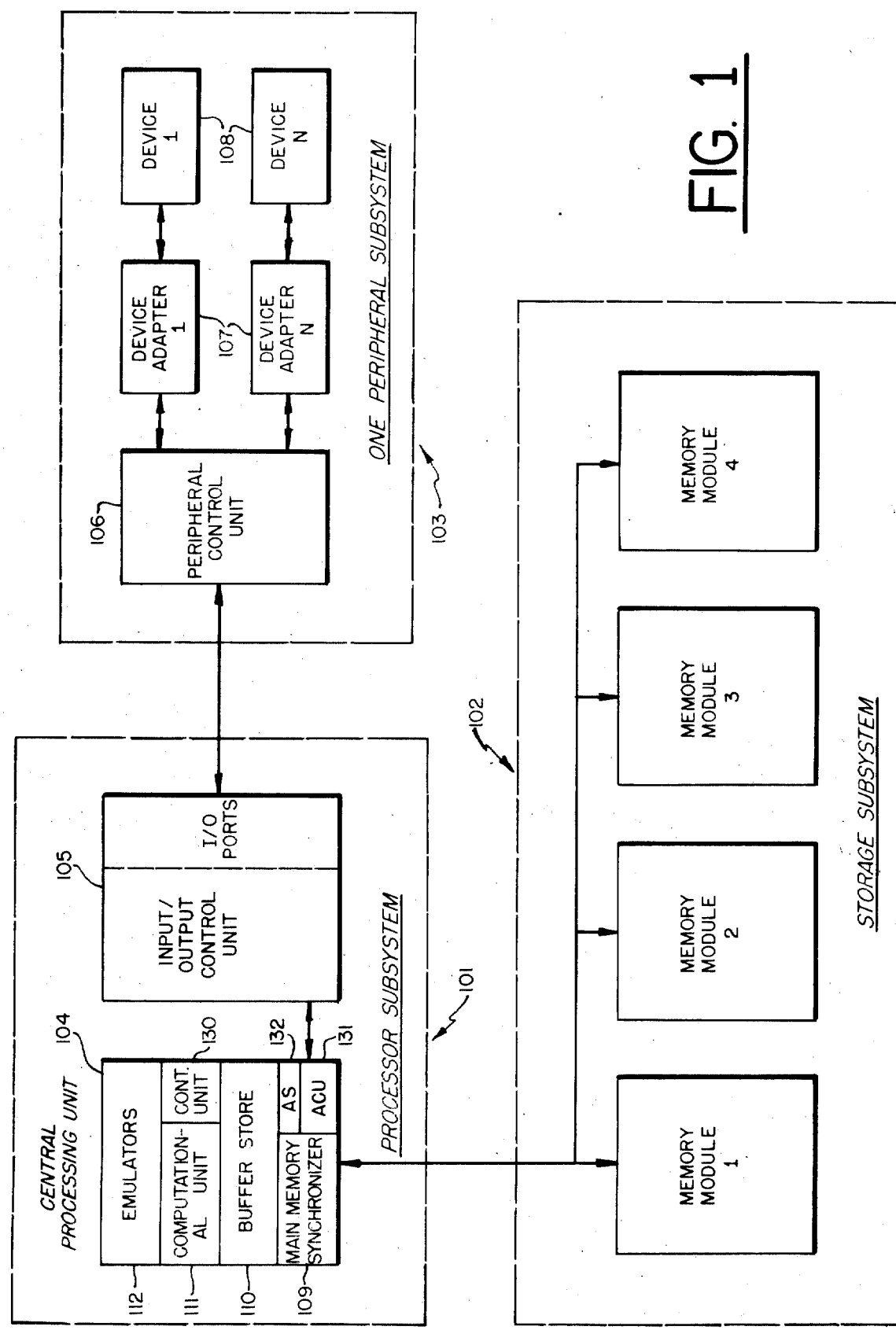
FIG. 1 is a block diagram of a multiprogramming system utilizing the invention.

A. Scope and Organization of the Disclosure:

The environment employed for the unload database instruction in a large scale computer are necessarily complex and are typically found in the Honeywell Series 60 computer. Moreover, a full appreciation of the teachings of the present invention can be obtained only if the reader has some familiarity with the environment in which such instrumentalities reside. For this reason, it is desirable to at least briefly explore the general architecture of a typical large scale data processing system of the type in which the principles of the present invention may be utilized to advantage. It is also desirable to first establish and understand the basic concepts of which the present invention is based.

The database set concept unifies several techniques (table, list, chain, ring, file and field array) which have been in common usage for most of the history of the computers, primarily in programming. (This concept is a specialization of the more general mathematical set concept from which the Data Structure Set gets its name and many of its properties. In this disclosure the word "set" will always be used in the data structure and not the mathematical sense).

Many systems support the set concept, but only in software. In the database management area, the Honeywell Integrated Data Store (IDS) system pioneered broad usage of the set concept to process complex manufacturing and banking problems. IDS uses the chain (ring) form of the set implementation. These basic concepts are implemented in hardware/firmware and incorporated in existing machines to produce a new and improved digital computer.

The set is one of three complementary concepts (record, field and set) needed to build and store data structures which closely approximate their natural world counter-parts. If the natural world is considered in terms of the entities that exist, the attributes which describe them, and the relationships which associate them, then the equivalent information systems concepts are: record, field, and set, respectively. In a simple example taken from a school situation, the entities would be the teachers and the children. Some of the attributes of a teacher are "name", "grade-level", and "classroom". Some of the attributes of a child are "name", "age", "parent-name". A relationship exists between teachers and children. In an information system model of this natural world situation, two classes of records (one for teachers, one for children) would be created. In each teacher record there would be a field that stores the teacher's name, another for the grade-level and another for the classroom number. Each child's record would have a file for the child's name, another for his age and yet another for his parent's name.

The information system could tie each child's record to his teacher's record in one of several ways which have been selected to implement the set concept. This might be done by physically placing all the child's records after their teacher's record array in the file. This is called a table or record array. The present embodiment incorporates the chain (ring) implementation technique of the set concept. In this form the owner record contains a pointer to the first member record. Each member record in turn contains a pointer to the following member record. The last member record of the set contains a pointer back to the owner record. Variations are allowed which provide the owner record, or the owner and all the member records with additional pointer fields to hold the address of the prior record and possibly a pointer to the owner record for member records.

The data structure set concept thus described is a refinement on the mathematical set concept, i.e. in the data structure set the set definition is embodied in the instance of the owner roll. Set membership is embodied in the instance of the member roll. Records may concurrently have many rolls as owners and members of different sets. This property permits the creation and manipulation of complex structures which model the complexity of the real world. In this refinement of the mathematical set concept one can go reversibly either from owner as definition to members or from any member to owner to re-establish the set definition.

For data structure sets, the set definition is normally based upon the value of some field or fields within the owner record while the membership in the set is re-established in the computer by the matching value of an equivalent field or fields within a potential member record. Advantage is frequently taken of this phenomenon by removing the field from the member records which carry the matching data and depending upon the owner record for reconstruction.

In the school example above, it was said that a teacher has the role of owner of a teacher/children set. To extend this example, we will recognize that in most schools the relationship between teacher and child is not a simple relationship (1:n) but a rather complex relationship (m:n) as the children have different teachers for different subjects. This complex relationship of teacher:child may be transformed into a new relationship entity, pupil, and two simple relationships; teacher:pupil and child:pupil. The teacher has many children as pupils of her class and, as a pupil, the child has many teachers. The new pupil entity has the attributes subject and hour which serve to describe and differentiate one relationship entity from another. A child may have the same teacher for several subjects.

The data structure set concept has four basic properties:

1. A set has one, only one, and always one record in the owner roll.

2. A set has zero, one or more records in the member roll and the number varies with time.

3. Any record may be the owner of zero, one, or more sets concurrently.

4. Any record may be a member in zero, one, or more sets concurrently and thus simultaneously owned by several owner records. Each record may appear only once as a member of a particular set. Member rolls do not interfere with the owner rolls.

The notion of next and prior are important concepts to procedural algorithms which are basic to problem solving in a storage program computer. In addition to the procedural limitation of handling one record at a time, there are more important simplifying consequences to an algorithm if the member records within the set can be delivered to it in a predefined data value ordered sequence or a time insertion ordered sequence (FIFO, First-In-First-Out or LIFO, Last-In-First-Out). The notions of first and last are vital to starting and stopping the iterative execution of data algorithms. Thus the ordering of members in a set is a prerequisite to rational manipulation of the set.

The primary motivation of associating records into sets within a file is to model the natural world relationships and to assist in the accessing of selected records within the file that represent some particular relationship. The set access methods fall in between and complement the more traditional access methods. They are listed in Table I.

TABLE I

| ACCESS METHODS | |
|---|---|
| Direct Access Method | Retrieves one record |
| Data Key Access Method | Retrieves one record |
| Set Owner Access Method | Retrieves one record |
| Set Member Access Method | Use Iteratively; Retrieves each member of set |
| File Sequential Access Method | Use Iteratively; Retrieves each record in file |

The first four access methods are primarily used in transaction and inquiry processing, where there is a need to determine the recorded status of a particular entity, a related group of entities, or to update their recorded status. The File Sequential Access Method is primarily used for periodic batch file updating and report generation. It is possible for the same record to be accessed by all five methods as the occassion may require. Similarly, it is possible to use these access methods in combination to achieve a particular effect.

Taking the example given above, a teacher's record might be retrieved by the Data Key Access Method and then all of her pupils' records could be retrieved by Set Member Access Method. For each pupil record, the child's record may be retrieved with the Set Owner Access Method. Alternately, retrieval might start with Data Key Access to the child's record and then access all of the child's pupil records and hence the teacher's records. The basic retrieval opportunities derived from the set are given in Table II below.

TABLE II

| RETRIEVAL OPPORTUNITIES | | |
|---|---|---|
| Given | Access Method | Determine |
| Owner | Set | First member or get empty-set notice |
| Owner | Set | Ith member or get out-of set notice |
| Owner | Set Member | Last member or get empty-set notice |
| Any Member | Set Member | Next member or get last-of-set notice |
| Any Member | Set Member | Prior member or get first-of-set notice |
| Any Member | Set Owner | Owner of Set |

There is a set of primitive operations which apply to sets. These are complementary to the primitive operations on records and fields which are better known. The collection of primitive operations on sets and the complementary primitive operations for records and fields compose what are known as the manipulative facilities which are a collection of hardware/firmware instructions by which a user accesses, modifies, moves, deletes, etc., the data with which he is working. This collection of primitives (i.e. hardware/firmware instructions) can be subdivided into operations with respect to fields (i.e. data items), records, sets, and procedure logic control.

The following group of hardware/firmware instructions provide for manipulation of data within fields. It is assumed the field descriptive information (e.g. size, location, recording mode) that is needed for an operation to be performed is carried as part of data descriptors associated with the operation. The operations included in this group are, for example: move, compare, hash, add, subtract, multiply and divide.

The following group of hardware/firmware instructions provide for both direct and serial access processing of data. These provide for the creation of a data record, its subsequent retrieval modification, testing and destruction. The record firmware/hardware instructions are: create record, destroy record, find direct record, find serial record and test record type.

The following group of set hardware/firmware instructions provides the substance of conventional data processing and the building blocks for advanced database and message management systems. They provide for the creation, access to, manipulation and testing of sets. The hardware/firmware instructions are: insert record, remove record, find relative record, (find first, find last, find next, find prior, find ith), find owner record, test set for empty, test member inserted, initiate owner record, and initiate member record.

The following group of base register hardware/firmware instructions provide the determination of and modification of current process status relative to the database access. The hardware instructions are: unload base registers, nullify base registers and the previously mentioned find instructions which load a base register.

As well as being used to organize and provide access to records in an application database, sets can also be used in a great variety of system software areas. Tabulated below are a list of areas of system software and for each is enumerated some usages in that area of the set concept. This list is intended to be illustrative of obvious usages and there is no intent to be complete.

1. Data Base Systems
   a. Index construction (index sequential and index random)
   b. Data Description structures
   c. Shared access control lists
   d. Process responsibility structures
2. File Systems
   a. Catalog construction
   b. Access rights control
3. Message Systems
   a. Construction of mailbox indexes
   b. Queueing Messages
   c. Accessing Multi Element Messages
4. Programming Systems
   a. Controlling program libraries
   b. Test editing
   c. Program control structure
   d. Symbol reference and symbol definition structures for binding
   e. Intermediate program form for compilation
5. Operating Systems
   a. Queues of jobs
   b. Resource allocation tables
   c. Deadly embrace detection
   d. Queues of processes waiting on events (I/O completion, timer)
   e. Dispatching queues

1. GENERAL DISCUSSION

The invention operates typically in the hardware system environment, hereinafter described, coordinated by an operating system. Referring to FIG. 1 the subsystems are the processor subsystem 101, the storage subsystem 102, and one or more —up to 32— peripheral subsystems 103. The processor subsystem contains a central processing unit (CPU) 104 and up to four input/output control units (IOC) 105. Each peripheral subsystem consists of a peripheral control unit (PCU) 106, a number of device adapters (DA) 107, and up to 256 peripheral i/o devices 108. The storage subsystem 102 consists of one to four semiconductor memory modules of 32 to 512 kilobytes each.

In the processor subsystem 10, the CPU 104 performs the basic processing operations for the system, and interfaces with memory 102. The IOC 105 controls all information exchanges between the storge subsystem 102 and peripheral devices 106.

A. CENTRAL PROCESSING UNIT

The CPU includes a main memory synchronizer 109, a buffer store 110, various elements that comprise the computational unit 111, and optional emulation facilities 112. The main memory synchronizer 109 resolves conflicts for the use of main memory among the computational unit 111, the buffer store 110, and the IOC 109. Conflicts are resolved on a priority basis: the IOC has the highest priority followed by memory writes (from the computational unit) and then memory reads (into the buffer store). The main CPU also includes the address control unit ACU 131 which controls main memory addressing and the associative memory AS 132 used to store most recently used addresses of main memory. The buffer store 110 is a small high-speed buffer memory that reproduces a selected region of main memory and interfaces with the computational unit to decrease average memory access time. During each memory read, both the buffer store and main memory are accessed. If the information to be fetched is already in the buffer store, the main memory read is terminated and the information fetched from the buffer store. Otherwise the main memory 102 is read. Every time this is done, the CPU 104 fetches 32 bytes that contains the desired information. This information remains in the buffer store for future memory references. Since the buffer store is transparent to software, the program controlling the computer at any given moment cannot determine whether the information it is processing has been fetched from the buffer store or from main memory.

The computational unit 111 performs all data processing and address generation within the CPU. A typical control store 130 within the computational unit (see a book entitled Microprogramming: Principles and Practices, Samir S. Husson, Prentice Hall, Inc.) contains firmware which initializes the system, controls the CPU 104 and IOC 105, and decodes an instruction set. Optionally the control store may provide scientific instructions, test routines, emulation packages, or special purpose features which extend the capabilities of the processor subsystem.

As an option, the CPU provides emulation of systems other than the instant system. Emulators 112 are components of firmware, software, and in some instances hardware.

B. INPUT-OUTPUT CONTROL UNIT

The IOC 105 portion of the processor subsystem provides a data path between any peripheral subsystem 103 and the storage subsystem 102. This path allows for the initiation of peripheral commands and controls the resulting data transfers. An IOC can typically handle up to 32 channel control units (not shown).

C. PERIPHERAL SUBSYSTEMS

In a peripheral subsystem 103 on FIG. 1 the PCU 106 is a stand-alone microprogramming processor that relieves the load on the CPU 104 by controlling the i/o devices 108 during i/o operations. The PCU does this by executing instructions contained in a channel program. This program results in arithmetic, logical, transfer, shift, and branch operations being performed in the PCU. There are several kinds of PCU's according to the kind of device each controls: i.e. unit record, mass (disk) storage, magnetic tape, communications, etc.

Device adapters 107 mediate between every PCU and the devices it controls. Each contains the dedicated firmware and logic necessary to implement communication with a particular type of device. Depending on the type, a DA 107 controls one or several devices.

The major functions performed by a peripheral subsystem 103 are as follows:
1. Transforming CPU instructions into a series peripheral device.
2. Packing and unpacking data in the form needed by the CPU or the appropriate peripheral device.
3. Keeping the CPU informed of the status of the subsystem and of the devices under its control.
4. Independently initiating and processing error and recovery procedures.
5. Allowing on-line diagnosis of a device without disturbing the device-sharing capabilities of the associated peripheral processor.

The PCU resolves conflicts for main memory between devices attached to it; however, the IOC resolves conflicts between PCU's.

D. STORAGE SUBSYSTEM

Each memory module 1–4 is 4 or 8 bytes wide. The number of modules, their size, and the data path width may vary according to size of computer. Memory modules are four-way interleaved in such a way that the four modules are accessed sequentially (module 1 contains the first 8 bytes, module 2 contains the second 8 bytes, etc.). Interleaving decreases the number of conflicts for access to main memory and thereby decreases the average memory access time. Memory is reconfigurable in case of failure; i.e., blocks of memory within a module may be removed without destroying contiguous addressing.

Main memory 102 consists of a capacitive storage medium in the form of metal oxide semiconductor (MOS) chips. This medium operates on the refresh principle to maintain information. Each memory location is typically refreshed at least once every 2 milliseconds; the design ensures that few conflicts occur between refresh timing and memory accesses. (In cases of conflict, refreshing takes precedence).

An area at the beginning of main memory is reserved for hardware and firmware. The upper limit of this area is defined by the content of a boundary address register (BAR — to be later described) which is visible to the system software. The BAR content is set at system initialization time. The memory area below the address specified in the BAR can contain IOC tables which define the configuration of the peripheral subsystems, firmware to control the CPU, or microprograms and tables for emulation. The size of the area below the address specified in the BAR depends on the system configuration. Whether microprograms are in main memory or control store depends on the system configuration and the applications run on the system.

2. BASIC MACHINE STRUCTURES

There are typically three basic data structures utilized in this hardware: data formats, software visible registers, and the instruction formats.

A. DATA FORMATS

Information is transferred between memory and the CPU in multiples of 8 parallel bits. Each 8-bit unit of information is called a byte. Parity or error correction data is also transferred with data but cannot be affected by software. Therefore, in this patent specification the term data excludes the associated parity or error correction data.

B. BYTES

Bits within a byte are numbered 0 through 7 from left to right. Bytes are processed separately or in groups. Two bytes constitute a halfword, 4 bytes a word, 8 bytes a doubleword, and 16 bytes a quadword. These are the basic formats for all data, including instructions.

C. DATA REPRESENTATION

All data are in binary form, but may be interpreted as binary, decimal, or alphanumeric. Data bits are interpreted in groups of four, as binary coded decimal data; eight as alphanumeric, or 16 to 64 as binary digits. The latter are interpreted as signed, fixed, or floating-point numbers in binary notation. Any number of contiguous bits up to a doubleword may also be manipulated as a string. The alphanumeric character set is represented in EBCDIC. ASCII is supported as an alternate exchange code.

D. BYTE ADDRESSES

Byte locations in main memory are consecutively numbered starting with zero; each number is the address of the byte. A group of consecutive bytes is said to be halfword-, word-, doubleword-, or quadword-aligned, if the address of the left byte in a group is a multiple of 2, 4, 8, or 16, respectively. Whenever a halfword, word, doubleword, or quadword is so aligned, that unit can be fetched from that address. The location of data in main memory is specified by a data describer which is accessed indirectly during address development. (See Patent application Ser. No. 425,356 filed Dec. 17, 1973 entitled Apparatus for Developing an Address of a Segment within Main Memory and an Absolute Address of an Operand within that Segment and assigned to the same assignee as the instant application and issued into U.S. Pat. No. 3,938,096 on Feb. 10, 1976).

E. VISIBLE REGISTERS

There are 33 user-visible registers in the CPU 104 FIG. 1 whose contents collectively define the state of the CPU. There are four types: (See FIG. 2).
1. general registers
2. base registers
3. scientific registers (optional)
4. miscellaneous registers

F. GENERAL REGISTERS

General registers (GR) 201 FIG. 2 are used to manipulate fixed-point binary numbers and bit strings. There are typically sixteen 32-bit general registers in the CPU 104 —GR0 through GR15. General register GR8 through GR15 are also usable as index registers. When used as index registers, they are herein called X0 through X7: Indexing is performed using the 32-bit two's complement integer contained in a register.

G. BASE REGISTERS

Base registers (BR) have the same format as instruction counters IC and stack registers 202-203. Base registers are used during address computation to define a part of memory. There are typically eight 32-bit base registers, BR0 through BR7.

H. SCIENTIFIC REGISTERS scientific registers (SR) are optional equipment for computation with floating-point binary numbers. There are typically four 8-byte scientific registers which are referred to as SR0 through SR3. Scientific registers have the format 204-205 of FIG. 2.

I. MISCELLANEOUS REGISTERS

There are five other registers:
. instruction counter —having format 202-203;
. status register —having format 207;
. stack register (called the T register);
. boundary address register —having format 202-203; and
. hardware control mask register —having format 208.

The instruction counter (IC) is a 32-bit register that contains the address of the instruction being executed. The status register (STR) 207 is an 8-bit register that records facts about the procedure currently being executed, for example, whether an underflow was caused by the most recent operation. The stack register also known as the T-register is a 32-bit register that contains a pointer to the top of a pushdown stack associated with the currently active procedure. Stacks to be described infra provide a work space, and a mechanism for saving local variables and preserving procedure entry, and return information. The boundary address register (BAR) 206 is a 28-bit register which specifies the lowest absolute main memory address accessible by software. This register is loaded during system initialization and can only be read by software. The hardware control mask register 208 is an 8-bit register which records machine condition information.

J. INSTRUCTION FORMATS

There are approximately 200 instructions although more or less may be utilized. Each instruction is one of four different lengths but always an even number of bytes long. Instructions are stored in consecutive storage locations. The address of the leftmost byte is a multiple of 2, and is the address of the instruction.

The eight most significant bits (and in some cases bits 8 through 11 or 12 through 15) of an instruction represent the operation code, while the remaining bits represent one or more operands. An operand may be a register designator, displacement designator, address syllable (logical address), literal value, immediate literal value. The type and number of operands are determined by the instruction format.

3. SYSTEM ORGANIZATION

A. JOB STEP AND TASK

Work to be performed by the computer system is defined externally by a series of job steps via a job control language. A job step is a unit of work to which hardware resources are allocated. Typically a job step consists of several tasks. A task is the smallest unit of user defined work consisting of a stream of instructions executed without parllelism.

B. PROCESS

The user-visible concepts of task and job step are represented in the hardware by a process and process group, respectively. A process is defined as an ordered sequence of instructions which can be executed asynchronously by the CPU (i.e., several processes can be active and sharing resources, but only one process is actually running at any one instant). A process group is a related set of processes necessary to perform one job step.

C. PROCESS CONTROL BLOCK AND SYSTEM BASE

Because processes can relinquish CPU control at various points during their execution, a storage area in main memory is made available to a process to save CPU status. This status information is utilized to precondition the CPU before a process regains control of the CPU.

The storage area assigned to a process is called a process control block (PCB) 400 on FIG. 4. The data contained in a PCB include the addresses of memory areas (address space) assigned to the process, the contents of all pertinent registers, and the state of the process. Thus a PCB serves as a temporary storage area for information necessary to start or restart a process without any information loss. Each PCB is visible to the hardware and can be addressed by the operating system via a set of hardware tables developed during system initialization and modified during system operation (FIG. 5).

Figure 5:
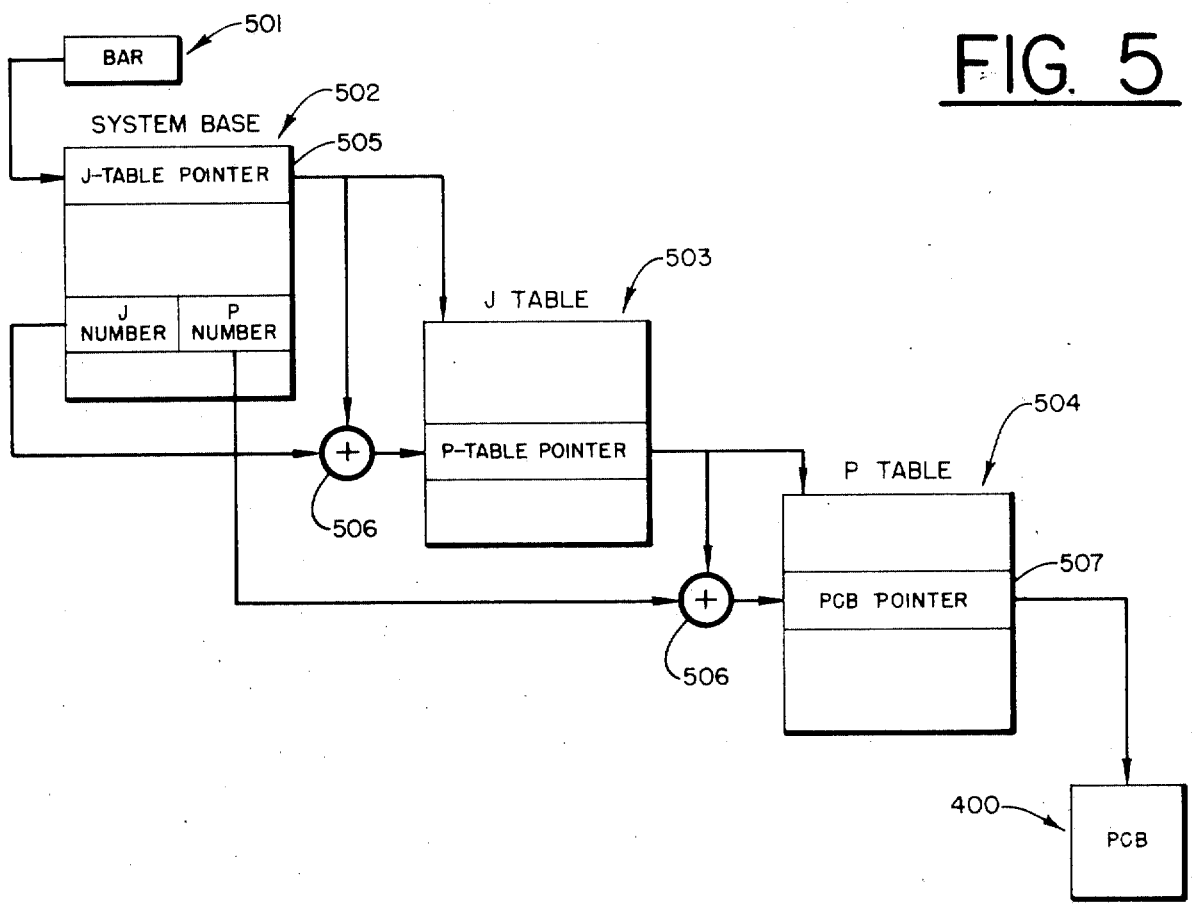
FIG. 5 is a schematic diagram of a system for addressing a process control block.
Figure 6:
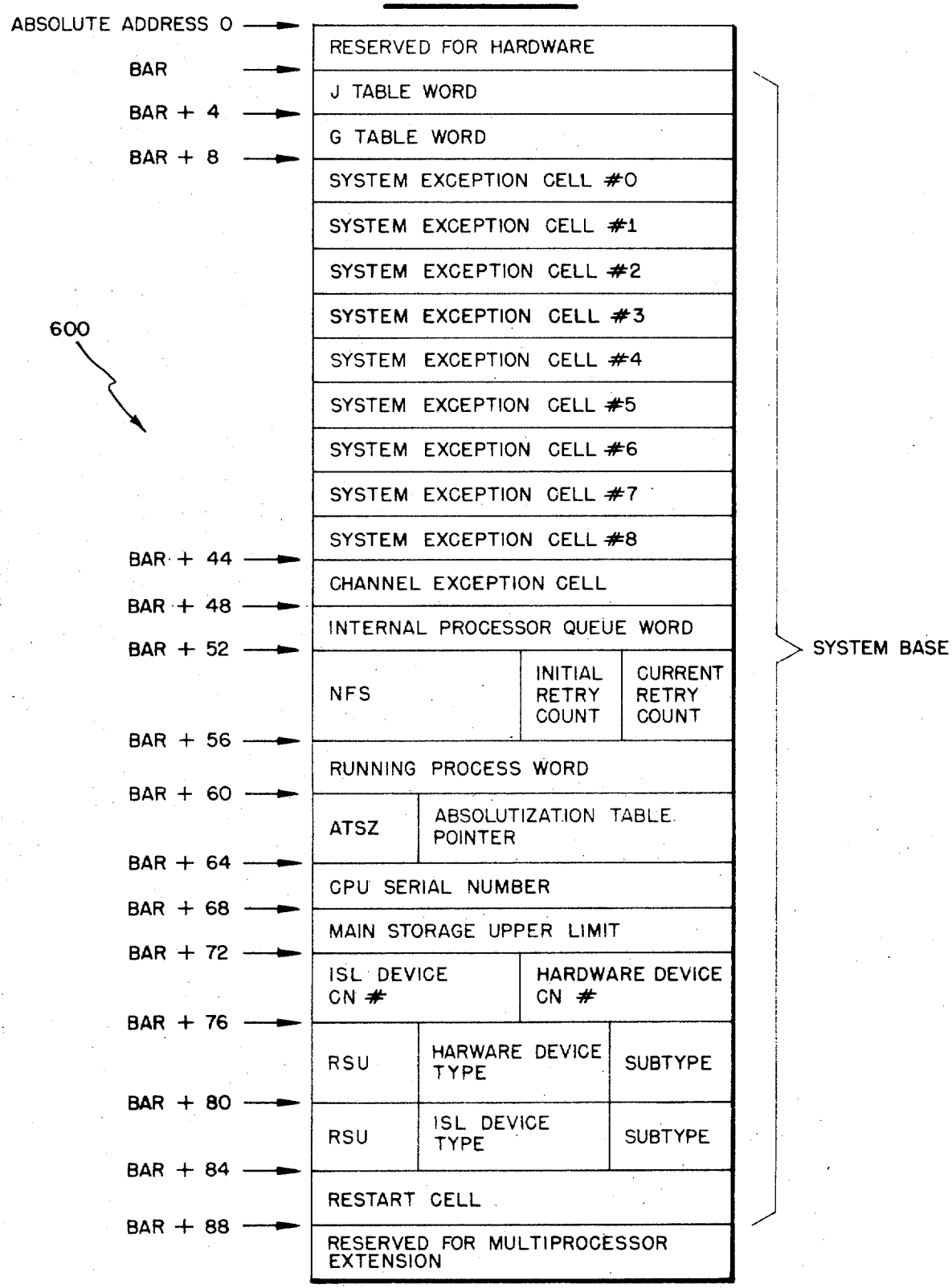
FIG. 6 is a schematic diagram of the system base of a computer system utilizing the invention.

There is an absolute main memory area which is referred to as the system base (FIGS. 5 and 6). This area is developed by firmware and is accessible via the base address register (BAR) 501 which can be read but not written. The system base 502 contains a number of system attributes which include a job step number and a process group number (J, P) respectively for the currently running process. Another attribute in the system base is a pointer to a hardware defined data structure known as the J table 503. This table contains an entry for every job step presently in the system. Each entry in the J table 503 points to an associated P table 504 which is also a hardware defined data structure. This table defines a process group and contains an entry for every process in the process group. Each P-table entry points to a PCB 400.

Referring to FIG. 5 the J-table pointer 505 indexed by the J number via the arithmetic portion 506 of computational unit 111 (FIG. 2) provides access to a J-table entry 503. This entry contains a P-table pointer which when indexed by the P number via computational unit 506 provides access to a P-table entry 504. The P-table entry contains a pointer 507 to the PCB of the current running process. Thus the operating system can access the active PCB using the contents of the BAR 501 and can access any other PCB given its associated (J, P) logic name.

D. MEMORY SEGMENTATION

In a multiprocess environment, such as herein described there are many processes in memory at any given time. These processes vary in size and demand for memory which causes a memory allocation problem. The hardware herein described in cooperation with an operating system (not shown herein) solves the problem by dynamically allocating memory space. Due to the random nature of memory requirements, memory is allocated in variable size segments and the memory allocation can be restructured during process run time. Thus, a process may be allocated a number of noncontiguous memory segments. This memory allocation method is called segmentation.

Segmentation presents an additional problem in that memory addresses have to be modified whenever part or all of a process is relocated. To alleviate this problem the system herein described provides a technique whereby addresses used by a process are logical rather than absolute main memory addresses. These logical addresses are used to develop absolute addresses.

Segmentation also allows each process to access its own or related memory segments via a system of segment descriptors. By accessing a segment descriptor, a process can obtain the address of a segment. Segment descriptors are contained in main memory and are maintained by the operating system.

Each process may have access up to 2068 memory segments. Normally, this would require an equal number of segment descriptors per process. However, since segments can be shared, the operating system groups segment descriptors into segment tables. This grouping is based on accessability by one process (task), a process group (job step), or globally (system wide). Each process may have up to 15 segment tables associated with it. This technique requires only one segment descriptor for each segment which can be accessed by a process via a segment table. Thus, the memory space required for segment descriptors is decreased; memory updating during relocation is reduced; and some program protection is provided. (The main mechanism for program protection is the ring system. See Patent application Ser. No. 424,239 filed on Dec. 12, 1973, entitled "Ring Checking Hardware", and now issued as U.S. Pat. No. 3,916,385 on Oct. 28, 1975).

A process must be able to determine which segments it is allowed to access. Accordingly, the system provides a process with two segment table word arrays (STWA). These arrays contain the addresses of all segment tables accessible to a process. There are two segment table word arrays per process because there are two segment sizes, large and small. Large segments have a maximum size of $2^{22}$ bytes while small segments have a maximum size of $2^{16}$ bytes. All segments vary in size in 16-byte increments up to the maximum. A system can typically accomodate up to 28 large segments and 2040 small segments.

Segment table word arrays may be relocated by the operating system; therefore, a process must know the absolute address of its associated STWA's. The PCB for any process contains two words which contain this information which are known as address space words ASW0-1 on FIG. 4. Each word points to a segment table word array STWA. The operating system updates the contents of the ASW's whenever the associated STWA's are relocated. Working down the chain of pointers and decoding the segment descriptor is a firmware function and thus once initiated is not visible even to the operating system.

Segmentation defines over 200 million bytes of address space as being available for processes. This number exceeds the capacity of main memory; therefore, a secondary storage (magnetic disk or drum) is used in conjunction with main memory. The operating system creates the illusion that the system has a much larger main memory than is really available. This concept is called virtual memory.

At any given time, a defined segment may or may not be physically in main memory. The contents of a segment descriptor indicates whether or not the associated segment is in main memory. The hardware detects any attempts by a process to access a segment not in main memory and notifies the operating system. The operating system causes the desired segment to be loaded into main memory from secondary storage. Then the operating system places the segment's memory address in the segment descriptor which is the only place where the absolute address of a segment can be found. This operation is invisible to the process and thus it is not aware that the segment was not in main memory or that it may have to be relocated in main memory. (For details on memory segmentation see Patent application Ser. No. 425,356 filed Dec. 17, 1973 and entitled Apparatus for Developing an Address of a Segment within Main Memory of an Absolute Address of an Operand within that Segment, now issued into U.S. Pat. No. 3,938,096 on Feb. 10, 1976.

The computer system herein described provides data and procedure protection by preventing processes from interferring with each other or sharing each other's address space in an unauthorized manner. This protection is accomplished by restricting addressability via memory segmentation and by a ring system.

The segment tables isolate the address space of the various processes in the system. Processes always use a segmented address during execution. A segmented address consists of a segment number and a relative address within the segment (see above referenced application on Segmented Address Development). The hardware checks that the address used by a process is part of the address space assigned to the process. If the address is outside the prescribed address space, an exception occurs. A process cannot refer to data within the address space of another process because the hardware uses the segment tables of the referencing process. Thus, there is no possibility for a process or process group to reference an entity belonging to another process group.

Generally, overlap in address space in the system occurs for those segments shared by all processes. These public segments are created by system programs which check to insure against address conflicts. Thus, segmentation protects user programs against each other and protects the operating system against user programs.

Segments shared by several processes are not protected from misuse by one of these processes. To solve this problem, a ring system is utilized whereby procedure and data segments are grouped into a four-class hierarchy. The four ring classes are numbered 0 through 3. Each ring represents a level of system privilege with level 0 (the innermost ring) having the most privilege and level 3 (the outermost ring) the least. Every procedure in the system has a minimum and a maximum execute ring number assigned to it which specifies who may call the procedure. A procedure is a subroutine which is capable of calling other procedures and passing parameters to them:

The general rules of the ring system are as follows:
1. A procedure in an inner ring has free access to data in an outer ring. Conversely a procedure in an outer ring cannot access data in an inner ring.
2. A procedure in an outer ring can branch to a procedure in an inner ring, but the reverse is not allowed.
3. Each segment containing data is assigned two ring values, one for read (RD) and one for write (WR). These ring values specify the maximum ring value in which a procedure may execute when accessing the data in either the read or write mode.

Each time a procedure instruction is executed, the procedure's ring number (effective address ring, EAR) is checked against the ring numbers assigned to the segment containing the referenced data. The EAR is the maximum number of process ring numbers in the instruction counter and all ring numbers in base registers and data descriptors found in the addressing path. Access to the data will be granted or denied based on a comparison of the ring numbers. For example, if a system table exists in a segment having a maximum read ring value of 3 and a maximum write ring of 1, then a user procedure executing in ring 3 may read the table but may not update the table.

By predesign, rings 0 and 1 are reserved for the operating system and rings 2 and 3 are reserved for the user. Ring 0 contains those segments critical to total system operation. Ring 1 contains the bulk of the system segments whose failure would not be catastrophic and would allow recovery. The user may utilize ring 2 for checked-out programs and ring 3 for programs being debugged.

F. PROCEDURE CALLS

Figure 7A:
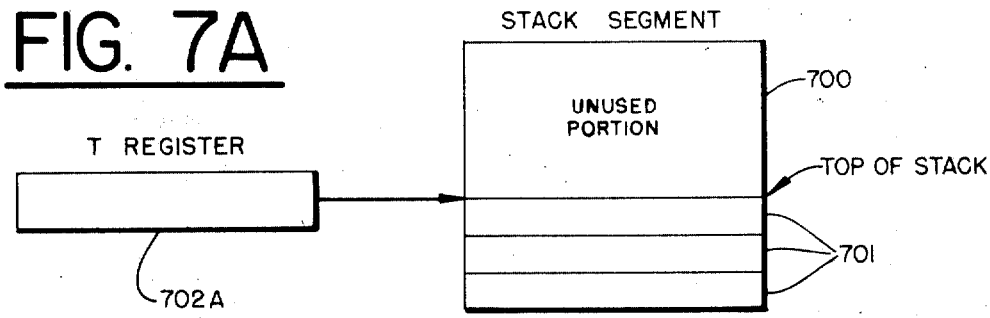
FIGS. 7A and 7B are schematic representations of a stack segment and a stack frame of a computer system utilizing the invention.

The procedure call is an important function in the system herein described. Procedure calls are used to pass from one procedure to another; to allow user procedures to employ operating system services; and to achieve a modular structure within the operating system. A procedure call is effected by instructions and a hardware recognized entity called a stack (FIG. 7A).

A stack is a mechanism that accepts, stores and allows retrieval of data on a last-in-first-out basis. Stacks reside in special segments called stack segments. A stack segment consists of a number of contiguous parts called stack frames 701 (FIGS. 7A and 7B) which are dynamically allocated to each procedure. The first stack frame is loaded into the top of the segment and succeeding frames are loaded after it. The last frame loaded is considered the top of the stack. The T-register 702 locates the top of the stack for the currently active process. A virtual T-register exists in the PCB of all other processes in the system.

Figure 7B:
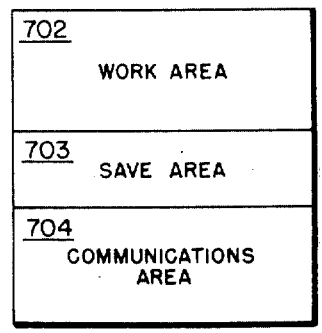

A stack frame 701 of FIG. 7B consists of three areas: a work area 702 in which to store variables, a save area 703 in which to save the contents of registers, and a communications area 704 in which to pass parameters between procedures. Prior to a procedure call, the user must specify those registers he wishes saved and he must load into the communications area the parameters to be passed to the called procedure. When the call is made, the hardware saves the contents of the instruction counter IC and specified base registers to facilitate a return from the called procedure.

Each procedure call creates a stack frame within a stack segment 701 and subsequent nested calls create additional frames. Each exit from one of these called procedures causes a stack frame to be deleted from the stack. Thus, a history of calls is maintained which facilitates orderly returns.

To insure protection between procedures executing in different rings, different stack segments are used. There is one stack segment corresponding to each protection ring per process. A PCB contains three stack base words which point to the start of the stack segments for rings 0, 1 and 2 associated with the process. The ring 3 stack segment can never be entered by an inward call; therefore, its stack starting address is not required in the PCB.

4. PROCESS MANAGEMENT AND SYNCHRONIZATION

The system herein provides for multiprocessing operations which are controlled by an operating system using a combination of software, hardware and firmware. Software creates and deletes processes within the system while hardware and firmware multiplex processes on the CPU. In addition, a combination of software, hardware and firmware provide for synchronization between processes.

Processes are normally, but not always, started and stopped at the initiation and termination of i/o operations, during related job handling, and at other times for purposes deemed necessary by the operating system. Therefore, a communications system is necessary to efficiently start and stop related processes and to pass information between them. The hardware system herein provides internal messages called semaphores to provide a communications link between the processes.

A. PROCESS STATES

A process can be in one of four possible states at any time: running, ready, waiting or suspended. The hardware recognizes these four possible process states and executes various firmware procedures to effect process dispatching, state changes and to maintain data structures based on a process's state. The PCB contains a state field which defines the current state of its associated process.

A process is in the running state when it has control of the CPU. This state involves supplying the CPU with an address space (segment tables) and a starting address. The CPU then executes instructions in the procedure segments of the process. The process name J table word (logical address) of the PCB for the currently running process is retained in the running process word (BAR +60) within the system base (FIG. 6). (Note: The system base shown in FIG. 5 is the same as that shown in FIG. 6, but with some details omitted.)

The ready state is equivalent to running state except that the process does not have control of the CPU because it has not been recognized by the CPU. A process in the ready state is in contention for the CPU with other ready processes and the running process.

A process is in the wait state when it cannot continue until a specific event occurs such as a message via a semaphore. A waiting process is not in contention for the CPU but it may be in contention with other waiting processes for the required event.

A suspended process is a process which has been stopped for a time by software and may be resumed later. The decision to stop and resume the process is external to the process. Thus, a suspended process is not active and therefore cannot receive notification of event occurrences and cannot utilize the CPU.

A process is suspended under the following conditions:

1. By executing a Terminate instruction (as a result of having completed all its functions).
2. By execution of a Suspend instruction by the operating system.
3. By the occurrence of an exception condition whereby control is transferred to the operating system.

B. PROCESS DISPATCHING

Processes move from one state ot another voluntarily by action of the process while running or involuntarily by the actions of other processes. CPU firmware, known as the dispatcher, controls the transaction of processes between states. The dispatcher uses a set of queues (to be later described) to manipulate processes which are in the ready or the waiting states. Suspended processes are controlled by software.

Figure 8:
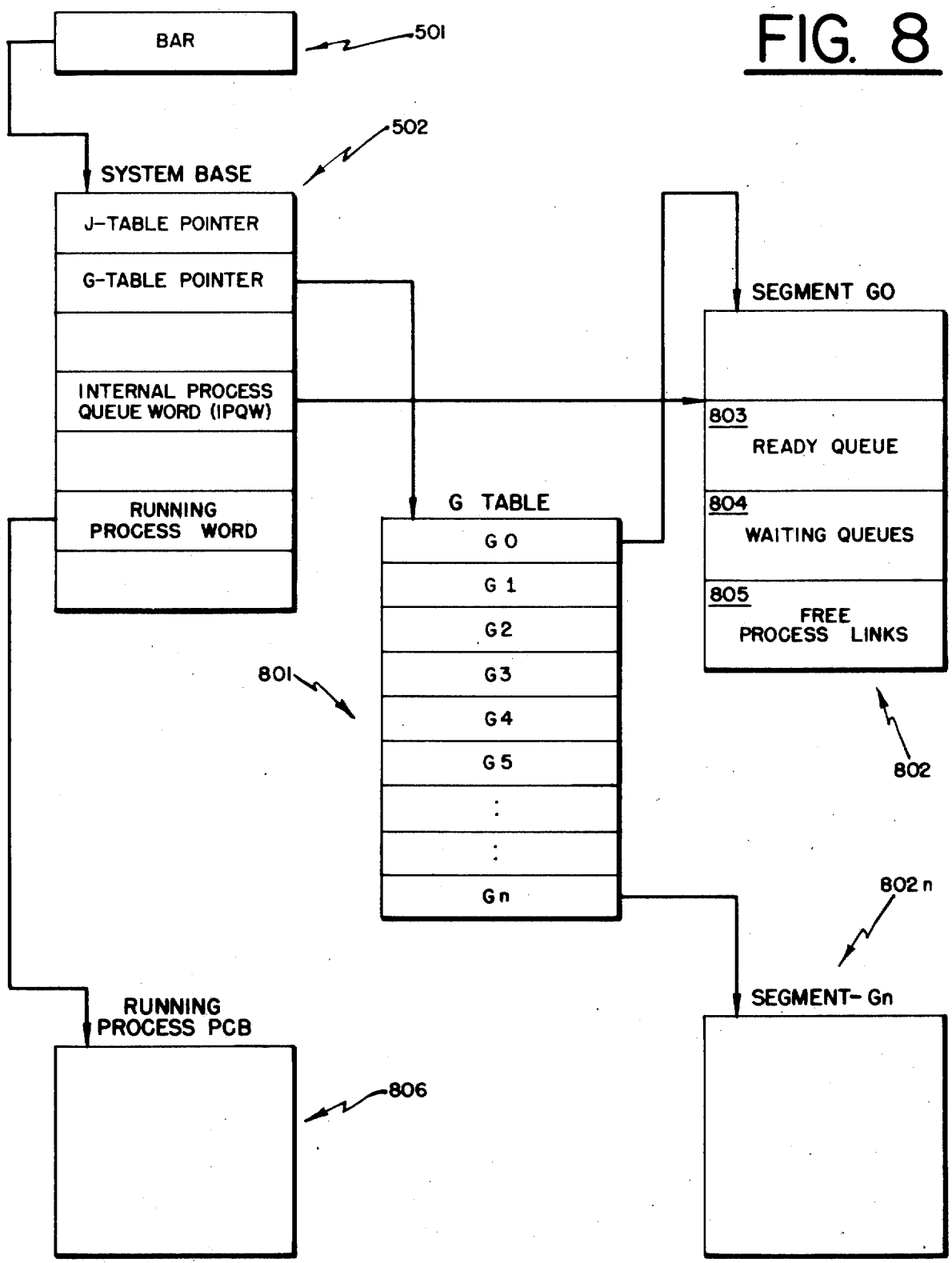
FIG. 8 is a schematic diagram of a system for addressing G-segments and in particular the queue of processes in the G-O segment of a computer system utilizing the invention.

Referring to FIGS. 6, 8 and 9, a ready or waiting process is represented by a PCB and a special queue entry called a process link. FIG. 9 shows an exploded view of contents of the G0 segment 802, and contains process links 803a–803b and 803c–803g of active processes, and free process links 805a–805c of suspended processes. Each process link specifies the process name (J, P), the process priority and a pointer to the next process link in the queue. There are various types of queues such as wait queue 803a–b and ready queue 803c–g.

A hardware device similar to the J table, known as the G table, (FIGS. 6 and 8) contains pointers to all general (known system wide) segments 802–802n. The first element, G0, of the G table 801 points to that segment 802 containing the dispatcher queues. A G-table pointer to the G table 801 is found in the system base 502 on FIG. 5. Also in the system base is an entry called the internal process queue word (IPQW) which identifies the head 805 of the ready queue 803c–803g in the G0 segment 802.

Thus, the dispatcher can examine all ready processes processes by consulting the ready queue 803c–803g. When the currently running process changes states, the dispatcher removes the process link at the head of the ready queue and uses the J, P name to access its PCB. The process defined by the PCB then becomes the new running process.

Since more than one process may be awaiting on the same event, a queue of waiting processes 803a–803b exists for each event. Waiting processes are also strung together via process links 805 residing in the G0 segment. A pointer to the head of a wait queue exists in a semaphore 903 (to be later described). A number of events exist for which a process may wait; therefore, there are a number of wait queues each of which has an associated semaphore 903, 904.

The number of processes ready or waiting varies dynamically. Thus, the number of process links required for the ready and wait queues also varies. This fact introduces a memory management problem for the dispatcher. The problem is solved by another queue called the free process link queue 805a–c. This queue links together all process links in segment G0 that are not being used by the ready or the wait queues and can be used to extend a particular queue of ready or waiting processes. A pointer 901 to the head 902 of the free process link queue 805 resides near the beginning of the G0 segment 802.

C. PROCESS SYNCHRONIZATION

Process synchronization is required to coordinate the activities of two processes working on the same task. The synchronization is achieved using semaphores 903–904 which are data structures residing in the address space of communicating processes. A semaphor is used to signal event occurrence and to handle queues of messages. An event in this context is anything observed by a process which may be of interest to some other process. The event may be the completion of an asynchronous operation or the availability of a resource.

A process uses two semaphore operations to signal an event occurrence. One operation sends a signal to a semaphore; the other picks up a signal from a semaphore. (The sending operation is often called a V-operation; the receiving operation is called a P-operation). The sending operation allows a process to send data or a signal that data are ready. The semaphore stores the signal until another process is ready to pick it up. Thus, the sending process is free to proceed, since it has sent the data. The receiving operation examines a specified semaphore and picks up the signal. If a signal is present, the receiving process continues executing. However, if there is no signal at the semaphore, the receiving process enters the wait state. The semaphore then serves as a pointer to the head of a wait queue. The process remains in the wait state queued at the semaphore until another process sends a signal to that particular semaphore. Thus, a semaphore can hold a signal until a process picks it up, or a semaphore can hold a process until a signal is sent to it.

Messages can also be passed from process to process. A message has the same present or not present quality as a signal plus additional information. Part of the information is supplied by hardware and part is supplied by the procedure of the process that sent the message. A message carries the process name of the sending process. Thus, many processes can send information through a single semaphore stamped with the sender's name.

A message semaphore may have a queue of messages waiting to be picked up by processes. As with signal semaphores, requirements for memory space increases and decreases thus presenting a memory management problem. Again, the problem is solved with a queue of free message links. These links reside in a known place in a segment that can easily be found when needed to supply or absorb message links.

Because semaphores and the queues built on them are shared by different processes, the total semaphore structure is protected. This is accomplished by hardware and software conventions that restrict access to any segment containing semaphores. Thus, semaphores must be in semaphore descriptor segments, some of which may be G segments (if system communications is necessary). However, all G segments (except G0) are semaphore descriptor segments.

Each semaphore descriptor contains a pointer to a semaphore. Semaphore addresses are developed via a semaphore descriptor, thus providing added protection for the semaphore. A semaphore segment can be addressed logically using a segment number and a relative location within the segment or directly using the G, D number.

E. PROCESS CONTROL BLOCK STRUCTURES

Referring to FIG. 4 there is shown the format of the process control block (PCB). The process control block 400 is a storage area in main memory made available to a process to save the CPU status. Addressing a PCB is performed as described supra in relation with FIG. 5. The PCB pointer 507 (FIG. 5) points to the process control block PCB at memory location 0 on FIG. 4. It will be noted that proceeding in a downward direction memory locations increase by 4 bytes whereas in proceeding in an upward direction from memory location 0 they increase by 8 bytes. The downward memory locations are considered positive from 0 whereas the locations in an upward direction from 0 are considered negative directions. The upward locations are optional and may or may not be included in the process control block; also locations 148 through 176 are also optional. (Note that the numerals under memory location specify the displacement in bytes from the 0 reference location of the process control block PCB and are not to be confused with the reference numerals commonly used to identify parts in a patent drawing). Starting at byte 0 up to but not including byte 16 there are stored four process main words PMW 0 through PMW 3 with each process main word PMW being four bytes in length. Process main word 0 occupies bytes 0 through 3 and is comprised of 4 parts: a capability byte, a priority byte, a state byte and a decor extension byte DEXT. Referring to FIGS. 10a through 10d there are shown details of process main word PMW 0, with further details of the capability byte 1001 shown on FIG. 10b. Referring to FIG. 10b, the first bit 1005 is the accounting mode bit for indicating whether or not time accounting functions are being performed for the process. When the accounting mode bit 1005 is set to binary 0 no time accounting function is being performed for the process; whereas when the accounting mode 1005 is set to binary 1, time accounting is being performed. The scientific mode bit 1006, when set to zero, indicates that saving of scientific register of the machine is not performed and the scientific register saving area located at bytes 148 to 176 on FIG. 4 does not exist in the process control block PCB. When the scientific mode bit 1006, is set to binary 1, the scientific optional feature exists and is being used in the process, and the scientific registers saving area is used to save the contents of the scientific registers when necessary. The code mode bit 1007 indicates whether or not a standard code set or compatibility code set is being used by the process, with a binary 0 in that position indicating that standard code set is being used; whereas a binary 1 in the third bit position 1007 indicates a compatibility code set is being used. The remaining of the bits of the capability byte are set to zero.

Details of the priority byte 1002 are shown on FIG. 10c. Referring to FIG. 10c the first four bits 1008 of priority byte 1002 is utilized to set the priority level of the process associated with that given process control block PCB. Each process is assigned one of 16 levels of priority which is used for ordering competing processes i.e. (a) for choosing the process to be run among ready processes, (b) for putting processes in queues. Priorities decrease from 0 to 15, and for a given priority level the FIFO (first in first out) rule is applied. The next 4 bits 1009 of priority byte 1002 are zeroes.

Referring to FIG. 10d details of the state byte 1003 are shown. A state byte is utilized to provide information with regard to the process associated with the process control block PCB 400. The active field bit A 1010 is set to binary 1 when the process is activated. The suspend field S 1011 is set to binary 1 when the process is suspended. The substate field SS 1012 is a 2 bit field and defines the following substates of the process: (a) when set to binary 00 the process is inactive; (b) when set to binary 01 the process is waiting in the queue of ready process (Q/PR/RDY); (c) when set to binary 10 the process is waiting on a semaphore in a queue of semaphores (Q/PR/S); (d) when set to binary 11 the process is being executed by the processor. The mid-operation field (MOI) 1013 is set to binary 1 when an interrupt happens and is taken care of during the execution of an instruction—i.e. before the completion of the process. The extended decor mode bit EXTD 1014 is set to 1 when the process is operated in an extended decor mode which is an emulation mode of the machine. Bits 1015 and 1016 are set to 0. The fourth byte of process main word PMMW 0 contains the decor extension number and is utilized when the system is in emulation mode.

Process main word PMW 1 is stored in bytes 4–7 of the process control block PCB. Details of PMW 1 is shown on FIG. 10e. The status byte 1016 is the first byte in PMW 1 and stores the status register contents. The multiprocessor byte MP 1018 is significant in a multiprocessor architecture otherwise this field is zero. The second and fourth bytes of process main word 1 are the MBZ fields 1017 and 1019 respectively which must be zero for normal operation.

Process main word PMW 2 occupies bytes 8 through 11 of the process control block and is shown in more detail on FIG. 10f. Referring to FIG. 10f the field from bit 4 through bit 31 contains the local name SEG, SRA 1021 of the semaphore to which the PCB is linked when the process is either in the waiting or suspended states. The exception class and type field 1023 contains the class and the type of the interrupt-like exception which cause the process to enter the suspended state after an exception. The field from bits 4 through 15 is meaningless 1022 when a process is in a different state than those mentioned above.

Process main word PMW 3 occupies bytes 12 through 15 in PCB 400 and points to a decor extension table. Referring to FIG. 10g for details of PMW 3 the DETSZ field 1024 defines the number of entries in the table and if this field is zero no decor extension is allowed to the process. The DETA field 1025 is the absolute address of the decor extension table in units of 16 bytes and is significant only if DETSZ is not 0. The decor extension table is made up of DETSZ entries. Each entry is one byte size. The $DEXT^{th}$ entry of the table defines the capability of the process to operate in the decor extension mode DEXT. When the $DEXT^{th}$ byte is 0 the decor extension number DEXT is not allowed, whereas if the $DEXT^{th}$ byte is 1 the decor extension number DEXT is allowed. Values of DEXT other than 0 and 1 are illegal. (See FIGS. 10a DEXT number 1004).

Bytes 16 through 23 of PCB 400 contains 2 address space words ASW 0 and ASW 1 respectively and each ASW contains a pointer to an array of segment table words. Both ASW 0 and ASW 1 respectively have the same format shown on FIG. 10h. The size of the array of the segment table words is defined by the number of segment table words in an array and typically comprises six for ASW 0 and eight for ASW 1. The STWSZ field 1026 indicates the size of the array of the segment table words. The segment table word array field STWA 1027 contains the absolute address STWA of the array in units of 16 bytes—i.e. the absolute address of the array is 16 times STWA in bytes.

Bytes 24 through 27 in the PCB contain an exception word EXW shown in greater detail on FIG. 10. The exception word contains a pointer (SEQ, SRA) 1029 to an exception class table which defines the action i. be taken following a process exception according to its class as stored in process main word PMW 2. (See FIG. 10f). The MBZ field 1028 of exception word EMW must be 0.

The stack word SKW located in bytes 28 through 31 of the PCB contains the value of the top of the T register of the stack of the process when the process is not running and is shown in greater detail in FIG. 10j. Referring to FIG. 10j, bits 0 and 1 define the TAG field 1030. The TAG indicates the type of descriptor by its contents and must be zero for SKW. Bits 2 nd 3 of the SKW word contain the RING field 1031 which contains the ring number associated with the segmented address of the stack for protection purposes and in this case must be zero. Bits 4 through 31 contain the segment number SEG, and the segment relative address SRA 1032 and is a field which identifies the segment described in a segment table and the segment relative address within the segment. The stack word SKW is updated every time the process leaves the running state. It is used to restore the T register contents every time the process becomes running. In this last case the TAG 1030 and RING 1031 are tested to be zero, otherwise an illegal PCB exception occurs.

Bytes 32 through 35 of the PCB 400 contain the instruction counter content word ICW sometimes also referred to as ICC. Referring to FIG. 10k there are shown details of the instruction counter word ICW wherein the TAG field 1033 must contain binary 00 (i.e. values other than zero are illegal in the instruction counter). The current RING field 1034 occupying bits 2 and 3 defines the current ring number of the process to be used in determination of access rights to main storage. Bits 4 through 31 define the segment number and the segment relative address (SEG, SRA) 1035 which define the address of the next instruction to be executed.

The MBZ field in bytes 36 through 39 must be zero. (Note the MBZ field always indicates a field which must be zero). The MBZ word is tested every time the PCB is accessed from the name J, P. If it is not zero an illegal PCB exception occurs.

Stack base words SBW 0–2 occupy bytes 40–51 in the process control block 400. These words have the same format which is shown in greater detail on FIG. 10 1. They are utilized during stack operations and whenever used their TAG field 1036 and RING field 1037 must be zero otherwise an illegal PCB exception occurs. Bits 4 through 31 contain the segmented address (SEG, SRA) 1038 of the first bytes of the stack segments for ring zero, 1 and 2 respectively.

Bytes 52 through 83 of the process control block 400 is a space reserved for the base registers saving area (8 words). Bytes 84 through 147 is a saving area which is utilized to save the values of all general registers (16 words). Bytes 148 through 179 is a saving area which is utilized to save the scientific registers (8 words).

Five double words are provided in the PCB 400 above the PCB zero address, for time accounting purposes when the accounting mode bit in the PMW 0 word is set. These words are located from PCB address minus 8 to PCB address minus 40. Each word contains a time or a time interval expressed in microsecond units in its first 52 bits with bits 52–63 filled with zeroes. The residual time out double word RTO (first 8 bytes above 0 in the PCB) contains the quantum of time which is actually spent by the processor on behalf of the process before a time out exception occurs. The RTO word is updated in the following way: each time the process exits the running state the process timer value is stored in the RTO word. Each time the process enters the running state, the process timer value is loaded from the RTO.

The running time accounting RUA double word at bytes 7 through 15 is a time counter which specifies the total amount of processor time a process was in the running state. The time accounted for is the time actually spent by the processor on behalf of the process exclusively. The RUA word is updated in the following way: each time the process exits the running state, the value of the process timer PT is read. The difference of the contents of RTO and PT is added to RUA. (Consecutively, the PT value is stored in RTO). Note that the time during which the process is suspended is not computed. The RTO and RUA words are updated even if the accounting mode bit is set to 0. However the CET, RTA, and WTA words (to be later described) are provided in the process control block only if the accounting mode bit in the process main word PMW 0 is set to 1. They are updated only in this case.

The waiting time accounting WTA word at bytes 17 through 23 is a real time counter which specifies the total amount of real time the process was in the waiting state. The WTA word is updated in the following way: each time the process exits the waiting state the time of day clock (not shown) value TOD is read and the value of TOD minus the value of CET word is added to the WTA word.

The ready time accounting RTA word located at bytes 24 through 31 is a double word which is a real time counter which specifies the total amount of real time the process was in the ready state. The RTA is updated in the following way: each time the process exits the ready state, the t.me of day clock value TOD is read, and the contents of TOD minus the contents of CET is added to RTA.

The current entry time CET double word at bytes 32 through 39 contains the time of day at which the process entered one of the following states: ready, waiting, running, and suspended.

Figure 11A:
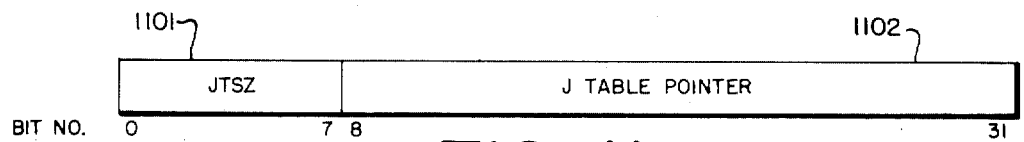
FIGS. 11A through 11R are block diagrams of structures in the system base.
Figure 11B:
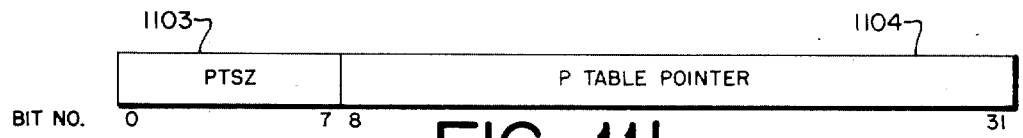
Figure 11C:
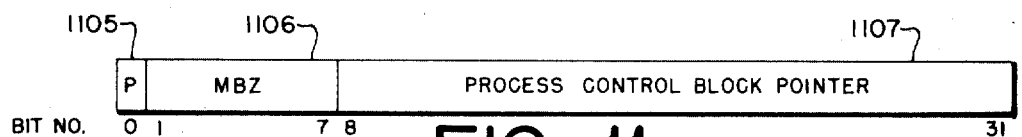

SYSTEM BASE STRUCTURES:

Referring to FIG. 6 the format of the system base 600 is shown. The system base resides in absolute main memory and is developed by firmware and is accessible via the boundary address register (BAR) which can be read but not written. The boundary address register BAR is below an area in main memory reserved for hardwave and separates this area in memory reserved for hardware and the system base 600. Referring now to FIG. 6 the system base 600 contains a number of system attributes which includes a job step number and a process group number (J, P) for the currently running process. From the logical name of the process J, P, the absolute address of the corresponding process control block PCB is obtained. The size and address of the J table are defined by the contents of the J table word (JTW). This word is located at the address defined by the BAR register. The format of the JTW is shown on FIG. 11a. The size (JTSZ) 1101 or the J table 1204 on FIG. 12 defines the number of entries in the J table 1204 which may be up to 255 entries. The JTSZ 1101 is an 8 bit positive integer; an out of J table exception occurs if J is greater than JTSZ. The absolute address of the J table 1204 is obtained by multiplying the J table pointer 1102 by 16. The J table 1204 contains J table entries whose format is shown in greater detail on FIG. 11b. Each J table entry defines the absolute address of a P table 1205 which is obtained by multiplying the P table pointer 1104 by 16. The size (PTSZ) 1103 of a P table defines the number of entries in the P table. The PTSZ is an 8 bit positive integer which may typically vary from 0 to 255 to indicate the number of entries in the P table. An out of P table exception occurs if P is greater than PTSZ. Each entry of the P table 1205 defines the absolute address of a process control block (PCB) 1206 by multiplying the process control block pointer 1107 by 16. A presence indicator P 1105 indicates the absence of a PCB 1206 when set to binary 0 and indicates the presence of a PCB when set to binary 1. (When the presence indicator P 1105 is found to be 0 a vacant P table entry exception occurs). Bits 1 through 7 of the P table indicator (FIG. 11c) must be 0 (MBZ) 1106, otherwise an illegal P table entry exception occurs.

Figure 11D:
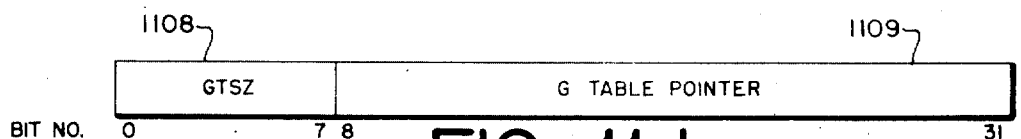
Figure 11E:
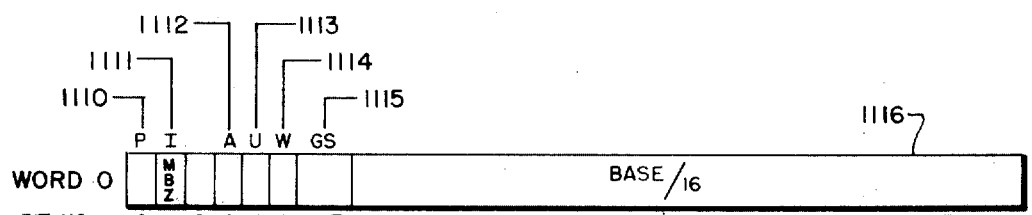
Figure 11F:
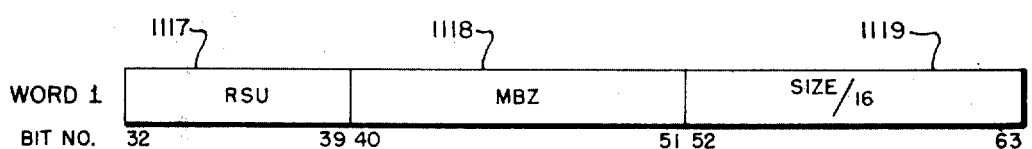

At address BAR plus 4 of the system base 600 there is the format byte of a G table word (GTW) shown in greater detail on FIG. 11d. The size and the address of a G segment-table 1212 on FIG. 1200 are defined by the contents of the G table word (GTW). The size (GTSZ) 1108 of the G table 1212 defines the number of entries in the G table which may typically be up to 255 entries. GTSZ is an 8 bit positive integer; an out of G table exception occurs if the G number is greater than the GTSZ. The absolute address of the G table 1212 is obtained by multiplying the G table pointer 1109 by 16. The format of the G segment table entry has a two word size (8 bytes) and is called a G segment descriptor. The format of the G segment descriptor is shown in detail on FIGS. 11e and 11f. All G segment descriptors are direct and therefore the indirect bit I, 1111 must be 0 otherwise an illegal segment descriptor exception occurs. The presence indicator P 1110 is a one bit field which when set to binary 1 indicates that a segment is defined in main storage for the segment number to which that descriptor corresponds; whereas if it cleared to 0 no segment is defined and a reference to the segment descriptor causes a missing segment exception. The available bit A 1112 is a one bit field which indicates whether or not the segment is available; it is only checked if this segment is defined (i.e. P equals binary 1), otherwise it is ignored. The used flag field U 1113 indicates whether or not the segment has been accessed. If the U bit is set to binary 0 the segment has not been accessed; whereas if the U field is set to binary 1 the segment has been accessed. The written flag field W 1114 indicates whether the segment has been written. If W is set to binary 0 the segment has not been written; whereas if W is set to binary 1 the segment has been written. The gating indicator GS 1115 of a G segment descriptor must be set to binary 01, otherwise an illegal segment descriptor exception occurs. The reason for this is that a G segment always contains semaphores (although the reverse is not true i.e. all semaphores are not required to be in a G segment) and instructions on semaphores require the GS code to be binary 01. The absolute address of the base of a segment 1214 is defined in the G segment descriptor of FIG. 11e by the 24 bit base field 1116; the content of this field is multiplied by 16 to obtain the absolute address. The second word of the G segment descriptor of FIG. 11f occupies bit position 32 through 63 in the G table 1212. The RSU filed 1117, bits 32 through 39 is reserved for software use and is generally ignored when used as a G segment descriptor as it is in this case. The MBZ field 1118 must be 0 otherwise an illegal segment exception occurs. Since the MBZ field 1118 occupies bits 40 through 51 it sets the SIZE field 1119 which is the field for a small segment SIZE; hence all G segments must be of the small segment type. The segment SIZE 1119 is a 12 bit positive integer defining the number of bytes in the segment and the segment size is interpreted as a multiple of 16. Therefore the segment size for a G segment 1214 cannot exceed $2^{16}$ bytes (small segments). If a displacement D within a G segment is referenced where D is greater than or equal to SIZE 1119, an out of segment exception occurs. The method of accessing main memory which uses a G segment and a displacement D within that segment is called G, D accessing. The various exceptions which may occur during G, D memory operations are referred to as G, D access exceptions.

Referring once again to the system base 600 of FIG. 6 there are 9 system exception cell words located between BAR plus 8 and BAR plus 44. The format of the system exception cell words EXC is shown on FIG. 11g. Since semaphores are utilized for transmitting messages to dedicated processes when a system exception occurs the pointers to these semaphores are found in 9 locations of memory each location called a system exception cell—one per class of system exception. The MBZ field 1120 must be set to binary 0 otherwise a system check occurs. Each exception cell (EXC) contains the system name G, D 1121 and 1122 respectively.

The channel exception cell located in BAR plus 44 of the system base 600 has a format which is similar to the system exception cell previously discussed and contains the system name GD of a semaphore which is used for transmitting messages to dedicated processes when a channel exception occurs.

In internal processor quene word IPQW is located beginning at BAR plus 48 and details of its format are shown on FIG. 11h. The IPQW word points to the head of a queue of processes ready (Q/PR/RDY) as shown on FIG. 9 by reference numerals 905 and 805. The queue of processes ready (Q/PR/RDY) links all processes which are in the ready state. It is referenced by the HEAD of Q/PR/RDY-field 1124 (FIG. 11h) of the IPQW word by pointing to the top of the ready process quene. The HEAD of Q/PR/RDY-field 1124 contains a 16 bit positive integer which is the displacement from the base of the G segment number 0, referred to as the G0 segment, to the first byte of Q/PR/RDY. If this Q/PR/RDY bit field is 0, the ready queue is considered to be empty. The MBZ field 1123 must be 0 otherwise a system check occurs.

At BAR plus 52 of the system base 600 there is shown the storage for the initial and current retry counts whose format is shown in detail of FIG. 11i. The NFS field 1125 is a nonfunctional storage field and is not utilized by the system base. The initial retry count field 1126 and the current retry count field 1127 are used to control the number of times automatic instruction retry is executed before a machine error is made to produce a machine failure exception condition. They are loaded with the same number by a Reset Retry Count (not shown herein).

The running process word (RPW), shown in FIG. 11j, is stored in BAR plus 56 of the system bare 600 and is used to store the name of the running process with its priority in case of monoprocessor architecture. The NFS fields 1128 and 1131 respectively are nonfunctional storage fields and may be utilized for any purpose by any facility but is generally not utilized by the system base. The priority level of a running process is stored in the PRI field 1129. An asynchronous trap bit is stored in AB field 1130; whereas an asynchronous trap ring is stored in ARN field 1132. The logical name J, P of the running process in case of a monoprocessor architecture is stored in the J, P field 1133.

An Absolutization Table Pointer word shown on FIG. 11k is located at BAR plus 60 in the system base 600 and is utilized in initial system load to initialize the absolute addresses in the initial system load (ISL) program by adding the contents of BAR to all absolute addresses in the ISL program. The Abslutization Table Pointer 1135 defines the location of an Abslutization Table (not shown). The Absolutization Table Size is shown by th ATSZ field 1134.

The CPU serial number word shown on FIG. 11 1 is a 4 byte word located at BAR plus 64 and contains the serial number of the CPU in the CPU serial number field 1136.

Figure 11M:
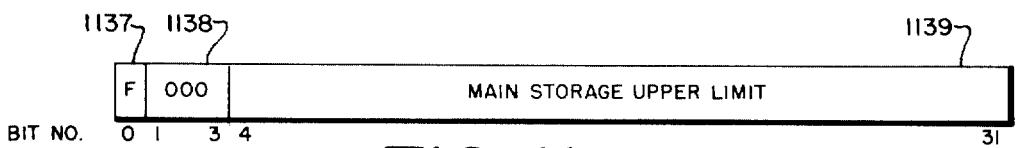

A main storage upper limit word shown on FIG. 11m is located at BAR plus 68 and indicates the main storage upper limit 1139 by providing the absolute address of the last available word in main storage.

Figure 11N:
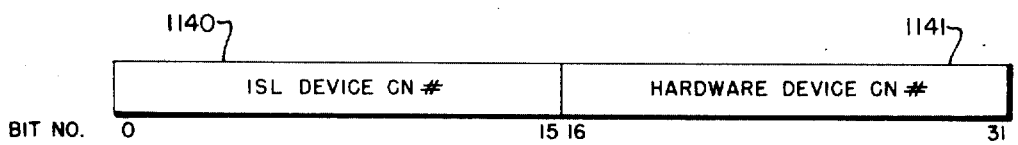
Figure 11O:
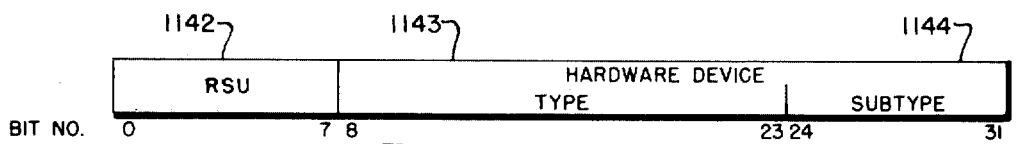
Figure 11P:
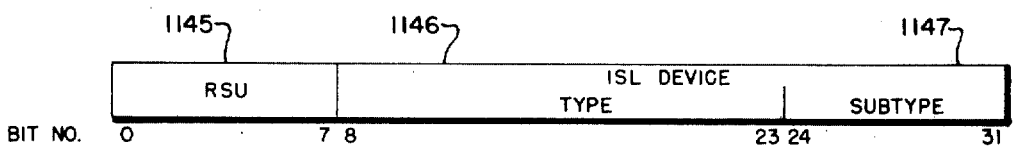
Figure 11Q:
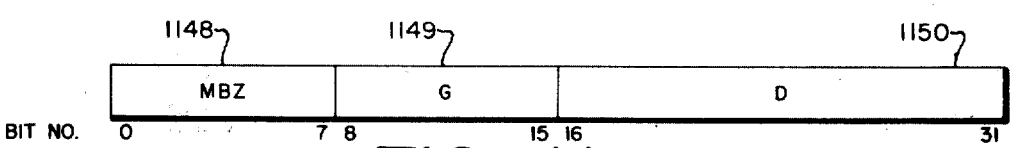
Figure 11R:

At BAR plus 72 there is located a word shown on FIG. 11n for providing the initial system load ISL device channel number (CN) 1140 and the hardware device channel number (CN) 1141.

The type and subtype of a device used in the computer system is shown by a hardware device type word (FIG. 11o) in fields 1143 and 1144 respectively, where the RSU field 1142 is reserved for software. This word is found in the system base at BAR plus 76. A similar word having a similar type format shown on FIG. 11p contains the type and subtype of the device used in the initial system load. The word is located at BAR plus 80.

When the restart button of a computer is pressed, a simulated V-operation is performed on a semaphore and the Ready state is entered. A pointer to this seamaphore is found at BAR plus 84 of the system base 600 and is called a restart cell word, and has a format shown on FIG. 11q. The format is similar to the system exception cell described supra and contains the system name G, D of a semaphore in the G field 1149 and D field 1150 respectively. The MBZ field 1148 must be 0.

Where there is moe than one processor to the computer system, a word is provided in the system base 600 at BAR plus 88 for multiprocess extension. Details of this word are shown on FIG. 11r.

Examples of System Base and Process Control Block Use

Figure 12:
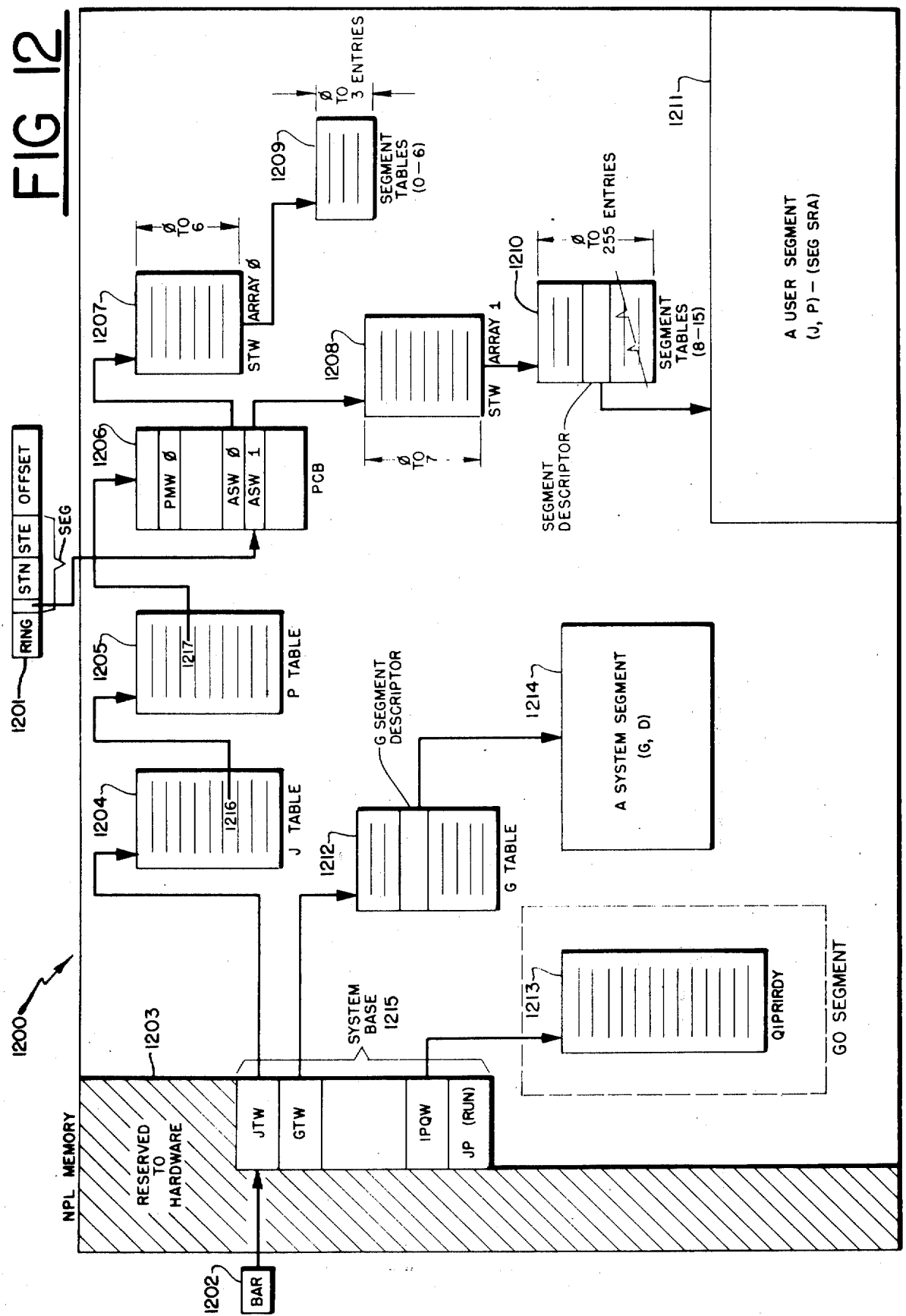
FIG. 12 is a schematic diagram of addressing schemes of user and system segments utilizing the system base and PCB structures.

Referring to FIG. 12 there is shown one example, how the system base may be utilized in combination with the process control block in order to address and access a user segment, a system segment, or a quene of processes ready (Q/PR/RDY) segment. Main memory 1200 has a portion 1203 reserved for hardware use. A boundary address register BAR 1202 separates the system base 1215 from the portion of memory 1203 reserved for hardware. The boundary address register BAR 1202 is utilized to address items in the system base 1215 by adding the contents of the boundary address register to the displacement in 4 byte units of the item desired in the system base. This address then points to the first byte of the item in the system base desired. In FIG. 12 the BAR 1202 is pointing at the J table word (JTW). The J table word, as previously discussed, has a pointer which points to a J table 1204. By indexing to the J number shown on FIG. 5, a J table entry 1216 is obtained. At the J table entry there is a P table pointer which points to the absolute address of the P table 1205. By indexing to the P number (see FIG. 5) within P table 1205 the absolute address of the process control block 1206 is obtained As previously shown in process control block PCB 1206 there are two address space words ASW 0 and ASW 1. The high order bits of the segment table number field STN in the base register 1201 is used to access one of these two address space words, in this instance ASW 1 which has a segment table word array STWA pointer that points to segment table word array STWA 1208. Together with the segment table number STN of the base register 1201 one of 8 segment table words is accessed in STWA 1208, which points to one of 8 segment tables 1210. The segment table entry STE from base register 1201 is then utilized to make one of 256 entries in segment table 1210 whre a segment descriptor is located. The segment descriptor is then utilized to access a user segment 1211. (For greater detail see Application Ser. No. 425,356 filed on Dec. 17, 1973, entitled "Apparatus for Developing an Address of a Segment within Main Memory and an Absolute Address of an Operand within the Segment", and now issued as U.S. Pat. No. 3,938,096 on Feb. 10, 1976).

In order to access a system segment 1214 which is utilized to store semaphores a G table word GTW is utilized in the system base 1215. The address of the G table word is obtained by adding the displacement of the G table word in the system base to the boundary address register BAR 1202. (see FIG. 6). The G table word GTW includes a G table pointer which points to a G table 1212. By utilizing a G number available to the system and indexing in the G table a G segment descriptor is accessed which is utilized to address a system segment 1214.

Similarly the system base 1215 is utilized to access the queue of process ready (Q/PR/RDY) 1213 by locating an internal processor queue word IPQW which points to the Q/PR/RDY segment 1213.

G. Control Unit

Figure 13A:
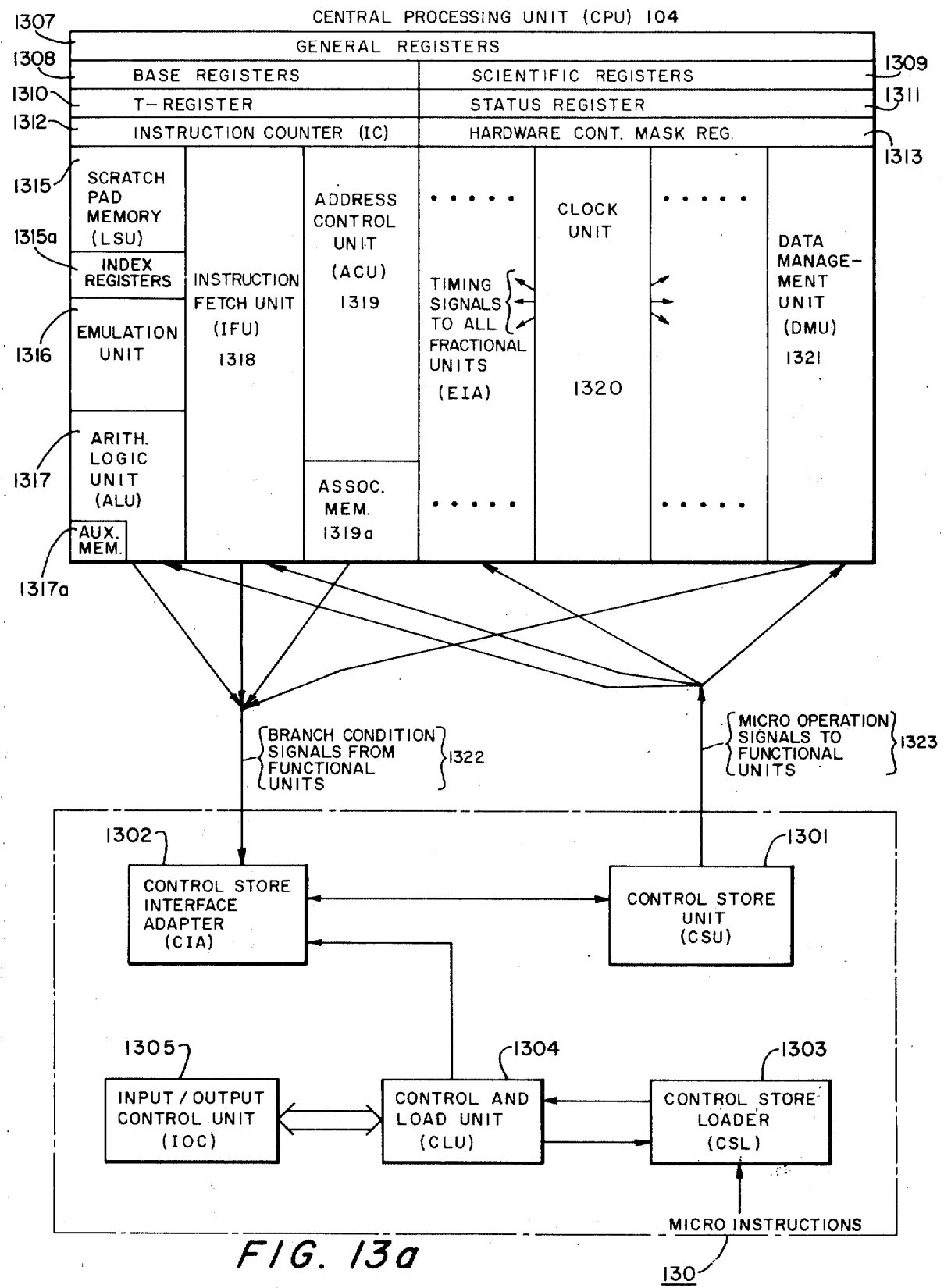
Figure 13B:
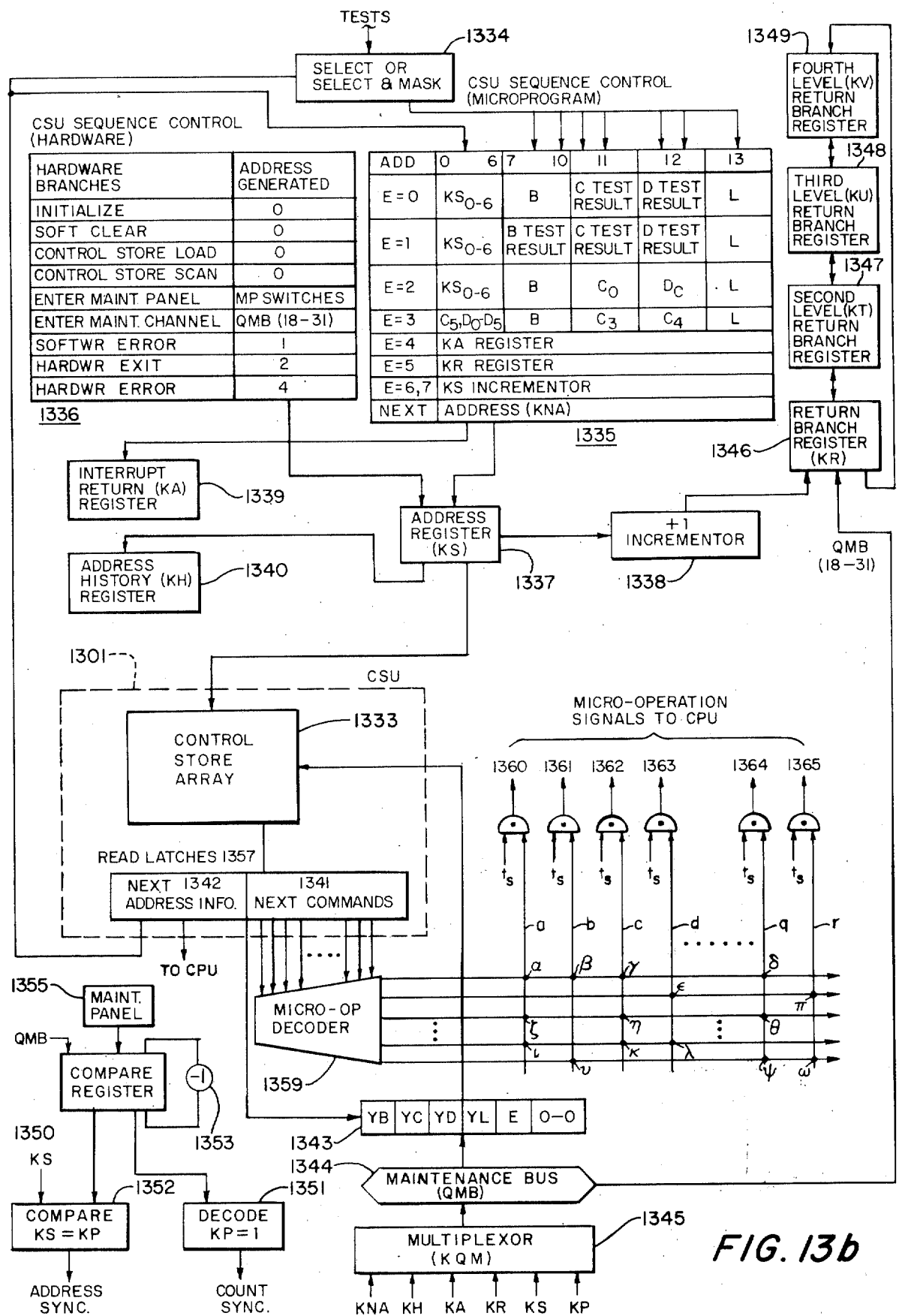
Figures 13C, 14I:
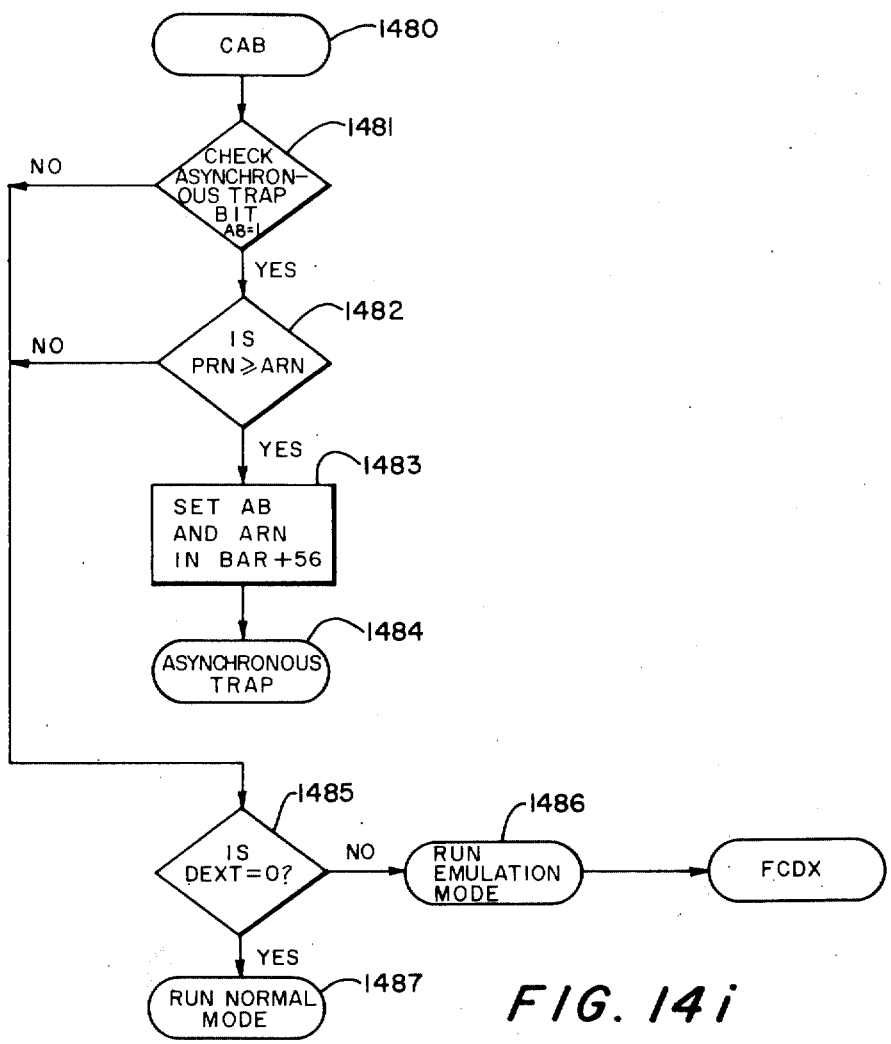

Referring to FIGS. 13a–13c details of the control unit are shown. The control unit, although shown separate from the central processing unit (CPU), is in actuality a part of the CPU and is comprised of a control store unit CSU 1301, a control store interface adapter CIA 1302 and appurtenant subunits, control store loader CSL 1303 and control and load unit CLU 1304.

The control store unit CSU 1301 receives microinstructions from the control store loader CSL 1303 via the control and load unit CLU 1304 and the control store interface adapter CIA 1302. Under normal operating conditions, microprograms are loaded from an external source during system initialization and become a permanent control function of the machine. However the control store unit CSU 1301 has the ability to be reloaded and initialized in a manner that provides for a variety of central processing units CPU 1306 operational modes. The following modes of operation of the CPU are available under control of the CSU 1301; (a) native mode; (b) emulation mode; (c) concurrent native and emulation modes; (d) diagnostic mode. This capability is possible because the microinstructions resident in the CSU are the source of micro-operations used to control the operation of all other CPU functional units such as the emulation unit 1316, the arithmetic logic unit ALU 1317, the instruction fetch unit IFU 1318, the address control unit ACU 1319 and the data management unit DMU 1321. Also shown within the central processing unit CPU 1306 are previously described general registers 1307, base registers 1308, scientific registers 1309, T-registers 1310, status registers 1311, instruction counter IC 1312, and hardware control mask register 1313.

Typically the control store unit CSU 1301 is a 9K bipolar integrated circuit programmable read-only memory (PROM) mixed with read/write random access store (RAM). It has a typical 150 nanosecond read cycle and a 450 nanosecond write cycle. Each location of control store stores one 84-bit micro-instruction word (to be later more fully decribed), and each micro-instruction word controls one CPU cycle. As each location of the control store of the control store unit CSU 1301 is read, its contents are decoded by micro-operation decoders which provide micro-operation control signals each of which causes a specific operation within the CPU to take place (to be later described in detail).

By grouping locations within each micro-instruction word (to be later described in detail) control store sequences are obtained that can perform a specific CPU operation or instruction. As each instruction is initiated by the CPU, certain bits within the op-code areused to determine the control store starting sequence. Testing of certain flops (not shown) which are set or reset by instruction decode functions allows the control store memory to branch to a mre specific sequence when necessary.

The control store interface adapter CIA 1302 communicates with the control store unit 1301, the data management unit DMU 1321, the address control unit ACU 1319, and the arithmetic logic unit ALU 1317 for directing the operation of the control store memory 1333 of FIG. 13b. The CIA 1302 includes logic for control store address modification, testing, error checking, and hardware address generation. Hardware address generation is utilized generally for developing the starting address of error sequences or for the initialization sequence.

The data management unit DMU 1321 provides the interface between the CPU 1306 and the main memory and/or buffer store memory shown on FIG. 1. It is the responsibility of the data management unit to recognize which unit contains the information required by other units and strobe the information into the CPU registers at the proper time. The data management unit DMU also performs the masking during partial write operations.

The instruction fetch unit IFU 1318 interfaces with the DMU 1321, the ACU 1319, the ALU 1317, and the CSU 1301, and is responsible for keeping the CPU supplied with instructions. The instruction fetch unit has the next instruction available in its registers before the completion of the present instruction. To provide this capability, the instruction fetch unit IFU 1318 contains a 12-byte instruction register (not shown) that normally contains more than one instruction. In addition, the IFU, under control of the CSU, requests information (instructions) from main memory before the instruction is actually needed, thus keeping its 12-byte instruction register constantly updated. Instructions are thus prefetched by means of normally unused memory cycles. The instruction fetch unit also decodes each instruction and informs the other units of the instruction's length and format.

The address control unit ACU 1319 communicates with the IFU, ALU, DMU, and the CSU via the CIA. The ACU 1319 is responsible for all address development in the CPU. All operations of the ACU, including transfers to, from, and within the unit, and directed by CSU micro-operation and logic in the unit. The normal cycling of the ACU depends on the types of addresses in the instruction rather than on the type of the instruction. Depending on the address types the ACU may perform different operations for each address in an instruction. The ACU also contains an associative memory 1319a that typically stores the base address of the 8 most recently used memory segments, along with their segment numbers. Each time a memory request is made, the segment number is checked against the associative memory contents to determine if the base address of the segment has already been developed and stored. If the base address is contained in the associative memory 1319a, this address is used in the absolute address development, and a considerable amount of time is saved. If the base address is not contained in the associative memory 1319a it is developed by accessing the main memory tables. However, after the base address of the segment is developed, it is stored in the associative memory, along with the segment number, for future reference.

Interfacing with the ACU, IFU, DMU, and the CSU is the arithmetic and logic unit ALU 1317. Its primary function is to perform the arithmetic operations and data manipulations required of the CPU. The operations of the arithmetic logic unit are completely dependent on micro-operation control signals from the control store unit CSU 1301.

Associated with the ALU 1317 and the CSU 1301 is the scratch pad memory uit LSU 1315, (sometimes referred to also as the local store unit). It is typically comprised of 256-location (32 bits per location) solid state memory and selection an read/write logic for the memory. The scratch pad memory 1315 is used to store CPU control information and maintainability information. In addition, the scratch pad memory 1315 contains working locations which are primarily used for temporary storage of operands and partial results during data manipulation. Also associate with the ALU 1317 is an auxiliary memory 1217a comprised typically of 64 flip-flops for storing miscellaneous states of the computer system.

The CPU also has a clocking unit 1320 and is essentially 2 clocking systems in 1: the first clocking system generates the timing for the control interface adapter CIA 1302 and the second clocking system generates the timing pulses for the operations of the functional unit within the central processing unit.

Referring now to FIG. 13c there is shown the format of the control store word 1325. The control store word is typically 84 bits wide and is divided into 6 main fields:
 a. sequence type field 1326 (3 bits);
 b. branching and/or micro-operations 1327 (23 bits);
 c. constant generation and designation 1328 (14 bits);
 d. data to bus 1329 (8 bits);
 e. micro-operations 1330 (32 bits); and
 f. checking 1331 (4 bits).

The 3-bit E field of the control store word 1325 is used as a sequence control field. There are typically 7 different sequence types and 1 reserved type for the instant computer system. Referring to block 1335 of FIG. 13b, when E field equals binary 0, 1, or 2, the branching field A, B, C, D and L of micro-instruction 1325 is utilized to generate the next address. The first 6 bits of KS register 1337 is utilized together with the B field, a C test results, the D test results and the L field to provide the next address of the next micro-instruction which is then placed in address register KS 1337. When the E field is set to binary 4 (see block 1335) the next address selected is taken from interrupt return register KA 1339. The address stored in the KA register is the one generated by the next address generation logic when the hardware interrupt occurs. When the E field is set to binary 5 a branch is used to initiate a subreturn from a micro-program subroutine. When used, the contents of the return register KR 1346 are used as the next control store address. The return register 1346 is loaded by issuing a control store command which will load present control store address is KS register 1337 plus 1, from incrementor 1338, into the KR register 1346. A one-level-nesting subroutine ability is provided via the KT return branch register 1347. Every time the KR register 1346 is loaded the old contents of the KR register is transferred to the KT register 1347 every time the micro-program return is called; the contents of the KT register will transfer to the KR register. Third level nesting subroutine ability is provided by the KU register 1340; and fourth level nesting subroutine ability is provided by the KV return branch register 1349. When the E field of the control store word is set to binary 6 the next control store word addressed is equal to the present address in KS register 1337 plus 1 in incrementor 1338. When the E field is set to binary 7 the CSU 1301 enters the diagnostic mode and the next address will be the present address plus 1.

In addition to the sequencing control of branching to the next control store address described above and shown in block 1335, there is hardware generated sequence control shown in block 1336 of FIG. 13b. (Note: Blocks 1335 and 1336 are in actuality hardware registers drawn so as to epict the different forms that the microinstruction words may take.) The hardware generated branches are overrinding conditions (such as errors, initialize, control store scan, etc.) which suppress the E field and force a fixed address into the control store address register KS 1337. The branch is made by forcing an interrupt line high (not shown) or one clock period an storing the address which would have been generated under the control of the E field into the KA interrupt return register 1339. A hardware generated address will be placed into the control store address register. Certain hardware/firmware generated interrupts take priority when the interrupt-block flip-flop (not shown) which prevents additional interrupts in their class from being executed until the interrupting condition has been satisfied. A firmware micro-operation exists for controlling the resetting of the interrupt-block flip-flop for those sequences which are under firmware control. Those sequences under hardware control automatically generate a reset of the block-flop at the end of the sequence. The following conditions, listed by priority, exists in this Category; (a) control store load; (b) control store scan; (c) hardware error; (d) software error. The remaining hardware conditions do not set the interrupt block-flop but do cause an immediate action to occur when generated. The following conditions listed by priority, exist in this category;
 a. initialize;
 b. soft-clear;
 c. enter maintenance panel;
 d. enter maintenance panel;
 e. hardware exit.

An initialize signal causes the CSU 1301 to branch to address binary 0, clear hardware resettable errors and execute a control store load operation followed by a control store scan sequence under hardware control. It will also perform system initialize. A soft-clear signal causes the CSU 1301 to branch to address binary 0, clear hardware resettable errors and reset the interrupt block-flop. An enter maintenance panel signal causes the CSU to branch to the address preset in the CSU switches on the maintenance panel (not shown).

An enter maintenance channel signal causes the CSU to branch to an address generated via the maintenance channel (not shown). The address loaded is from maintenance bus QMB 1344, which is part of the maintenance channel, and is right-justified. A hardware exit signal causes the CSU to branch to binary address 2. This sequence is used as a maintenace facility. At th end of the sequence a return is initiated by issuing an E field branch with the E field set to binary 1.

A control store load signal causes the CSU to branch to address binary 0. It also turns off the CSU read-cycle flop (not shown), the system clock 1320, and places the CSU in the load state. In the load state the CSU can be loaded from the control store loader CSL 1303, the IOC 1305, the main memory 102, or the maintenance panel 1355. When loaded from the CSL an automatic scan is generated at the end of the load. When loaded from any other media a scan may be issued by either generating a micro-operation signal or setting the scan switch on the maintenance panel. A control store scan signal causes the CSU to branch to an address binary 0. A control store scan is under hardware control for the duration of the sequence. During the scan the system clock 1320 is off and therefore no commands or tests are executed. At the end of the scan sequence the hardware transfers the contents of the interrupt return register KA to the address register KS, the system clock is turned on and control is returned to the firmware.

A hardware error signal causes the CSU to branch to address binary 4. In the normal processing mode a hardware error detected in any CPU functional unit will activate a hardware error line (not shown). The control store sequence generated will test the system conditions to determine the action to be taken. In the diagnostic mode, error conditions which are hardware detectable are visible to microdiagnostics. The microdiagnostics control the action to be taken. A software error signal on the other hand causes the control store to branch to address binary 1. This address is the start of the software error reporting sequence which is under micro-program control.

Referring once again to FIG. 13c the E field 1326 is a 3 bit field for the branch code as previously described. The branching and/or micro-operation field 1327 is comprised of the A, B, C, D, and L fields (also shown on block 1335 of FIG. 13b) wherein the A field is the upper 6 bits of the next address, the B field is the middle 4 bits of next address of the mask field on 64-way branch, the C field is a 6 bit test field for 1 of 64 tests, the D field is another 6 bit test field for 1 of 64 tests, and the L field is the least significant bit. The K field 1328 is a 14 bit field of which 6 bits are for the constant field, 4 bits are for a constant or steering field, and 4 bits are a steering field for a constant. The data to bus field 1329 is comprised of the QA field having 4 bits for controlling information to the QA portion of the QMB bus 1344 and the QB field has 4 bits for controlling information to the QB portion of the QMB bus 1344. The F field 1330 is a 32 bit field which is coded to generate micro-operation subcommands. The P field 1331 is comprised of 4 bits reserved for checking.

In operation the micro-instruction words are stored in the control store array 1333. During a cycle of operation, the control store array is addressed by the contents of the KS address register 1337. This causes the contents of the location specified by the address to be read into the group of read latches 1357. Portions of the word contents of the read latches are distributed or transferred to storage registers within each of the functional units in the CPU. Each functional unit includes decoding logic circuits for generating the requisite subcommands specified by the control store word under control of the system clock source. In general decoding is performed within each functional unit in the CPU rather than being performed centrally in order to minimize the decoding time and to reduce the number of cables which would be normally required for transmitting command signals if decoding were performed centrally. Additionally, the decoding is done within each unit to avoid timing problems arising from differences in cable delays. Further, by decoding subcommands with each unit, those signals which are representative of certain conditions existing within the functional unit are required for the generation of certain subcommand signals do not have to be returned to the CIA unit 1302. A typical decoder unit 1359 is shown in FIG. 13b as receiving various fields from micro-instruction words and generating micro-operation signals $a, b, c, d, \ldots q, r$. A typical micro-operation decoder 1359 receives commands from a micro-instruction word. The field from the micro-instruction word is decoded and sets one of a plurality of lines $s, t, u, \ldots y, z$ high. A matrix is formed by having predetermined control line impedance coupled to the $s-z$ lines at points $\alpha, \beta, \gamma \ldots \psi, \omega$. Typically then when the field from a micro-instruction is decoded one of the lines $s-z$ goes high. Since the black dots shown in the matrix by Greek letters $\alpha$ through $\omega$ represent impedance coupling between the two sets of lines, any electrical signal propagating along any horizontal wire will be coupled through to propagate along the vertical wire $a-r$ where an impedance coupling (black dot) is indicated. Each vertical line $a-r$ then may be coupled as one input to one each of AND gates 1360-1365. Other input signals may also be coupled to AND gates 1360-1365 including a timing signal $t_s$ from the central timing unit. Accordingly as each timing signal $t_s$ goes high those gates which have all the other input signals high will be enabled and will provide micro-instruction signals to predetermined functional units in the CPU. For example, if a command 1341 from read latch 1357 is decoded and a horizontal line is high the $a, b, c,$ and $q$ vertical control lines will be high and AND gates 1360, 1361, 1362, and 1364, will be enabled as the $t_s$ timing signal is applied to these gates sequentially. Hence the combination in which the vertical control lines are coupled to the horizontal control line at different points represented by the Greek letters $\alpha$ through $\omega$ represent a permanent switching matrix for supplying micro-operation signals to the central processing unit CPU for controlling the functional units within the central processing unit by micro-instructions furnished from the control store array 1333. Thus permanent firmware having an alterability feature can be built into the machine of this invention by merely specifying the sequence of micro-operations that is required as a capability of the computer system.

Under normal conditions data is written into the control store array 1333 via the CPU write-data register also known as the local register YO 1343. A control flop (not shown) defines whether the upper half or lower half of the storage array is to be written. Data from the control and load unit CLU 1304 arrives at the CIA/CSU via the maintenance bus QMB 1344 and is buffered by the storage local register YO 1343 before being written into the control store array 1333. The storage local register 1343 is time shared as both a read and a write local register. The multiplexor KQM 1345 may be controlled by either the maintenance panel 1355 or by microdiagnostics and provides a read out path from the registers connected to it. A compare register KP 1350 is provided for non-functional use and is used mainly for maintenance purposes and is utilized along with compare logic 1352 and decode logic 1351.

H. DISPATCHER FIRMWARE FOR CONTROL OF PROCESSES

The dispatcher is a firmware/hardware unit whose main purpose is to manage the various queues of processes, and to switch between processes and includes the updating of the queues of processes, the process control blocks PCB's, the running process word in the system base and the register of a new process. It also delivers messages to a process which is actually waiting for it on a semaphore (after a V-operation, a simulated V-operation for the IOC or for the exception handler). It also enqueues a message on a semaphore after a P-operation which freed a message link when a process is waiting on the free-link semaphore to deliver its message.

The dispatcher unit further calls on the native mode instructions firmware after the rolling-in of a process executing in native mode, or after a contest if the current process remains running and is executing in native mode. It also calls on decor extension firmware for:

a. a temporary call during the rolling-out of a process executing in that decor extension;

b. a temporary call during the rolling-in of a process executing in that decor extension;

c. a definitive call at the end of the rolling-in of a process executing in that decor extension; and, d. a definitive call after a contest if the current process remains running and is executing in that decor extension.

Moreover the dispatcher places the system in the idle loop when there is no running process.

There are several ways of entering or leaving the dispatcher as follows:

1. The initialization procedure (SIP) provides entry as the last step. (See Patent application Ser. No. 528,814 filed on Dec. 2, 1974, entitled "Arrangement for Initializing a Data Processing System".)

2. The Start and Suspend Instruction provides for the entry into the dispatcher. The Start instruction starts a process and the Suspend instruction terminates a process. (See Patent application Ser. No. 529,253 filed on Dec. 2, 1974, entitled "Process Management Instructions for a Control Processor".

3. The P and V operations provide for entry into the dispatcher. The P op picks up a message from a semaphore and if no message then the process goes into wait state. (See Patent application Ser. No. 529,017 filed on Dec. 2, 1974, entitled "P and V Instruction on Semaphores for Process Synchronization".)

Briefly then, the dispatcher is the main mechanism which manages the processes and accordingly the process control blocks PCB's by deciding which process is to be run and then taking the appropriate action, such as rolling-out the currently running process (i.e. write into the PCB all information relative to the currently running process contained in hardware registers, scratch pad memory, etc.), and rolling-in the new process (i.e. write from the PCB to various hardware registers, scratch pad memory, etc., all information necessary to run the new process.)

Figure 14A:
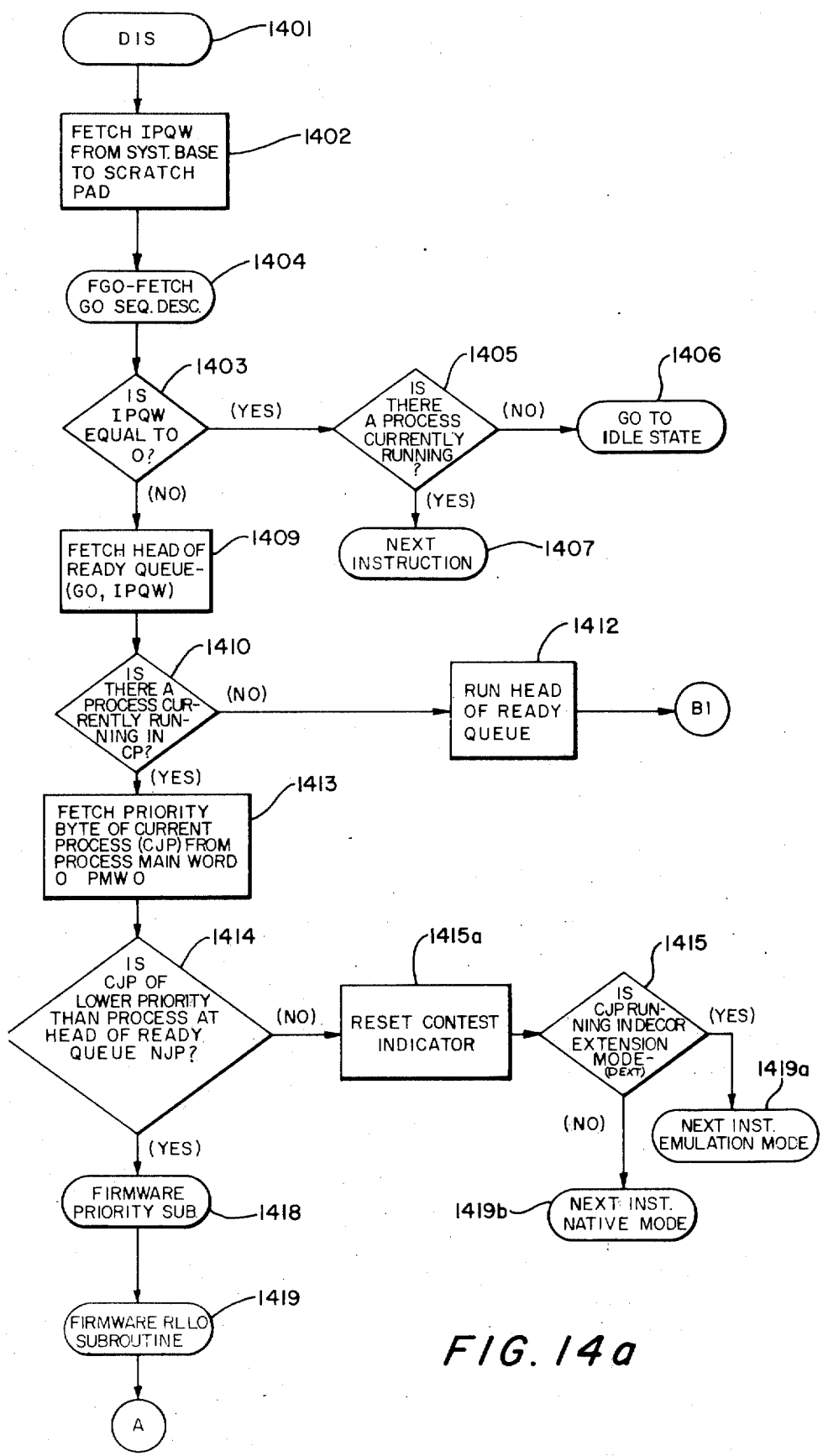
Figure 14D:
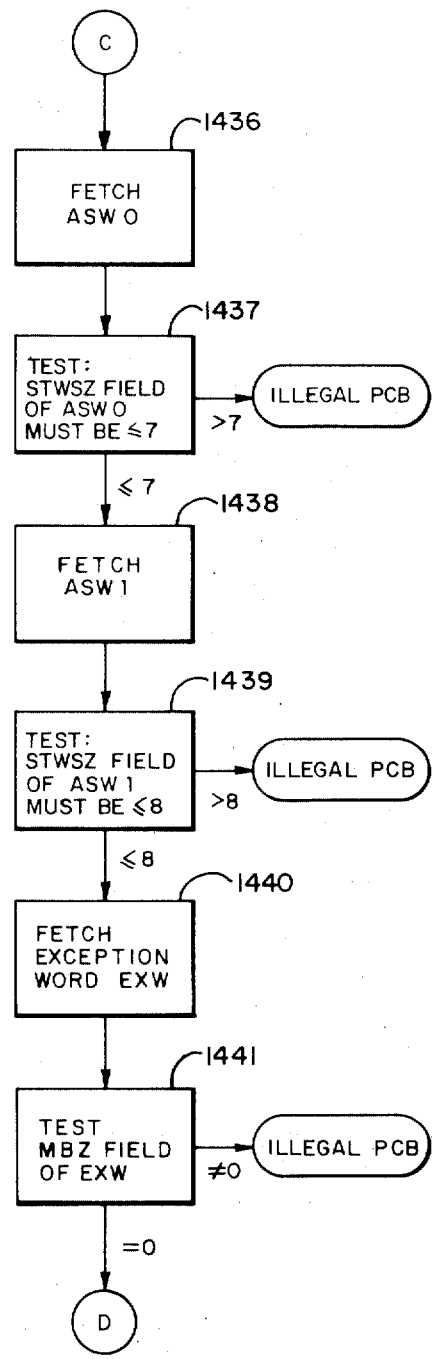
Figure 14E:
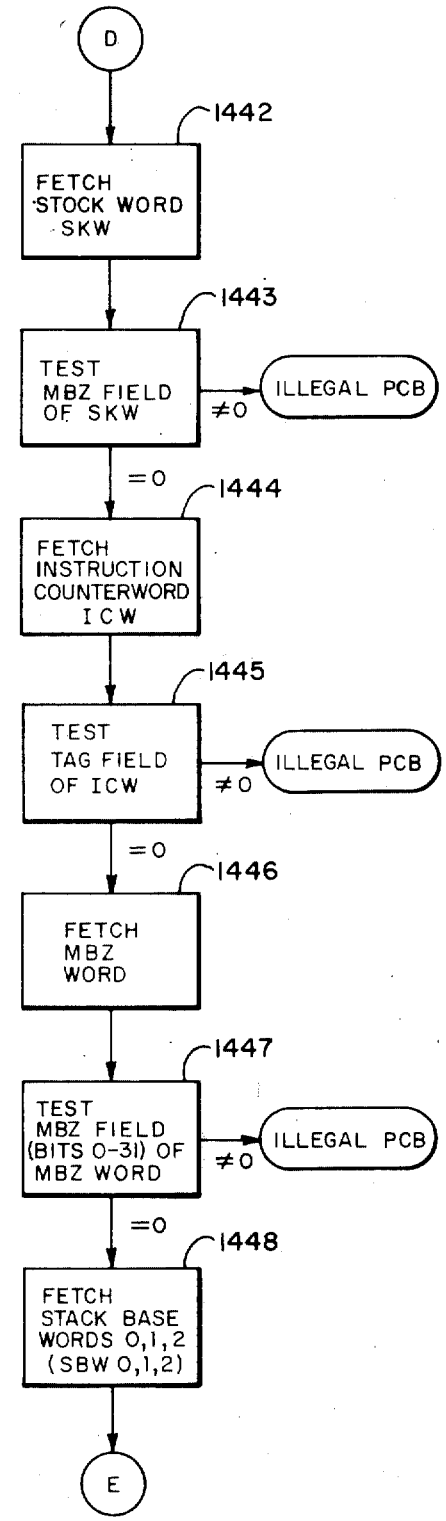
Figures 14F, 14G:
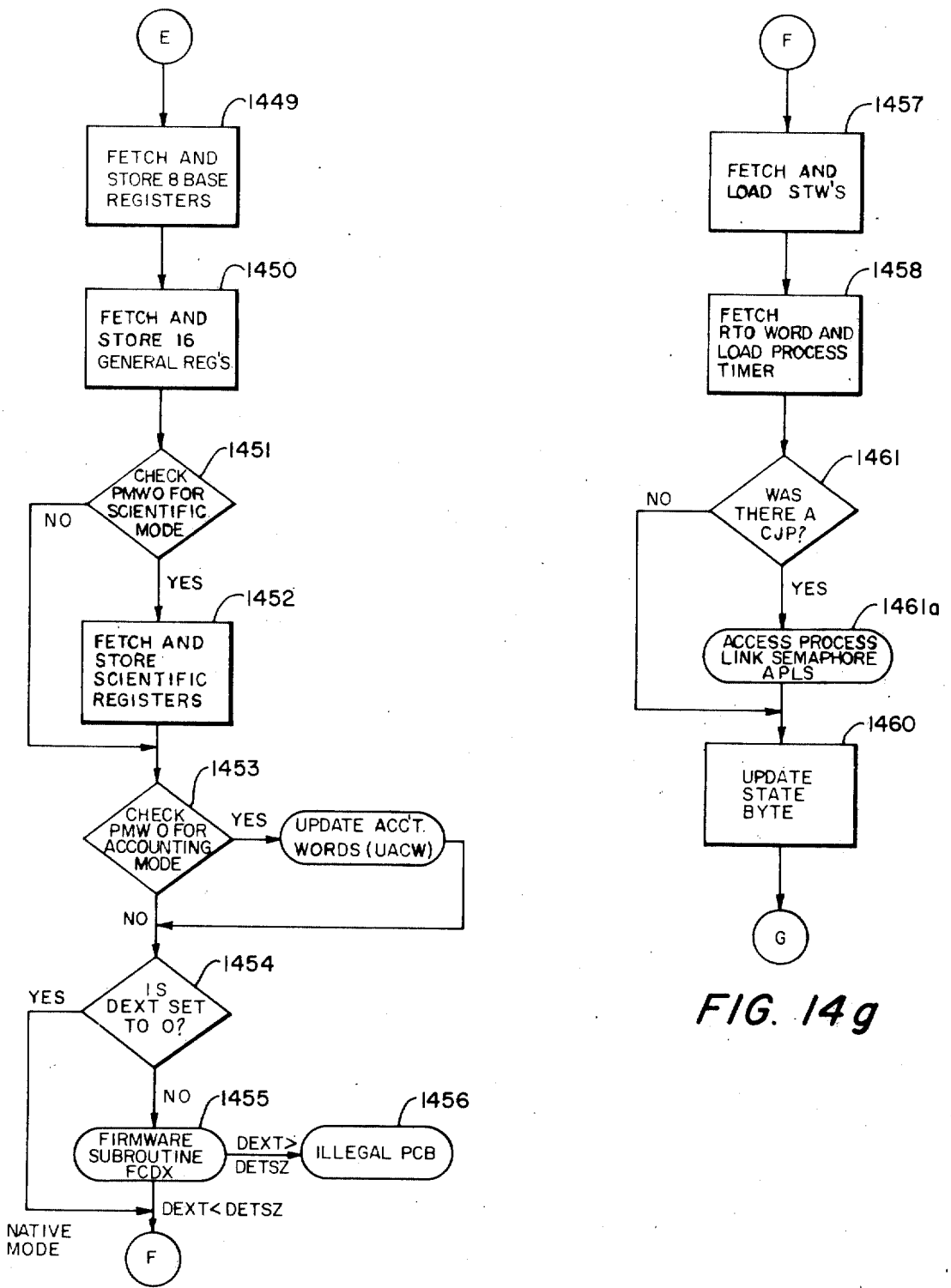
Figure 14H:
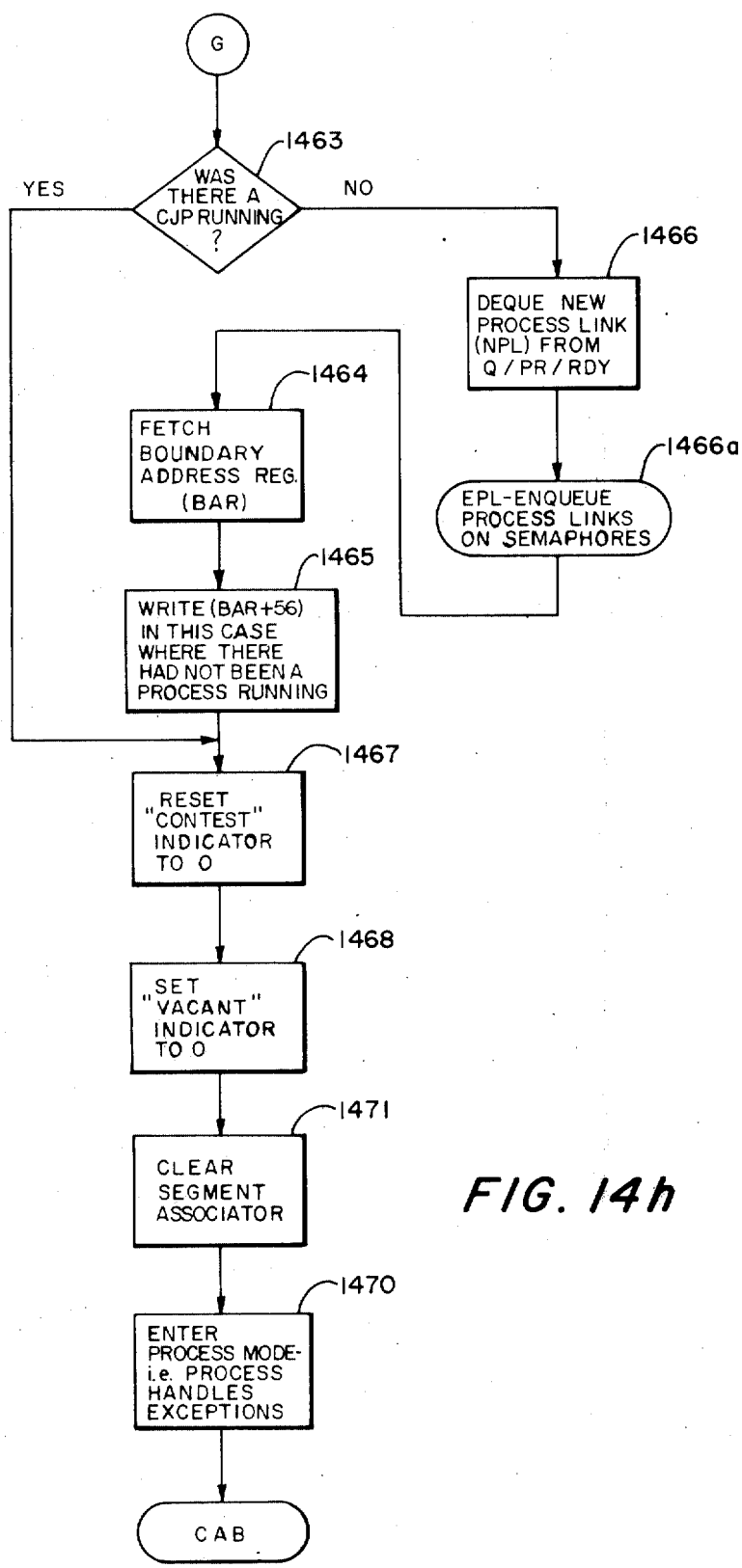

The representation of the operations in firmware (i.e. in control unit) performed by the dispatcher are shown in flow-charts FIGS. 14a–14i. For example, block 1402 of FIG. 14a is a representation of the operation performed by the dispatcher wherein a microprogram word is delivered by the control store unit, and upon decoding by decoder 1359 controls the applicable portions of the CPU via an appropriate series of microoperation signals 1360, 1361, etc. to retrieve the IPQW from the system base in storage subsystem 102, and transfer it to scratch pad memory 1315. Simultaneously the dispatcher fetches 1404 the G0 segment descriptor (see FIG. 12) from the G table of segment descriptors pointed to by the G table word GTW in the system base. Bits 16–31 of the IPQW word contain a 16-bit positive integer which is the displacement from the base of the G segment number O, referred to as the G0 segment, to the head (first byte) of the Q/PR/RDY, queue of processes ready. If bits 16–31 of the IPQW word is 0, 1403 the ready queue is considered to be empty. If the ready queue is empty it indicates that there is no process currently waiting in the Q/PR/RDY and the ready queue is empty. The next question to be decided in decision block 1405 is whether or not a process is currently running in the machine by determining whether or not the Vacant Indicator is set. If the Vacant Indicator is set (i.e. there is no process currently running) and since it was previously determined that there is no process in the ready-queue waiting to use the processor then the machine goes in the idle state 1406. However if there is a process currently running in the machine, but there is no one waiting to use the machine, the current process accesses its next instruction 1407.

Returning now to decision block 1403, of the flow chart of FIG. 14a if there is a positive integer in the pointer area of the IPQW (i.e. bits 16–31) the head of the ready queue pointed to by the IPQW word in the G0 segment is fetched to the scratch pad memory. (Note: To avoid repetition and in the interest of clarity the intermediate functions of the dispatcher in conjunction with the control unit and CPU will be omitted; however it is to be understood that such intermediate functions as previously described by example are present typically.) Up to this point it has been determined that there is some process waiting in the ready-queue. Before further action can be taken it is necessary to determine if there is a process currently running in the central processor. This is determined at decision block 1410 of the flow chart representation and if there is no process currently running in the central processor (i.e. no CJP) the head of the ready queue is run 1412. However if there is a process running in the central processor the dispatcher must determine who has priority — the currently running process or the head of the ready queue. Accordingly therefore the priority byte of the current process (CJP) which is located in the running process word of the system base PCB 400, is fetched 1413. A decision is then made 1414 as to whether or not the current running process CJP is of lower priority than the new process NJP waiting at the head of the ready queue. (See decision block 1414.) If CJP is not of lower priority than NJP, CJP remains in control of the central processor and the contest indicator is reset 1415. (The contest indicator is always set to 0 except when one or more new processes have been placed on the ready-queue since the beginning of the last instruction executed on behalf of CJP thereby creating the possibility of a conflict; under these conditions the contest indicator is set to binary 1). Before the current process CJP is permitted to continue however, and execute further instructions a determination is made whether or not the CJP is running in decor extension mode 1415. If CJP is running in decor extension mode then the next instruction is executed in emulation mode (i.e. decor extension) and if it is not running in decor extension mode then the next instruction is executed in native mode. Returning once again to decision block 1414, if the NJP at the head of the ready queue has a higher priority than the CJP (i.e. its priority number is lower than CJP's priority number, the current running process CJP is rolled-out of the machine and the new process NJP is rolled-in to the machine. Accordingly a firmware priority subroutine PRIQ 1418 directs the enqueueing of the current process CJP into the ready-queue by LIFO priority and by priority number by first rolling-out the CJP under the direction of the firmware subroutine RLLO 1419. The RLLO subroutine directs the writing of the information of the CJP that is stored in the general registers, base registers, scientific registers, T-register, status registers, and instruction counter, back into the appropriate storage areas of the process control block PCB in main memory, and it directs the updating of the RUA. Moreover the DEXT number of process main word O (PMWO) in PCB 400 is updated 1420.

The new process NJP is now ready to be rolled-in. The boundary address register BAR is fetched 1422 and the running process word RPW is fetched from address BAR plus 56 of the system base. See block 1423. The name of the new process NJP is next writeen into the running process word RPW and since the name of the new process NJP was written in the process link PL of the Q/PR/RDY, the name in the process link PL is therefore now placed in the RPW, block 1424. Therefore NJP from the ready-queue now becomes CJP and is entitled to control 1426. central processor and accordingly is no longer waiting in the Q/PR/RDY and must be dequeued by taking its name out of the process link PL of the Q/PR/RDY, block 1425. When this is done the queue of processes ready Q/PR/RDY is updated by the firmware subroutine UQLK 1425a. Accordingly the JP number of the process which was just taken out of the machine is placed in a process link in the Q/PR/RDY, since it now no longer has control of the machine and must wait for it, 15426. At this point the transformation of giving this control of the central processor to the new process and placing the old process in a ready queue is accomplished and because there is a process (the new CJP) in control of the central processor, the Vacant Indicator is set to O, 1427; if on the other hand there were no CJP in control of the central processor the Vacant Indicator would be set to 1. At this point the assignment of the processor is complete and a new process has acquired the central processor whereas the old process was placed in a ready queue; however, the new process is not ready to run yet for the hardware of the central processing unit, 1306 of FIG. 13a, such as the general registers 1307, the base registers 1308, scientific registers 1309, the T-register 1310, the status registers 1311, and the instruction counter 1312, must be supplied with control information from the process control block of the new process.

Accordingly the firmware subroutine 1430 controls the CPU and first fetches PMW 3 from the PCB (FIG. 4) to scratch pad memory 1315, and then fetches PMW O. The MBZ field of PMW O is checked 1433 and if it is not binary 0 an illegal PCB exception results. However if the MBZ field of PMW O is zero then PMW 1 is fetched 1434. Again the MBZ field of PMW 1 is tested to determine whether or not it is a binary 0. If it is not binary 0 there is an illegal PCB exception; whereas if it is equal to 0 the dispatcher proceeds to C.

Accordingly address space word O ASW O is fetched from the appropriate space in the PCB and the segment table word size STWSZ is tested 1437 to determine whether or not it is less than 7. If it is greater than 7 an illegal PCB results if it is less than or equal to 7, then ASW 1 is fetched from the PCB, block 1438, and its STWSZ field is tested 1439 to determine whether or not it is less than or equal to 8. If its field is greaer than 8 then an illegal PCB results; however, if its STWSZ field is equal or less than 8 the exception word EXW is fetched 1440, and its MBZ field is tested to determine whether or not it is equal to 0. If its MBZ field is not equal to 0 an illegal PCB results whereas if it is equal to 0 the stack word SKW is fetched 1442, and its MBZ field is tested 1443 to determine whether or not it is equal to 0. If the MBZ field is not equal to 0 then an illegal PCB results; whereas if it is equal to 0 the instruction counter word ICW is fetched from the PCB and placed in the instruction counter IC and its TAG field is tested to determine whether or not it is equal to 0, 1445. If the TAG field is not equal to 0 then an illegal PCB results. However if the TAG field is equal to 0 the MBZ word is fetched 1446 and its MBZ field (bits 0–31) is tested to determine whether or not it is equal to 0, 1447. If it is not equal to 0 then an illegal PCB results; whereas if it is equal to 0 stack base words, 0, 1 and 2 SBW 0, 1 and 2 are fetched 1448. The contents of the 8 base registers in the base register saving area of the PCB is then etched 1449 and stored in the machine's base registers 1308. Then the contents of the 16 general registers from the general register saving area of the PCB are fetched 1450 and stored in the machine's general registers 1307. Before fetching the contents of the scientific registers however a check is made of the capability byte of process main word O (PMW O) to determine whether or not scientific mode is being utilized 1451. If scientific mode is being utilized then the contents of the scientific registers from the scientific register saving area of the PCB are fetched and stored 1452. The firmware then proceeds to make a check of the capability byte of PMW O to determine whether or not the accounting mode is being utilized 1453. If the accounting mode is being utilized (i.e. accounting bit of capability byte set to binary 1) the accounting words exists in the PCB and the ready time account word RTA is updated. Then the firmware proceeds to determine whether or not the DEXT number is set to 0, 1454. If it is not set to 0 it indicates that the machine may be in emulation mode (i.e. the decor extension capability is being utilized) and accordingly the DEXT number of PMW O is checked 1455 to determine whether or not it is greater or less than the DETSZ field of process main word 3 and if it is greater than the DETSZ field an illegal PCB exception 1456 results since the DEXT number is less than the DETSZ field but not equal to zero the machine is performing in legal emulation mode and proceeds to F. Returning to decision block 1454 if the DEXT field is binary 0 then native mode is being performed and the machine fetches STW's, 1457. The residual time out word RTO word of the PCB is fetched 1458 and the process timer is loaded, with the time limit that the CJP may spend in the running state.

Up to this point either (a) a new process NJP has been rolled-in to take control of the CPU when there was an old process CJP in the machine and the new process NJP was at a higher priority than the old process CJP or (b) there was no CJP in control of the CPU and the head of the ready queue was run. Briefly under condition (a) the CJP was taken out of the RPW and placed in a process link PL in the Q/PR/RDY, and the NJP in a process link PL in Q/PR/RDY was placed in the RPW thus effectively switching the positions of the 2 processes giving control to the NJP which now becomes the CJP and taking control away from the old CJP. Then the PCB of the NJP was accessed and the information required to run NJP (now the CJP) was placed in scratch pad memory or the array of registers in the ACU.

If there was no CJP in control of the CPU (condition b), then the head of the ready queue was run—i.e. the NJP became the CJP becuase of the dispatcher taking the NJP from the process link PL from the head of the ready queue and placing it in the RPW word. By doing this a process link PL was left empty in the Q/PR/RDY and it is required to take it out.

Accordingly beginning now at decision block 1461 the firmware determines whether or not there was a CJP in control of the CPU and if there was a free process link (FPLS) it was accessed and enqueued and the CJP was written therein. However if there was no CJP in control of the CPU state byte of PMW 0 of the NJP is updated 1460 and again there is a determination whether or not there was a CJP in the machine 1463. If there was no CJP in control of the processor the process link of the NJP (which was in the Q/PR/RDY and is now in control of the machine) is taken out of the Q/PR/RDY 1466 (i.e. dequeued from the Q/PR/RDY) and becomes a free link semaphore FLSP and is now enqueued in the free process link queue (805 on FIG. 9) and becomes a part of the free process link queue 1466a. The contents of the boundary address register BAR are fetched 1464 and the running process word RPW of the NJP (now the CJP) located at BAR plus 56 of the system base is updated by placing the NJP identification in the RPW, block 1465. The Vacant Indicator is set to 0 in the case where there had been no CJP. Next the Contest Indicator is set to 0, 1467 and the Segment Associator (AS 132 on FIG. 1) which is a typical content addressable memory is cleared, 1471; then the process mode is entered 1470. (A process mode indicates that exceptions are handled by the process which is operating in the processor rather than by the operating system). The firmware then continues to CAB 1480 and the asynchronous trap bit AB is checked to determine whether or not it is set to binary 1, 1481. If the AB bit is set to binary 1 then a check is made 1482 to determine whether or not the process ring number PRN is greater than or equal to the asynchronous trap bit ARN. (The AB and the ARN are located in the priority byte of the PCB of each process and is meaningful when the process is in the running state; the AB and ARN are obtained from the RPW located at BAR plus 56 of the system base). The AB and ARN in BAR plus 56 of the RPW are reset since the next step 1484 is to proceed to an asynchronous trap routine which would take care of the conditions that cause the asynchronous trap bit or the asynchronous ring number to be set in the first place, and if these were not reset then at the next pass by the firmware it would give an indication that something was wrong where actually there was nothing wrong, and hence would always proceed to the asynchronous trap routine 1484 and would never execute. Going back now to decision blocks 1481 and 1482 if the AB bit is not set or AB bit is set and PRN is not greater than ARN, then the firmware would proceed to determine in what mode the processor would run — in the normal mode or in the emulation mode. Accordingly the DEXT number is checked to determine whether or not it is set to 0 and if it is set to 0 the normal mode of the machine is run 1487. However if the DEXT number is not set to 0 the emulation mode is run 1486.

DETAILED DESCRIPTION OF THE INVENTION

The hardware/firmware system recognizes two basic types of records which are manipulated in set operations. These two types of records are the virtual memory records illustrated in FIG. 15A and the database records illustrated in FIG. 15B. Virtual memory records are generally used internal to operating system procedures where records can be addressed by segmented addresses. Database records are more generally used by user programs which address their data records with Area-Page-Line numbers. The Area refers to the user file, the Page to a division within his data file, and the Line number to a particular record within that page of that file.

Figure 15A:
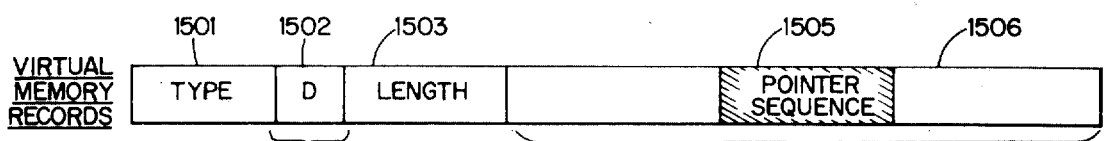
FIGS. 15A through 15H are diagrams of the records and their pointers used in the set instructions.

As shown in FIG. 15A the virtual memory record is composed of the following fields: the Type field 1501 is a description of the record type and is derived from this record's record descriptor (which will be described below). The D switch field 1502 of the virtual memory record describes the state of the record. The record can be in the following states: active, which means the record currently contains valid data; and logically deleted, which means the record no longer contains valid data but still occupies memory space. The Length field 1503 describes the actual number of bytes in the record. The record body 1504 contains the actual data of the record. The pointer sequence field 1505 is a portion of the record body which may contain the pointers to the next, prior, first, last and owner record, of the set in which the record is either an owner or a member.

Figure 15B:
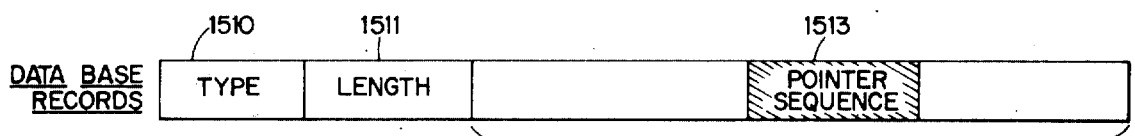

The second major type of record recognized by the hardware/firmware system are database records as described in FIG. 15B. The Type field 1510 again describes the type of record and is derived from the record's record descriptor which will be described below. The Length field 1511 describes the length of the record in bytes. The record body 1512 contains the actual data of the record. The pointer sequence 1513 contains the pointers to the next, prior, etc., records of the set. There is also a D switch field 1604 for each record which is recorded separately and which will be described below.

Figure 15C:
Figure 15D:
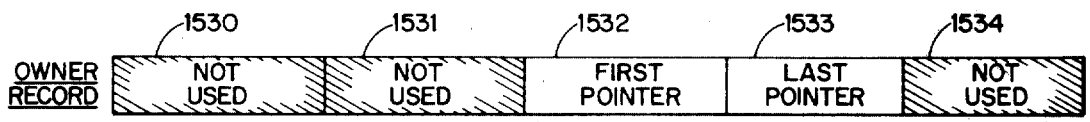

FIGS. 15C and 15D further describe the format of the pointer sequence of a record (field 1505 of FIG. 15A and field 1513 of FIG. 15B). The hardware/firmware system recognizes two different pointer sequence formats, one FIG. 15C which is the sequence recognized for member records and the second FIG. 15D for when the record is an owner record. For member records (FIG. 15C), the Next Pointer field 1520 contains the address of the next member in the set. The Prior Pointer 1521 contains the address of the previous member of the present set. The Owner Pointer field 1524 contains the address of the owner of the set. For owner records the pointer sequence format recognized by the hardware/firmware is shown in FIG. 15D. The First Pointer field 1532 contains the address of the first member record of the set. The Last Pointer field 1533 contains the address of the last member of the set.

Each of the pointers described (next, prior, owner, first and last) are optional. However, for a given set only the following combinations are legal:

Case 1. No first, last, next or prior pointers for owner or member records. (Member records have owner pointers.)

Case 2. Owner record has first pointer, member records have next pointers (member records may or may not hat owner pointers).

Case 3. Owner record has first and last pointers, member records have next pointers (member records may or may not have owner pointers).

Case 4. Owner record has first and last pointers, member records have next and prior pointers (member records may or may not have owner pointers).

A further characteristic of the hardware/firmware system is its recognition of four different classes or formats of pointers. Within a record these classes are referred to as class zero, which are used for virtual memory records only; class one, which are used for virtual memory records only; class two, which are used for data records only; and class three which are used for database records only.

All four pointer classes have a common meaning for their first two bits. The first bit, the EOS bit, is the End-of-Set indicator. When this bit is set to one, the pointer by definition points to an owner record. The second bit, the NINS bit, is the Record-Not-Inserted indicator. When this bit is set to one the record is not currently inserted as a member of the set being referenced.

Figure 15E:
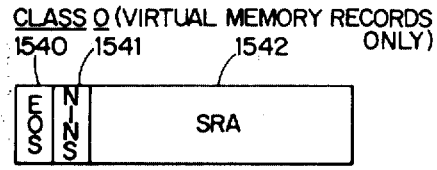

The class zero pointer format is shown in FIG. 15E. The EOS bit 1540 and Not Inserted bit 1541 occupy the first two bit positions. The SRA field 1542 is a 14-bit offset, which is a displacement within a given segment, which points to the record located in that segment. The SRA field obtained from class zero pointers is always merged with a segment number which is generally obtained from the base register used in addressing records via class zero pointers.

Figure 15F:
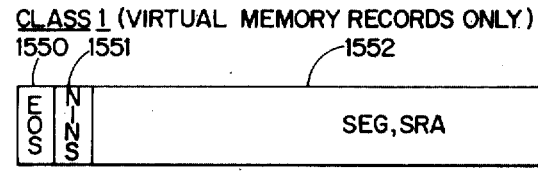

The class one pointer is shown in FIG. 15F. The EOS bit 1550 and Not Inserted bit 1551 are of standard definition. The Field SEG, SRA 1552 is composed of the standard segmented address with SEG and SRA as defined previously. These pointers are used to directly address a record, with the segment number being directly supplied via the pointer.

For class two and class three pointers which are used with database records, the firmware/hardware system recognizes a convention that with each base register of the system as described previously (see FIG. 2, 202) there is an associated index register. General registers 8–15, 201 correspond to Index registers 0–7 respectively. The index register number IXR$_i$ is matched with base register BR$_i$. For instance, for base register BR3, index register IXR3 (GR11) would contain an Area-Page-Line number pointer (see FIG. 15H) whose current SEG, SRA address would be contained in base register BR3. Thus, the user is able to address his record via either a base register with SEG, SRA address or via a database pointer as contained in the index register of the Area-Page Line format.

The hardware/firmware instructions operating on database records implement the capability of automatically converting from Area-Page-Line pointers into SEG, SRA addresses. Hence, all actual memory references made by the database instructions use the standard hardware mechanism which addresses memory with segment and SRA number, with the conversion from AREA-Page-Line as contained in an index register made automatically by the hardware if necessary.

There is a temporary one-to-one correspondence between a page in a user file (area) and a segment as recognized by the hardward/firmware. Thus, through the page descriptor mechanism to be described below, the hardware/firmware converts any given page number into a segment number.

Figure 15G:
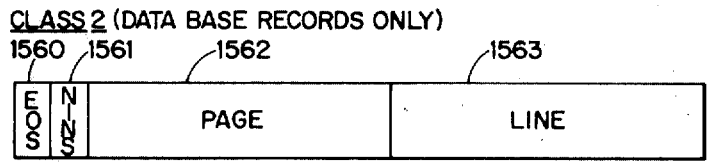

The class two pointer format is shown in FIG. 15G. The EOS and Not Inserted bits are shown in fields 1560 and 1561. The Page number is contained in field 1562. The Line number is shown in field 1563 and represents the number of a record in a page and area. A full Area-Page-Line number pointer is obtained when using class two records by obtaining the Area number obtained from the index register which would be referenced by the database instruction.

Figure 15H:
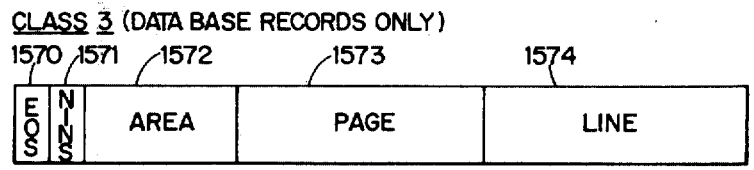

The class three pointer formats are shown in FIG. 15H. The EOS and Not Inserted bits are shown in fields 1570 and 1571. The Area number is shown in field 1572. This refers to the user file number. The Page number 1573 and the Line number 1574 address a particular record in the user file.

Figure 16A:
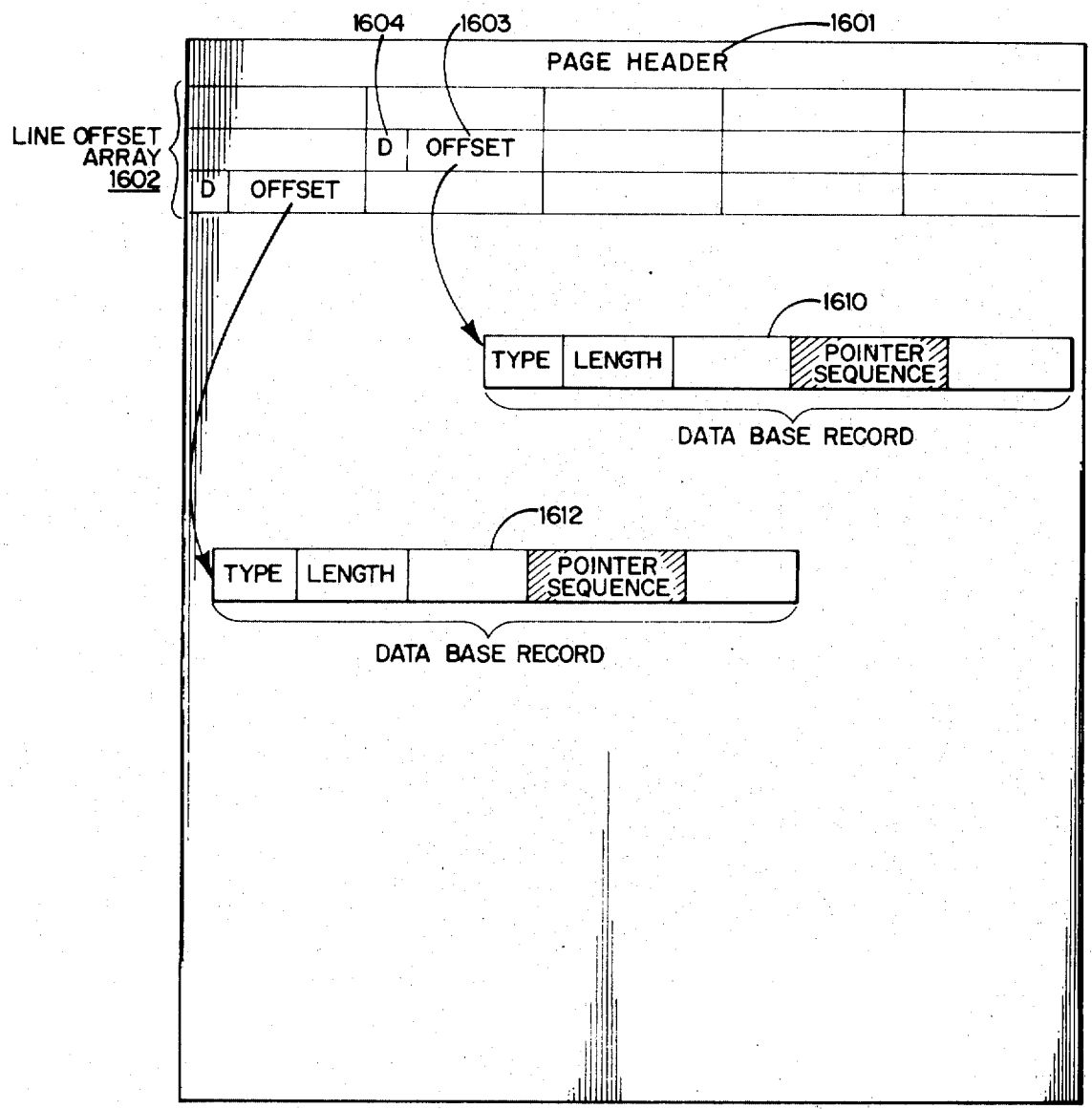
FIGS. 16A through 16C are diagrams of the database page format and the descriptors describing those pages.

FIG. 16A illustrates the database page which is a portion of a user file (area) as recognized by the hardware/firmware system. Database pages contain the database records as described in FIG. 15B previously. As said previously, there is a one-to-one correspondence between a database page and a segment at the time when the database page is resident in main memory.

The page header 1601 contains certain information relevant to the page in which it is contained. For example, it would describe the length of the page in bytes and also the number of records (lines) contained in the page. It would also contain information such as the write bit which would be set upon the writing into the page when it was contained in main memory. Following the page header, the next major portion of the database page is the line offset array 1602. This is an array of 16-bit elements which correspond to a one-to-one basis with valid line numbers for the page. For each element of the line offset array there is a two bit D-switch 1604 and a 14-bit offset 1603. The D-switch describes the state of the record as inactive, logically deleted, physically deleted, or active. The offset is a 14-bit pointer to the record which is a relative displacement from within the beginning of the page. It can be seen that hardware is able to address a database record in this page by using the offset concatenated with the segment number corresponding to this page. The method of obtaining the corresponding segment number will be described below. The remaining portion of the database page is composed of the actual database records as shown in record 1610 and record 1612. These records may be located in any portion of the page (segment) and are not necessarily in the same order as their position in the line offset array. If the D switch describes the record state as inactive or physically deleted, then the offset will be set to zero and the record will not exist.

Figure 16B:
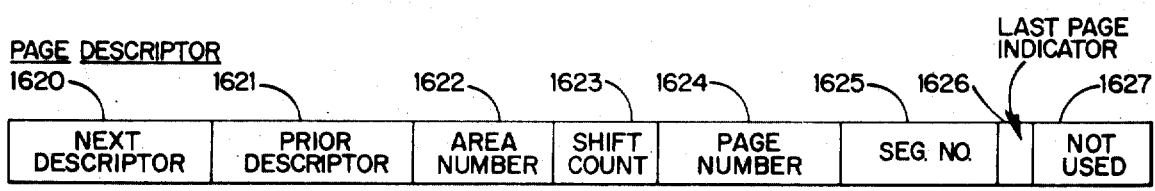

The actual datbase page is addressed by a page descriptor as shown in FIG. 16B. The Segment Number 1625 of the page descriptor contains the segment number corresponding to this page number after it is loaded in main memory. The Area Number 1622 contains the area number (file) of this page. The Page Number 1624 is the actual page number. The Last Page Indicator 1626 is equal to one for the highest page number of a given area. The Shift Count 1623 contains the number of bits of the page number. The hardware/firmware system recognizes a variable length page number when utilizing Area-Page-Line pointer formats. The Next Descriptor 1620 is used to point to the next page descriptor in a chain of page descriptors. The Prior Descriptor 1621 points to the previous descriptor in the page descriptor chain. The use of these page descriptor chains will be described below.

Figure 16C:
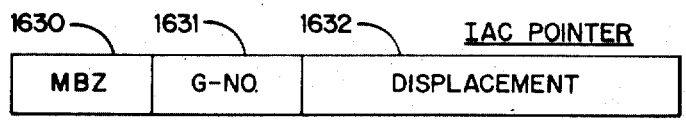

The page descriptor chain is the hardware/firmware mechanism used to indicate which pages of files are currently located in the main memory of the computer system. For each page present in memory a page descriptor is located in a single system recognized chain, which is pointed to by the Integrated Access Control pointer shown in FIG. 16C. The Integrated Access Control pointer represents a one word extension to the System Base described previously. The IAC pointer is located at an address BAR plus 92, which is one word past the end of the System Base. The format of the IAC pointer contains a Must Be Zero field 1630, a G-number 1631, and a Displacement 1632. The G-number is a number of a G-segment as described previously. The Displacement is a displacement within that G-segment where the beginning of the page descriptor ring begins. The page descriptors of all of the pages contained in main memory are then linked together in the traditional chain format. The next descriptor and prior descriptor fields form the link.

Figure 17:
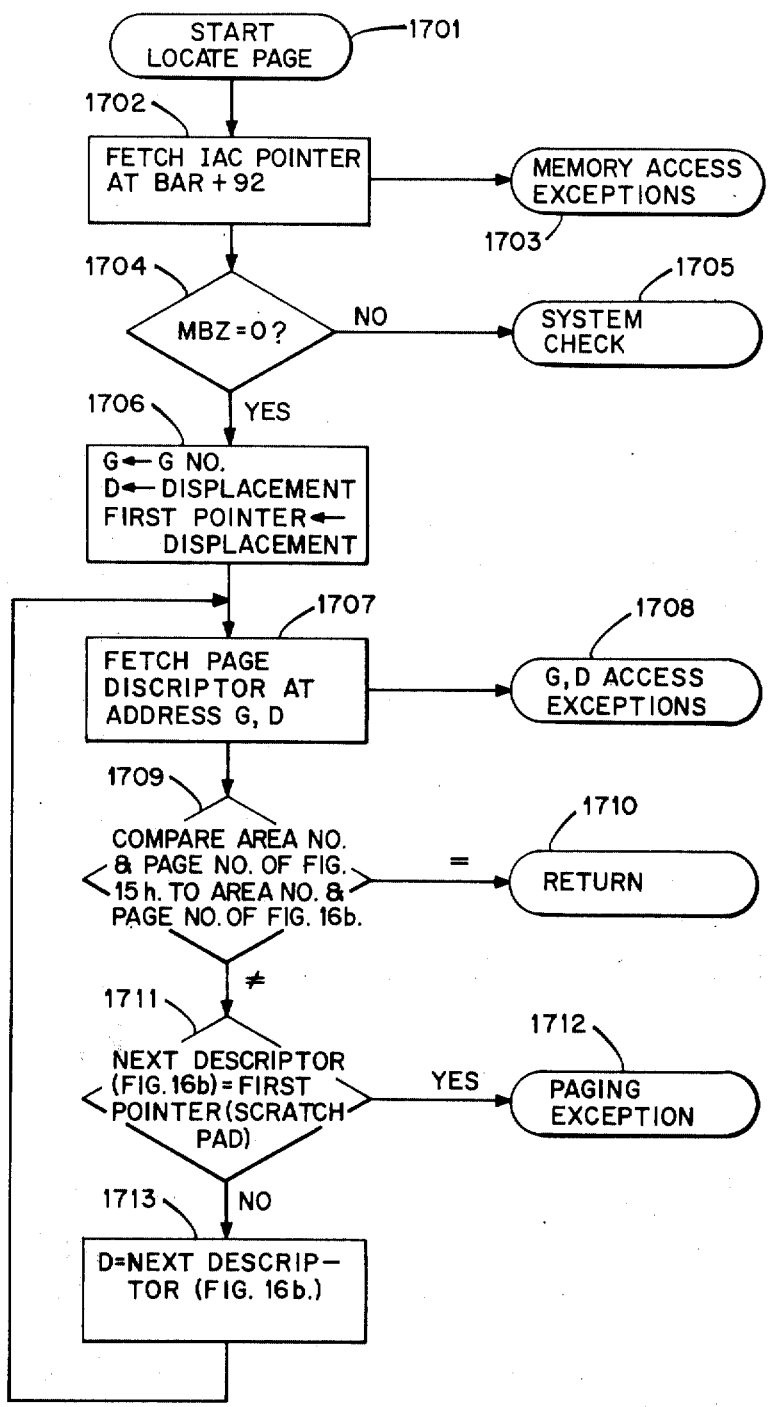
FIG. 17 is a flow chart of the firmware used to locate a database page in main memory.

FIG. 17 shows the hardware/firmware flow chart for implementing the location of a database page in main memory. This firmware is used to take an Area-Page-Line number pointer and determine firstly if the page is in main memory, and, secondly, to deliver the page descriptor of that page if it is found to be present in main memory. The firmware starts as shown in 1701.

The first firmware action occurs as shown in 1702 where a main memory fetch of the IAC pointer is made at location BAR plus 92. (The IAC pointer is incorporated in the System Base as shown in FIG. 6). As a result of this memory fetch, memory access exception 1703 may occur. Examples of memory access exceptions would be out of physical memory or a memory read error. The next step taken by the firmware is shown in 1704 where the MBZ field is checked to be zero. (Reference FIG. 16C). If the field is found not to be zero, then a system check 1705 occurs. Upon the occurrence of a system check, the system goes into a diagnostic state.

If the MBZ field is zero, block 1706 is next executed. The G-number from the IAC field is transferred into temporary register G. The displacement field is transferred into temporary register D. The displacement is also transferred into scratch pad memory of a location referred to as "first pointer." Block 1707 is next executed. The fetch of main memory is made at the address G, D to fetch a page descriptor (see FIG. 16B). This fetch is made according to the convention of G, D addressing as described previously. G, D access exception 1708 may occur as a result of this memory fetch (e.g. out of segment, illegal G-D segment descriptor). Step 1709 is next executed by the firmware. The area number and page number of the Area-Page-Line number being checked by the firmware subroutine is compared against the Area Number field 1622 and the Page number field 1624 of the page descriptor for a match. If the area and page numbers match, block 1710 is executed in which the firmware routine ends with the page descriptor just fetched from main memory being loaded into scratchpad memory.

If the area or page number of the current page descriptor is not equal to the area and page number of the Area-Page-Line pointer being checked, block 1711 is executed. The Next Descriptor field 1620 of the page current page descriptor is checked against the contents of temporary scratchpad location first pointer. If these two values are not equal, block 1713 is executed in which the temporary register D is loaded with the Next Descriptor field the current page descriptor. Following step 1713 a branch by the firmware is made to step 1707 where the new page descriptor (which was addressed by the Next Descriptor) is now fetched and will be subsequently checked.

Going back to step 1711, if the Next Descriptor is equal to the contents of the first pointer temporary scratchpad location, this indicates that the entire ring of page descriptors describing all pages present in memory has now been exhausted without finding the area-page being searched for by the firmware. In this case, a paging exception occurs 1712, indicating that the desired page is not located in main memory. Following the exception, appropriate software action will occur resulting in the eventual moving of this desired page to main memory.

The format of two more vital elements of the hardware/firmware system described here are shown in FIGS. 19a and 19b. The set descriptor, FIG. 19a, is used to describe the properties of a given set. As shown in FIG. 19a, the P field 1802 is a two-bit field describing the pointer class (mode) of the record pointers in this set. All records, both owners and members, have pointers of the same pointer class for a given set. The Owner Pointer field of the set descriptor 1803 is set to one if member records contain an owner pointer to the owner record (reference FIG. 15C). The Other Pointers field 1804 describe whether owners and members have first pointers, last pointers, next pointers and prior pointers. The Set Implementation Mode field K 1805 describes the mode of set implementation being used for the current set. Only the mode of ring sets is detailed in this disclosure. However, the capability for extension to other modes of set implementation such as table array or list array exiits. The Displacement field 1806 is used to indicate the offset from the beginning of the record in memory to the beginning of the pointer sequence in that record. (Reference FIGS. 15A and 15B). The set descriptor as described in FIG. 18A is always accessed by the database instruction when operating on a set to supply the hardware/firmware with a description of the referenced set.

The record descriptor as shown in FIG. 19b is used to describe certain properties of record. The F field 1820 is used to describe the record format. The format of records is either virtual memory record or database record as described in FIGS. 15A and 15B. The Record Type field 1821 indicates the type of record and is eventually loaded into the type field of the actual record in memory as shown in FIGS. 15A and 15B. The Record Length field 1822 indicates what the actual length the record will be in main memory and is loaded into main memory records as shown in FIGS. 15A and 15B.

The actual database instructions are of one of the six formats as shown in FIGS. 20a to 20f.

The GROP format shown in FIG. 20a contains the Operation Code 1910, the Must Be Zero field 1911, a Base Register number 1912, and a Complementary Code 1912. The Base Register contains the segmented address of a record. The Complementary Code is used for a further differentiation of the particular instruction described by the Operation Code.

The XI format shown in FIG. 20b contains an Operation Code 1920, a Complementary Code 1921 used to further differentiate the Operation Code, an Address Syllable 1922, a Must Be Zero field 1923, a Logical Delete field 1924, a Pointer Mode field 1925, and a Br field 1926. The Base Register contains a segmented address of a record. The Address Syllable 1922 for some of its usages points to a set descriptor of the set to be operated on. The Address Syllable is developed into a segmented address according to the rules for address development as described previously.

The DXDX format shown in FIG. 20c is composed of an Operation Code 1930, Complementary Code 1931 which is used to further differentiate the instruction, one Address Syllable AS1 1932, a Must Be Zero MBZ1 field 1933, a Base Register 1934, a second Must Be Zero MBZ2 field 1935, and a second Address Syllable AS2 1936. The Base Register again contains the segmented address of a record. The first Address Syllable AS1 1932 points to a set descriptor. The Second Address Syllable AS2 1936 is used to address a binary integer.

The BRX format shown in FIG. 20d contains an Operation Code 1940, a Type field 1941 which is used to further differentiate the instruction, a Base Register field 1942, and an Address Syllable 1943. The Base Register contains the segmented address of a record. The Address Syllable is used to address a set descriptor.

The DXGR format shown in FIG. 20e contains an Operation Code 1950, a Type field 1951 which is used to further differentiate the instruction, a first Base Register number BR1 1952, an Address Syllable 1953, a Must Be Zero MBZ1 field 1954, a second Base Register number BR2 1955, a Before-After-First-Last field 1956 and a second Must Be Zero MBZ2 field 1957. The two base registers are used to address two different records located in memory. The Address Syllable is used to address the set descriptor. The Before-After-First-Last field describes the desired positioning of a record within the set.

The OPDD format shown in FIG. 20f contains an Operation Code 1960, a Primitive field 1961 used to describe a particular database operation, a Type field 1962 used to further differentiate the instruction, a P field 1963 used to describe the pointer field, and the First-Last-Next-Prior pointer field 1965 which describes the other pointer of owner and member records, the Displacement field 1966 describes the offset to the beginning of the pointer sequence, and a BR field 1967 which contains the number of a base register. The base register contains the segmented address of a record in main memory.

The find serial database instruction is a firmware/hardware instruction which sequentially checks each database record (see FIG. 15B) in an Area (file), beginning at the Page and Line number of that Area given by an index register, until the next active record is located. The database address of the record located in Area-Page-Line form (see FIG. 15H), is then loaded into the index register. The find serial instruction is of the GROP format as shown in FIG. 20A.

Figure 21A:
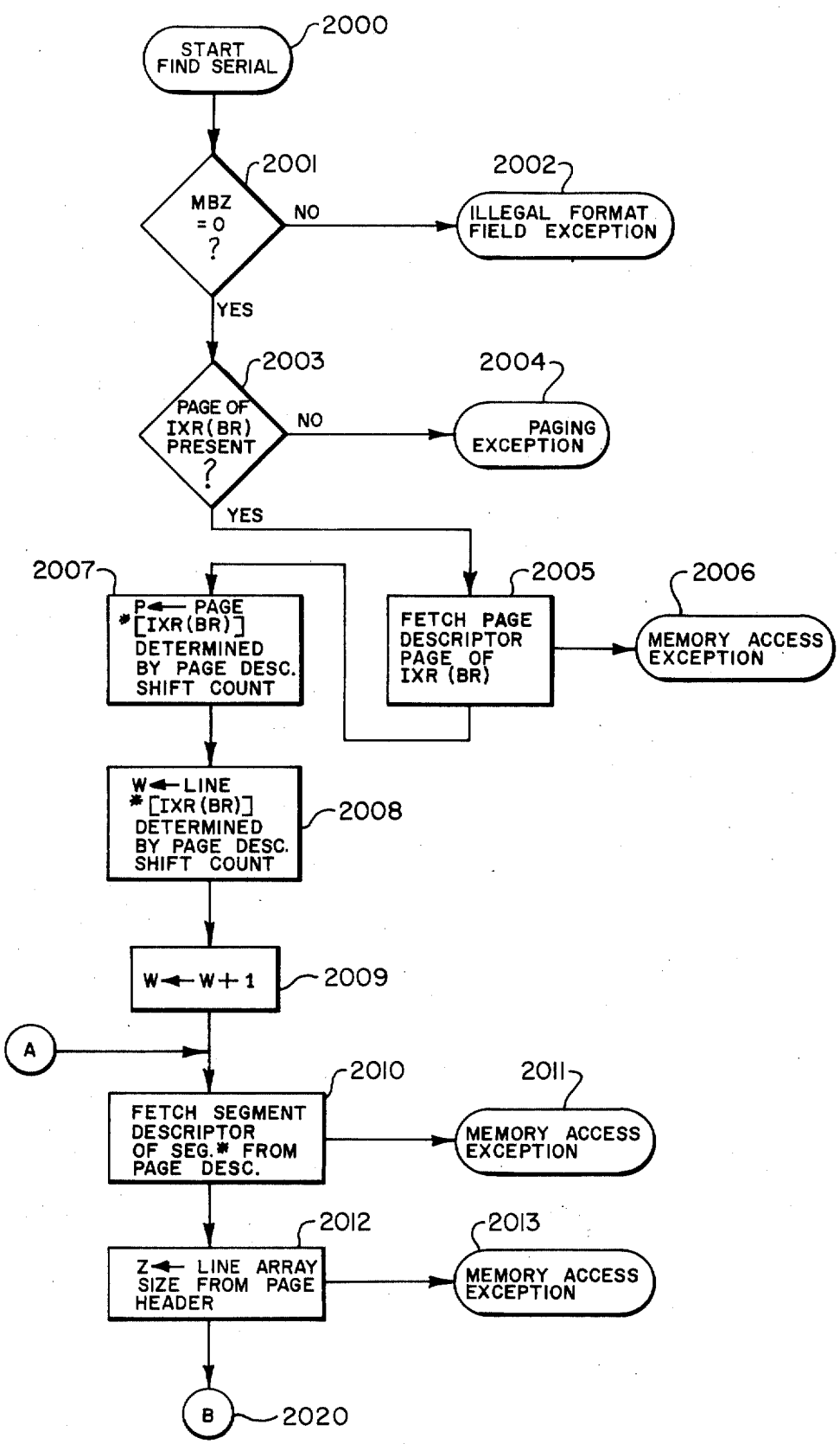
Figure 21C:
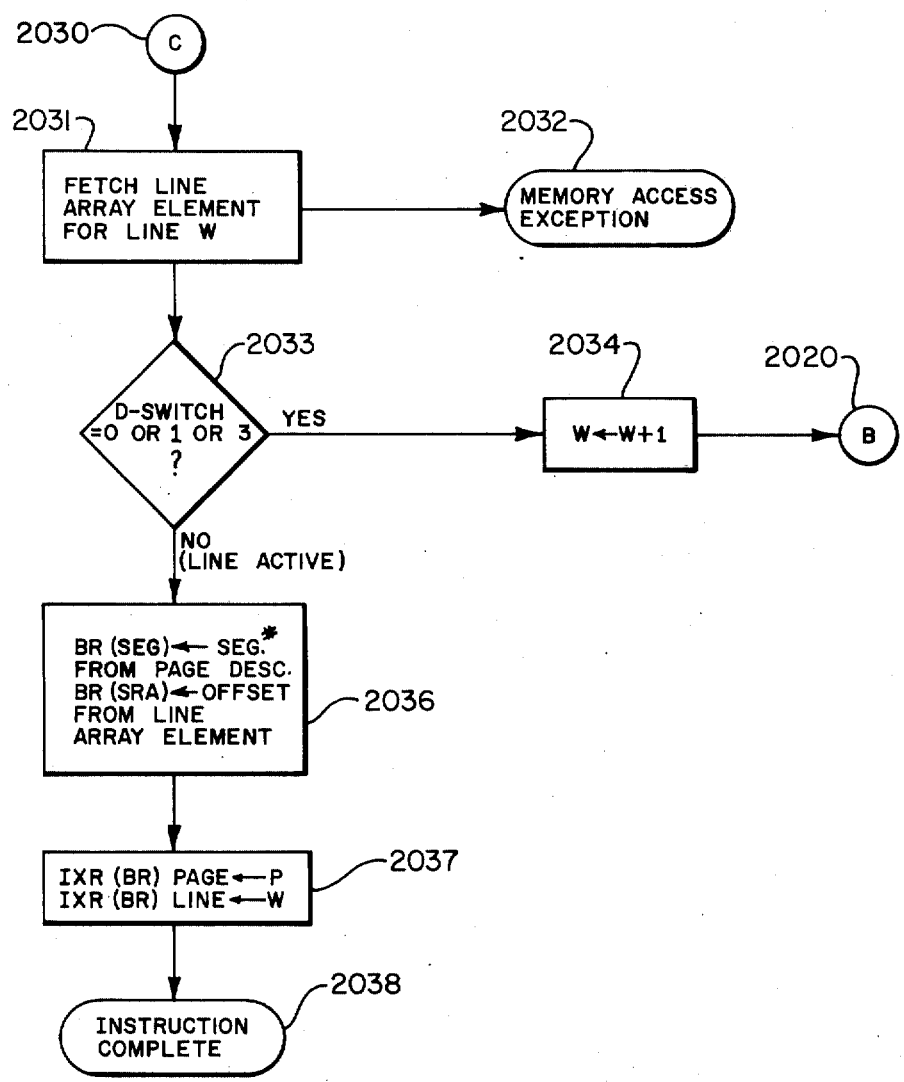

The filmware flow chart for the find serial instruction is shown in FIGS. 21A through 21C. Operation 2001 of the firmware flow chart checks the format of the instruction. Operation 2003 checks that the beginning page of the referenced area is present in memory. Then in operation 2005 the page descriptor of that page (see FIG. 16B) is fetched. Operations 2007 through 2009 obtain the page number P from the referenced index register, the line number W from the referenced index register and then increment the line number W by one. Thus the search for the next active record begins at the record following the record pointed to by the index register. Operation 2010 fetches the segment descriptor of the segment number corresponding to the Area-Page number (with the Area number being the Area number of the index register). The correspondence between a page and segment is as was described supra. Operation 2012 obtains the maximum line number from the page header (see FIG. 16A).

Looking at FIG. 21A in more detail, first in operation 2001 the MBZ fields 1901 and 1903 are checked to be zero. These checks for zero are made by transferring the instruction from the instruction fetch unit (reference FIG. 13A, IFU 1318) to a register in the arithmetic logic unit 1317. If the hardware check made in this register finds the MBZs not zero, the firmware makes a branch to the exception handler as shown in FIG. 21A, operation 2002. This exception is called an illegal format field exception. If the MBZs are zero, the firmware proceeds to operation 2003 where the Area and Page are transferred from the index register in the scratchpad unit 1315 to the arithmetic logic unit 1317. The index register referenced is the one whose number is given by the base register BR number (field 1902 of FIG. 20A). A check as to whether the page corresponding to the Area-Page whose number is contained in main memory is made by the locate page firmware subroutine shown in FIG. 17. If the page is not present in memory, a paging exception 2004 oocurs. If the page is in main memory, operation 2005 fetches the page descriptor of the page. Memory access exceptions 2006, such as out of main memory, may occur as a result of this main memory fetch.

In operation 2007 the page number contained in the index register whose number is given by BR is transferred into a temporary register P in the arithmetic logic unit 1317. The length in number of bits of this page number is equal to the shift count field 1623 as shown in FIG. 16B. In operation 2008 the line number is given by BR into a temporary register W in the arithmetic logic unit 1317. The length in number of bits of this line number is equal to 22 minus the shift count field 1623. In operation 2009 the main adder of the arithmetic logic unit is used to increment by one, the contents of the line number register W. In operation 2010 the segment descriptor of the SEG number obtained from the page descriptor is fetched (see field 1625 of FIG. 16B). As a result of this memory fetch, memory access exceptions 2011 may occur. In operation 2012 the maximum line number is fetched from the page header 1601 using the base address obtained from the segment descriptor fetched in operation 2010. The maximum line number fetched is stored in a temporary register Z in the arithmetic logic unit. As a result of this main memory fetch, memory access exceptions 2013 may occur. Following operation 2012, the hardware/firmware branches to 2020, FIG. 21B.

In FIG. 21B, the line number W, which addresses the record which will be checked to see if it is in the active state is compared to test if it is greater than the maximum line number Z. If this is true, the firmware branches to operation 2022, where it will be determined if this is the last page of the Area. If operation 2022 find that the current page is the last page of the Area, the instruction has been unsuccessful in finding an active record and a last record exception 2023 is reported. If the current page is not the last page, the firmware proceeds to operation 2024 and 2025 where the page number P register is incremented by one and the line number is set to zero. Operation 2026 is then executed in which the new Page is checked as to whether it is present in main memory. If it is present in main memory, the firmware proceeds to operation 2028 where the page descriptor of the new Page P is fetched. The firmware then branches to FIG. 21C, where the first line of the new page will be checked for the active state.

Looking at FIG. 21B in more detail, in operation 2021 the arithmetic logic unit main adder is set in the comparison mode and the temporary register W is compared with the temporary register Z. If the line number W is not greater than or equal to the maximum line number Z, the firmware branches to FIG. 21C, operation 2030. If the line number W is greater than or equal to the maximum line number Z, the firmware branches to operation 2020 to determine if the current Page P is the last page of the Area. In operation 2022, the last page indicator 1626 of the page descriptor fetched in 2005 is examined. If this indicator is found to be equal to one, the firmware branches to the exception handler, where a last record exception 2023 is recorded.

If the last page indicator was found by the firmware to be zero, the firmware branches its operation 2024 where the page number register P is incremented by one in the arithmetic logic unit's main adder. Operation 2025 is then executed in which the hardware/firmware forces a value of zero into the line number register W. Operation 2026 is then executed in which the locate page firmware subroutine (see FIG. 17) is used to check whether the page described by the Area Page is present in main memory. If the page is not present in main memory, a paging exception 2027 occurs. If the page is present in main memory, operation 2028 is executed in which the page descriptor is fetched from main memory for the Page P. As a result of this main memory fetch, memory access exceptions 2029 may occur. Following operation 2028, the firmware branches to operation 2030 shown in FIG. 21C.

In FIG. 21C the actual check is made for the active state of the line whose database address is given by the Area Page Line number whose Area number is actually located in the arithmetic logic unit where it was transferred from the index register in scratchpad memory. The Page number is located in the temporary register P. The Line number is located in a temporary register W. The line array element (reference field 1610 of FIG. 16A) is fetched in operation 2031. In operation 2033 the check is made as to whether or not this line is in the active state. This check is made by looking at the D-switch (see field 1604 of FIG. 16A) of the line offset array element 1603. If the D-switch is equal to zero, one or three, then the record is not in the active state and the firmware proceeds to operation 2034 where the line number W is incremented by one and the firmware branches to operation 2021, FIG. 21B, to prepare to check the next record (line) in the area. If the D-switch is equal to two, the record (line) is in the active state and the instruction can now be successfully terminated. Operation 2036 and 2037 accomplish the loading of the address of the record located in the active state. Operation 2036 loads the base register BR with the segmented address of the record. Operation 2037 loads the index register with the Page and Line W number. The Area number in the index register remains the same. The instruction is then completed in operation 2038.

Looking at FIG. 21C in more detail beginning in operation 2031 the firmware fetches the 16-bit line offset array element 1602 at an address given by the segment base address of the page plus the length of the page header 1601 (81 bits) plus the line number W times 16 bits (these 16 bits representing the length of a single line offset array element). As a result of this memory fetch, memory access exceptions 2032 may occur.

In operation 2033 the D-switch 1604 of the line offset array element is transferred into a register in the arithmetic logic unit 1317. Operation 2033 now checks the D-switch which is located in the arithmetic logic unit to see whether it is equal to zero, one or three. These checks are made in an adder in the arithmetic logic unit. If the D-switch is found to equal one of these values, the firmware branches to operation 2034 where the temporary register W is incremented by one. This incrementing is done by the main adder of the arithmetic logic unit. Following operation 2034, the firmware branches to operation 2020, FIG. 21B.

If the firmware detects that the D-switch is equal to two, the active state, the firmware branches to operation 2036, where the SEG number 1625 of the page descriptor fetched in operation 2005 is transferred to the base register BR whose number is given in the instruction format, field 1902. The moving of the SEG number from the page descriptor to the base register (which is located in the address control unit 1319) is accomplished under firmware control. In operation 2036, the offset portion of the line offset array element 1603 is also transferred into the SRA portion of the base register BR. The segment number is transferred into base register bits 4 through 15. The offset is transferred into bits 18 to 31 of the base register. Following operation 2036, the firmware branches to operation 2037 where the temporary register P is transferred to the index register whose number is given in the base register field BR 1902 of the instruction format. The line number temporary register W is transferred into the index register also. The number of bits in the page and line numbers are determined from the shift count field 1623 of the page descriptor fetched in operation 2005 (Page number of bits equal the shift count, Line number of bits equal 22 minus the shift count). Following operation 2037 the firmware branches to 2038 where the instruction is complete and control is transferred to the next instruction.

Figure 22B:
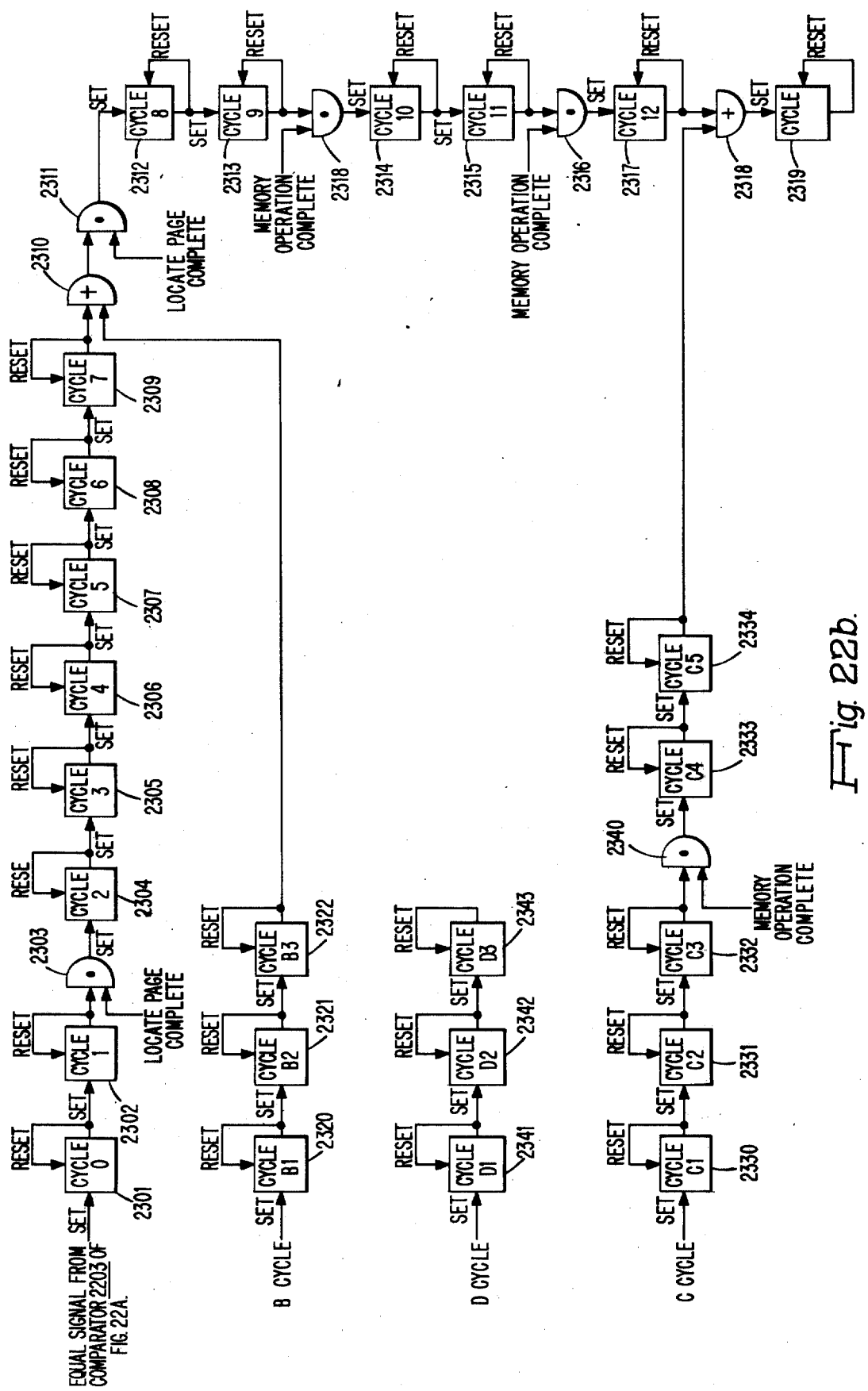

Now referring to FIGS. 22A and 22B, there is shown a block diagram representation of the hardware required in order to implement the find serial database instruction of the present invention. FIG. 22A shows the hardware logic which actually stores data and performs the various operations on the data in order to implement the find serial instruction. FIG. 22B shows the control logic used to sequence transfers and operations on the data in implementing the find serial instruction. The control logic shown in FIG. 22B is often referred to as cycle counter logic.

Briefly, summarizing the operation of the control logic shown in FIG. 22B to facilitate an understanding of the hardware logic in FIG. 22A, first it can be seen that flip-flops cycle 0 through cycle 13 2301 through 2319 define a series of 14 sequential time periods. Cycle B1 through cycle B3 2320 through 2322 define a 3-cycle control sequence which may be repeated reiteratively. At the completion of the B cycles, cycle number 8 of the main cycle sequence is reinitiated. Cycle C1 through cycle C5 2330 through 2334 define a second set of sequences which can also be executed reiteratively. At the completion of the C cycles, cycle 13 of the main sequence is initiated. Cycles D1 through D3 2341 through 2343 define a third set of sequences. At the completion of the D cycles, the instruction complete flip-flop 2248 will be set, ending execution of the find serial instruction.

Looking at FIG. 22A in more detail, upon receipt of a find serial instruction as indicated by the find serial instruction detector 2201, the instruction is temporarily stored in the instruction buffer 2202. The instruction buffer is located in the instruction fetch unit 1318 of the central processing unit 104. As noted supra, the find serial instruction transferred to the instruction buffer 2202 is of the GROP format shown in FIG. 20A. The MBZ field 1911 is immediately compared with the 0 bit 2204 by means of comparator 2203. If the comparator 2203 give a not equal signal, an illegal format field exception is detected and the illegal format field flip-flop 2205 is set, thereby causing the activation of the exception handler mechanism. Execution of the find serial instruction is then complete. If the comparator 2203 indicates an equal compare, then the execution of the find serial instruction continues as described below.

It can be noted that the equal signal, a comparator 2203, which is raised to a logical one value if the MBZ field 1911 is found equal to 0, is input to the set input of the cycle 0 flip-flop 2301. Thus, the equal compare initiates the main cycle sequence, cycle 0 through cycle 13.

The BR field 1912 of the instruction buffer is coupled to AND gate 2206, which is enabled by the cycle 0 signal. Thus, in cycle 0 the BR field is input to the 3 right-hand-most bits of the scratchpad memory address register 2281. Looking at AND gate 2293, which was also enabled by the cycle 0 signal, it can be seen that at cycle 0 a 1 bit flip-flop 2282 is also inputted into the left-most bit of the scratchpad memory address register 2281. The scratchpad memory 2283 operates in the typical manner of prior art scratchpad memories. Thus, when the scratchpad memory address register 2281 is loaded with an address, the contents of that address are read out into the scratchpad memory data register 2217. In this case, the actual value read out of the scratchpad memory 2283 will be the index register whose number is given by the BR base register number from the instruction buffer 2202. This index register contains an area-page-line number as described supra.

Figure 18:
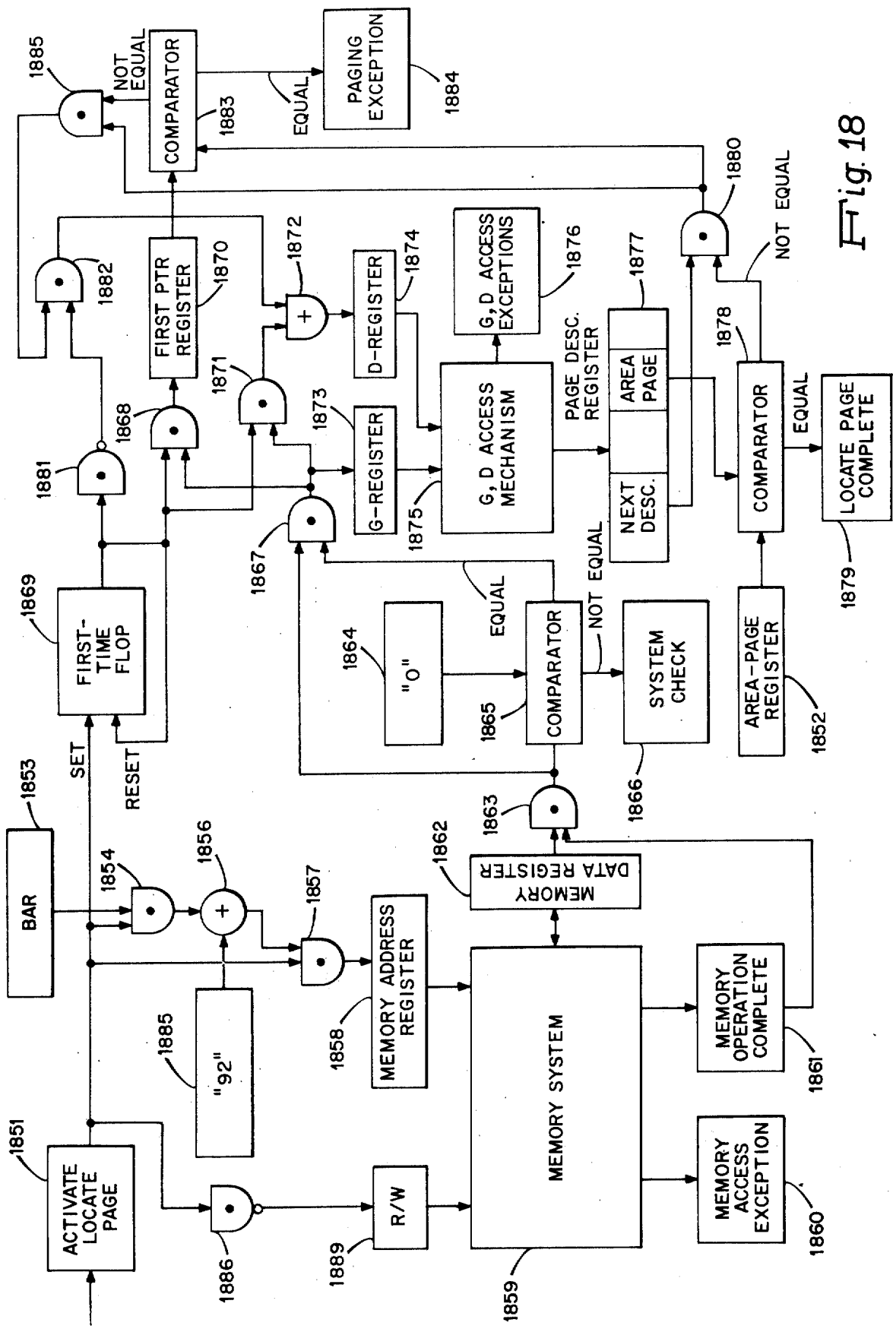
FIG. 18 is a logic block diagram of a hardware mechanism to locate a database page in memory.

In cycle 1, AND gate 2218 is enabled allowing the transfer of the scratchpad memory data register contents via OR gate 2219 to which AND gate 2218 is coupled into the locate page mechanism 2225. The operation of the locate page mechanism has been described supra and a hardware implementation for that mechanism is shown in FIG. 18. Activation of the locate page mechanism involves the setting of the activate locate page flip-flop 2223 as is accomplished by the cycle 1 signal via OR gate 2285 and the loading of the area-page register 2226, into which the contents of the scratchpad memory data register are loaded. The activate locate page flip-flop 2223 corresponds to flip-flop 1851 as shown in FIG. 18. The area-page register 2226 corresponds to register 1852 in FIG. 18. As described supra, execution of the locate page mechanism 2225 may result in paging exceptions in which case the paging exception flip-flop 2224 will be set and the exception handling mechanism will be activated. Otherwise, the page descriptor corresponding to the page number given in the area-page register will be loaded in the page descriptor register 2227 (which corresponds to register 1877 in FIG. 18) and the locate page complete flip-flop 2228 will be set (which corresponds to the flip-flop 1879 in FIG. 18). Note on FIG. 22B that the locate page complete flip-flop being set to a value of 1 along with cycle 1 being at a logical one enables AND gate 2303 which in turn initiates cycle 2 of the main cycle sequence. The locate page complete flip-flop will remain at a logical one value until the locate page mechanism is again activated by the setting of the activate locate page flip-flop 2223 and the loading of the area-page register 2226.

The format of the paper descriptor loaded in the page descriptor register 2227 is shown in FIG. 16B. The cycle 2 signal enables AND gate 2229, which transfers the shift field count field 1623 of the page descriptor into the shift count register 2230. This shift count will be used to take the area-page-line number from the scratchpad register 2217 and shift out the line number portion of that number and load that line number into the W register 2249. During cycle 2, AND gate 2221 which is also enabled by the cycle 2 signal, transfers the area portion 1572 of the scratchpad memory data register 2217 into the area register 2222, where it is stored for later use.

The value stored in the shift count register 2230 is subtracted from a value of 22, stored in register 2235, via a subtractor 2236. This new value which represents the number of bits in the line number is transferred from the output of that subtractor 2236 via AND gate 2237 which is enabled by cycle 3, to OR gate 2239, which is in turn input as the shift value for shifter 2243. Also in cycle 3, the scratchpad memory data register 2217 is input via AND gate 2241 which is enabled by cycle 3 through OR gate 2242 into the shifter 2243 to be shifted. The output of the shifter is coupled to AND gate 2245 which is enabled by cycle 4. Thus, in cycle 4, the output of the shifter representing the line number obtained from the index register addressed by the instruction, is transferred via OR gate 2248 into the W register 2249, where it is stored for later use.

In cycle 5, the value stored in the shift count register 2230, which was obtained from the page descriptor field 1623, is transferred via AND gate 2238 which is enabled by cycle 5, through OR gate 2239 into the shift count input of shifter 2243. The contents of the scratchpad memory data register 2217 are transferred via OR gate 2240 which is enabled by cycle 5, through OR gate 2242 into the shift value input of the shifter 2243. In cycle 6, the shifted output of shifter 2243 representing the page number obtained from the index register addressed by the instruction, is transferred via OR gate 2246 into the P register 2247. The page number stored in the P register 2247 will be used later.

The W line number in the W register 2249 is coupled to one of the adder inputs of adder 2253. The other input to adder 2253 is flip-flop 2252, which contains a value of 1. The output of adder 2253 representing the line number W incremented by 1, is coupled to AND gate 2254 which is enabled by cycle 7. Thus, in cycle 7 the line number W is incremented by 1 is transferred through AND gate 2254 to OR gate 2256, to which AND gate 2254 is coupled, back to OR gate 2248. The output of OR gate 2248 is in turn coupled to the W register 2249, in which the incremented value of the line number is stored.

In cycle number 8, the segment number field 1625 of the page descriptor register 2227 is transferred via AND gate 2280, which is enabled by cycle 8, into the address control unit 2207. When the address control unit is supplied with a segment number, the base address of the segment descriptor of that segment is read out from the address control unit into the address register 2209, as described in the patent, Segmented Address Development. The segment base address contained in the address register 2209 is transferred via AND gate 2266, which is enabled by the cycle 9 signal. The output of AND gate 2266 is in turn transferred through OR gate 2267 into the memory address register 2210 of the memory system 2213. It can be noted that the find serial instruction detector 2201 is also coupled to inverting AND gate 2211, which is in turn coupled to the memory system read/write flip-flop 2212. The find serial instruction detector signal being a logical one results in the output of gate 2211 being a logical zero, thereby resulting in the read/write flip-flop 2212 being set to a value of 0. When the memory system 2213 has detected that the memory address register 2210 has been loaded and that the read/write flip-flop 2212 is set to a logical 0, a memory read operation is initiated. Operation of a memory system is described in the patent application entitled, Segmented Address Development. As a result of a memory operation, memory access exceptions 2214 may occur as described in the patent application Ser. No. 425,356 filed Dec. 17, 1973 and issued into U.S. Pat. No. 3,938,096 on Feb. 10, 1976. If such exceptions occur, the memory access exception flip-flop 2214 will be set to a logical one value. The exception handler mechanism as described in the patent application, Exception Handling, will be activated. Otherwise, the memory operation completes normally and the memory operation complete flip-flop 2215 will be set to a logical one. Upon the transition of the memory operation flip-flop 2215 to a logical one state, the data read from the memory system 2213 has been transferred to the memory data register 2216. The transition of the memory operation complete flip-flop 2215 to a logical one enables AND gate 2268, thus transferring the segment base address read out of the memory system into the segment base address register 2284, where that value is stored.

Cycle 9 also enables AND gate 2231, which transfers the last page indicator 1626 from the page descriptor register 2227 to store the value of the last page indicator in flip-flop 2232.

It can be noted on FIG. 22B that the cycle 10 flip-flop 2314 is set by AND gate 2318, which is enabled by the cycle 9 signal and the memory operation complete signal.

The segment base address register 2284 is coupled to one of the adder inputs of adder 2270. The other input to adder 2270 is the register 2269, which contains the value of 8. The output of adder 2270 is coupled to AND gate 2271, which is enabled by the cycle 11 signal. The output of AND gate 2271 is transferred to OR gate 2267, which is in turn transferred to the memory address register 2210. The address which is thus stored in the memory address register 2210 represents the address of the line array size field in the page header of the area-page address by the scratchpad data register 2217. This is a page header 1601 as shown in FIG. 16A. Thus, the memory system 2213 which is activated by the loading of the memory address register 2210 will read out the line array size from the memory system. As a result of the memory operation, memory access exceptions 2214 may occur. If such exceptions occur, the memory access exception flip-flop 2214 will be set to a logical one value. The exception handler mechanism will be activated. Otherwise, the memory operation completes normally and the memory operation complete flip-flop 2215 will again be set to a logical one value. It can be noted on FIG. 22B that AND gate 2216 is enabled by the cycle 11 signal and the memory operation complete signal to thus set the cycle 12 flip-flop 2317. Hence, cycle 12 begins after the completion of the memory operation and enables the transfer of the line array size via AND gate 2274 to the Z register 2275.

The Z register 2275 is one input to comparator 2276. The other input to comparator 2276 is the W register 2249. If comparator 2276 finds the value in the W register greater than or equal to the value in the z register, the W greater than or equal to Z signal, which is coupled to AND gate 2277, enables the setting of the B cycle flip-flop 2278 and 2277 is enabled by the cycle 13 signal. The B cycle flip-flop 2278 being set to a logical one value in turn initiates the B cycle sequences B1 through B3 as shown in FIG. 22B, flip-flops 2320 through 2322.

If comparator 2276 finds the W value in the W register 2249 less than the Z value in the Z register 2275, the W less than Z signal, which is coupled to AND gate 2278, together with the cycle 13 signal enable the setting of the C cycle flip-flop 2279. The setting of the C cycle flip-flop 2279 initiates the C cycle C1 through C5, as can be seen in FIG. 22B, flip-flops 2330 through 2334.

Looking at FIG. 22A to see the actions which result from the B cycles, it can be seen that cycle B1 enables AND gate 2233 which transfers the value stored in the last page indicator flip-flop 2232 to the set input of the last record exception flip-flop 2234. Thus, if the last page indicator value obtained from the page descriptor register 2227 is a logical one, the last record exception flip-flop 2234 will be set, activating the exception handling mechanism. If the last page indicator value is a logical zero, the last record exception will not occur.

If the last record exception condition does not exist, cycle B2 enables AND gate 2250 to transfer a value of 0 from the register 2251 via OR gate 2248, to which AND gate 2250 is coupled, into the W register 2249. Thus, as a result of cycle B2, the W register 2249 is reset to a 0 value. Cycle B2 also enables AND gate 2257. It can be noted that the P register 2247 is coupled to one of the adder inputs of adder 2258. The other input to the adder 2258 is a value of 1 stored in flip-flop 2259. The output of adder 2258 is coupled to AND gate 2257, which is enabled by cycle B2, and transferred via OR gate 2246 into the P register 2247. Thus, as a result of cycle B2, a value of P plus 1 is loaded into the P register 2247.

In cycle B3, the new value of the P register 2247 is combined with the area register 2222 through AND gate 2220 to be loaded into the locate page mechanism 2225. AND gate 2220 is thus coupled to OR gate 2219, which is in turn coupled to the area-page register 2226 of the locate page mechanism 2225. The cycle B3 signal is also used to set the activate locate page flip-flop 2223 via OR gate 2285.

As described previously, the operation of the locate page mechanism 2225 may result in the occurrence of a paging exception. If this is the case, the paging exception flip-flop 2224 will be set and the exception handling mechanism will be activated. Otherwise, the page descriptor as shown in FIG. 16B of the page whose number is contained in the area-page register 2226 will be loaded in the page descriptor register 2227 and the locate page complete flip-flop 2228 will be set to a logical one value at the completion of the mechanism's operation. Activation of the locate page mechanism results in a lowering of the locate page complete flip-flop 2228 to a value of 0 until completion of that mechanism. Looking at FIG. 22B, it can be seen that the cycle 8 flip-flop 2312 can be set via OR gate 2210 when the cycle B3 signal is at a logical one value and when the locate page complete signal is again raised to a logical one value. This is because the output of OR gate 2210 is coupled to AND gate 2311, which is enabled by the raising of the locate page complete signal. Thus, the cycle 8 flip-flop 2312 is again set to a logical one value at the completion of the locate page mechanism. Cycles 8, 9, 10, 11, 12 and 13 will again be executed in the manner previously described.

Looking at the execution actions of the C cycles C1 through C5 which are initiated by the setting of the C cycle flip-flop 2279, it can be seen that cycle C1 enables AND gate 2262 as shown in FIG. 22A. The other input to AND gate 2262 is the output of multiplier 2261. One of the inputs to multiplier 2261 is the W register 2249. The other input to multiplier 2261 is register 2260, which contains a value of 2. Thus, the line number W is multiplied by a value of 2, which in this case represents two bytes of the memory system 2213. Two bytes constitute the length of line offset item such as 1604-1603 in the line offset array 1602 of FIG. 16A. The multiplying of the W line number by the size of the line offset item thus indexes into an address locating the proper line offset item for line W. The output of the multiplier 2261 is coupled to AND gate 2262, which is enabled by the cycle C1 signal. AND gate 2262 is in turn coupled to one of the adder inputs of adder 2263. The other input to adder 2263 is a value of 10 as stored in register 2264. The value of 10 represents the offset address in bytes of the beginning of the line offset arrary 1602, as shown in FIG. 16A. Thus, the output of adder 2263 addresses the relative location of the line number W's line offset item in the page as shown in FIG. 16A and described previously. The output of adder 2263 is coupled to AND gate 2265, which is enabled by cycle C2. The output of AND gate 2265 is input to another adder 2286. The other input to adder 2286 is the segment base address register 2284. Thus, the output of adder 2286 represents the absolute address of the desired line offset array item of line number W. The output of adder 2286 is coupled to AND gate 2287, which is enabled by cycle C3. The output of AND gate 2287 is transferred via OR gate 2267 into the memory address register 2210. When the memory system 2213 has detected that the memory address register 2210 has again been loaded and that the read/write flip-flop 2212 is set at a logical zero value, a memory read operation is again initiated. As a result of the memory operation, memory access exceptions 2214 may occur as described in the patent application Ser. No. 425,356 filed Dec. 17, 1973 and now issued into U.S. Pat. No. 3,938,096 on Feb. 10, 1976. If such exceptions occur, the memory access exceptions flip-flop 2214 will be set to a logical one value and the exception handler mechanism will be activated. Otherwise, the memory operation completes normally and the memory operation complete flip-flop 2215 will be set to a logical one, indicating that the desired line offset array item has been transferred to the memory data register 2216. It can be seen in FIG. 2B that cycle C3 and the raising of the memory operation complete signal enable the set input of cycle C4 flip-flop 2223 to be raised to a logical one, thus initiating cycle C4.

Cycle C4 enables the transfer of the D-switch, as shown in FIG. 16A field 1604, of the line offset array item, via AND gate 2272 into comparator 2273. The other input to comparator 2273 is register 2288, which contains a value of 2.

If comparator 2273 finds the D-switch of the line offset array item of the W line number not equal to a value of 2, the not equal signal, along with cycle C5, enables AND gate 2255 to transfer the output of adder 2253 (which is the line number register W 2249 incremented by 1) via OR gate 2256 through OR gate 2248 (to which OR gate 2256) is coupled. OR gate 2248 is coupled in turn into the register W 2249. Thus, register W 2249 is again incremented by 1. As can be seen in FIG. 22B, the completion of cycle C5 flip-flop 2334 causes the activation of cycle flip-flop 2319. This is because the output of cycle C5 flip-flop 2334 is coupled to OR gate 2318, which is in turn coupled to the set input of cycle C13 flip-flop 2319.

If comparator 2273 finds the D-switch equal to 2, the equal signal in comparator 2273 sets the D cycle flip-flop 2288. The D cycle signal activates the D sequence of cycles D1 through D3.

In cycle D1, the offset portion of the line offset array item (see field 1603 of FIG. 16A) corresponding to line W is transferred via AND gate 2289, which is enabled by cycle D1, into the base register BR input register 2292. This line offset array item's offset field is transferred into the offset field of the base register input register 2292, as shown in FIG. 2, 202. Also in cycle D1, the segment number field 1625 of the page descriptor 2227 is transferred via AND gate 2291, which is enabled by cycle D1, into the segment portion of the BR input register 2292. The segment number is transferred into STN, STE field of the base register as shown in field 202 of FIG. 2. Finally, as a part of cycle D1, the Br field of the instruction buffer 2202 is transferred via AND gate 2290, which is enabled by cycle D1, into the BR section 2208 of the address control unit 2207. When the address control unit 2207 is supplied with a BR base register number in its BR section 2208 and the BR input register 2292 is loaded with a new value, the address control unit writes the value contained in the BR input register 2292 into that base register by means of a normal scratchpad memory type write operation.

It can be noted that the scratchpad memory 2283 has its scratchpad memory read/write flip-flop 2295 initially set to a 0 value, indicating a read operation, by the action of the find serial instruction detector 2201, which is coupled to inverting AND gate 2294. Since the find serial instruction detector 2201 was raised to a value of logical one, the output of inverting AND gate 2294 is lowered to a value of 0, which is transferred via OR gate 2299 into the scratchpad memory read/write flip-flop 2295 as a value of 0. However, in cycle D2, the cycle D2 signal, which is a one value, is transferred via AND gate 2401 to OR gate 2299 and in turn into the scratchpad memory read/write flip-flop 2295 as a value of 1, indicating a write operation. Also in cycle D2 the W register 2249 is transferred to the line number portion 1574 of the area-page-line number in the scratchpad memory data register 2217 via AND gate 2297, which is enabled by cycle D2. Also the P register 2247 is transferred into the page number section 1573 of the area-page-line number in the scratchpad memory data register 2217 via AND gate 2992, which is enabled by cycle D2. The area number section 1572 of the area-page-line number in the scratchpad memory data register 2217 has been unchanged since it was first read out of the scratchpad memory during cycle 0. Also, the address in the scratchpad memory address register 2281 is the address of the index register corresponding to the BR base register number in the instruction buffer 2202. The scratchpad memory 2283 writes the new area-page-line number into this index register after the cycle D1 signal has caused the scratchpad memory data register 2217 to be loaded and the scratchpad memory read/write flip-flop 2295 to be raised to a logical one value.

The cycle D3 signal is coupled to the set input of the instruction complete flip-flop 2298. Thus, the cycle D3 signal sets the instruction complete flip-flop to a logical one, indicating the end of the find serial database instruction.

FIG. 22B shows the detailed logic for the cycle counter control logic of the find serial hardware implementation shown in FIG. 22A. Cycle 0 through cycle 13, flip-flops 2301 through 2319, constitute the main cycle sequence of the control logic. Cycle B1 through cycle B3, flip-flops 2320 through 2322 constitutes the B cycle sequence. Cycle C1 through cycle C5, flip-flops 2330 through 2334, constitute the C cycle sequence. Cycle D1 through D3, flip-flops 2341 through 2343, constitute the D cycle sequence. Each flip-flop in FIG. 22B is a synchronous flip-flop. Thus, a checking system as described in patent application Ser. No. 425,661 filed Dec. 17, 1973 and issued in U.S. Pat. No. 3,891,974 on June 24, 1975 (see FIG. 13a element 1320) is used to trigger the logical state changes in each of these flip-flops. The clocking system would have a clock signal connected to the clock input of each of these flip-flops. Each of the flip-flops in this control cycle counter logic also has its output signal connected to its reset input. Thus, a cycle flip-flop being set to a 1 value results in the flip-flop being reset to a 0 value one clock period later. The result of this type of flip-flop connection is a series of sequential cycle pulses.

The equal signal from comparator 2203 of FIG. 22A is coupled to the set input of cycle 0 flip-flop 2301. Thus, after the MBZ field 1911 of the find serial instruction has been verified to be a value of 0, cycle 0 is initiated. The cycle 0 flip-flop 2301 has its output coupled to the set input of the cycle 1 flip-flop 2302. The output of the cycle 1 flip-flop 2302 is coupled to AND gate 2303. AND gate 2303 is enabled by the locate page complete flip-flop signal from the locate page mechanism 2225. Thus, the output of AND gate 2303 is raised to a logical one value when the locate page mechanism has completed its operation, at which time the find serial instruction is ready to progress to the next step of its execution. The output of AND gate 2303 is directly coupled to the set input of the cycle 2 flip-flop 2304. The output of the cycle 2 flip-flop 2304 is coupled to the set input of the cycle 3 flip-flop 2305. The output of the cycle 3 flip-flop 2305 is coupled to the set input of cycle 4 flip-flop 2306. The output of the cycle 4 flip-flop 2306 is coupled to the set input of the cycle 5 flip-flop 2307. The output of the cycle 5 flip-flop 2307 is coupled to the set input of the cycle 6 flip-flop 2308. The output of the cycle 6 flip-flop 2308 is coupled to the set input of the cycle 7 flip-flop 2309.

The output of the cycle 7 flip-flop 2309 is coupled to OR gate 2310. The other input to OR gate 2310 is the output of the cycle B3 2322. Thus, the next sequence after cycle 7 can be activated by either the cycle 7 signal or the cycle B3 signal. The output of OR gate 2310 is coupled to AND gate 2311. This AND gate is enabled by the locate page complete signal from the locate page complete flip-flop 2228. AND gate 2311 is coupled to set input of the cycle 8 flip-flop 2312. The output of the cycle 8 flip-flop 2312 is coupled to the set input of the cycle 9 flip-flop 2313. The output of the cycle 9 flip-flop 2313 is coupled to AND gate 2318. This AND gate is enabled by the memory operation complete signal from the memory operation complete flip-flop 2215. Thus, after cycle 9 and the memory operation has completed, AND gate 2318 is raised to a logical one value, and since AND gate 2318 is coupled to the set input of cycle 10 flip-flop 2314, cycle 10 then follows. The output of cycle 10 flip-flop 2314 is coupled to the set input of the cycle 11 flip-flop 2315. The output of the cycle 11 flip-flop 2315 is coupled to the AND gate 2316. This AND gate is also enabled by the memory operation complete signal from the memory operation complete flip-flop 2215, which is raised to a logical one value upon the completion of the memory system. The output of AND gate 2316 is coupled to the set input of the cycle 12 flip-flop 2317.

The output of the cycle 12 flip-flop 2317 is coupled to OR gate 2318. The output of the cycle C5 flip-flop 2334 is also coupled to OR gate 2318. OR gate 2318 is coupled to the set input of cycle 13 flip-flop 2319.

The B cycle sequence is activated by the B cycle flip-flop 2278, whose output is coupled to the set input of the cycle B1 flip-flop 2320. The output of cycle B1 flip-flop 2320 is coupled to the set input of the cycle B2 flip-flop 2321. The output of the cycle B2 flip-flop 2322 is coupled to the set input of the cycle B3 flip-flop 2322. As stated previously, the output of cycle B3 flip-flop 2322 is also coupled to OR gate 2310, which is coupled via AND gate 2311 to the set input of the cycle 8 flip-flop 2312.

The C cycle sequence is activated by the C cycle flip-flop 2379, whose output is coupled to the set input of the cycle C1 flip-flop 2330. The output of the C1 flip-flop 2330 is coupled to the set input of the cycle C2 flip-flop 2331. The output of cycle C2 flip-flop 2331 is coupled to the set input of cycle C3 flip-flop 2332. The output of cycle C3 flip-flop 2332 is coupled to AND gate 2340. AND gate 2340 is enabled by the memory operation complete signal from the memory operation complete flip-flop 2215. The output of AND gate 2340 is coupled to the set input of cycle C4 flip-flop 2333. The output of the cycle C4 flip-flop 2333 is coupled to the set input of the cycle C5 flip-flop 2334. As was pointed out supra, the output of cycle C5 flip-flop is coupled to OR gate, 2318 which is in turn coupled to the set input of the cycle 13 flip-flop 2319.

The D cycle sequence is activated by the D cycle flip-flop 2288, which is coupled to the set input of the cycle D1 flip-flop 2341. The output of the cycle D1 flip-flop 2341 is coupled to the set input of the cycle D2 flip-flop 2342. The output of the cycle D2 flip-flop 2342 is coupled to the set input of the cycle D3 flip-flop 2343.

Having shown and described one embodiment of the invention, those skilled in the art will realize that many variations and modifications can be made to produce the described invention and still be within the spirit and scope of the claimed invention. Thus, many of the steps may be altered or replaced by different steps which will provide the same result and fall within the spirit of the claimed invention. It is the invention therefore to be limited only as indicated by the scope of all of the claims.

| | GLOSSARY OF TERMS |
|---|---|
| Absolute Address | the physical address of a hardware byte in main memory store. |
| Address Development | a hardware function which operates on a number of address elements to compute an absolute address which is used to refer to a location in main storage. |
| Addressing | locating an object by any of a number of virtual, logical, and physical means. |
| Address Space | the set of logical, segmented addresses corresponding to a process that the CPU is permitted to transform into absolute addresses during execution of that process. |
| Address Space Word | one of two words in a process control block which point to the segment table word array. The segment table word array defines the segment tables associated with the process. |
| Address Syllable | a logical address recognized by CPU hardware, normally an operand of an instruction. |
| Analyzer/Translator | that part of the static linker that first passes |

-continued

| | |
|---|---|
| | the control language stream to the linker; then, if the control language is error-free, the analyzer/ translator converts it to tables and other structures for the static linker to use. |
| Asynchronous Processing | concurrent activation of more than one process. |
| Auxiliary Memory | is comprised of 64 flip-flops for storing miscellaneous states of the system and is located in ALU. |
| Base Register | the primary element in segment addressing, referenced by number in every address syllable. |
| Boundary Address Register | a visible hardware register that defines the lowest memory address accessible to firmware/software. |
| Call | see procedure call -Inward Call-Outward Call. |
| Central Process Unit | a part of a computer that includes circuits controlling the interpretation and execution of instructions. |
| Channel | a means of communicating between the processor subsystem and a peripheral subsystem. There are two types of channels, physical and logical. A physical channel is the hardware connection between the input/output control unit IOC and the peripheral control unit PCU. A logical channel is a software communications path between main memory and a single peripheral device. |
| Channel Command Entry | an instruction in a channel program. |
| Channel Command Word | an element of a channel command entry. Two channel command words constitute a channel command entry. |
| Channel Program | a sequence of instructions that cause a specific input/output i/o operation to be performed by a peripheral device. |
| Complementary Code | a code in some instructions which together with the operation code defines the function of the instruction. |
| Compilation Unit | the single object-code module that results from compiling or assembling one procedure in any high level language processor. The CU is not executable unit it is linked. |
| Concurrency | apparent simultaneity. |
| Condition Field | a 4-bit field in a branch instruction. Each bit of the field corresponds to a setting of the condition code in the status register bits 0 and 1. |
| Contest Indicator | a hardware structure located in auxiliary memory and indicates a new entry was placed in the ready queue, and there may be possible content for priority. |
| Data Address Space | the set of logical record addresses accessible by a process through data management; consists of four elements; logical fields, logical records, data base pages, and files. |
| Data Descriptor | an information structure which is used in indirect addressing and as a description in data manipulation. |
| Decor | the functional characteristics or architecture of a computer system. |
| Decor Extension Mode | a mode of operation permitting the operating of the system in emulation mode. |
| Descriptor | a 32-or 64-bit field used in developing the address of any data field. It is one of many pointers in the addressing scheme of the invention. |
| Descriptor Block | a data block containing any number and variety of descriptor declarations except semaphore descriptors. No other data is allowed. |
| Device Adapter | electronics which adapts a specific device to a peripheral controller. |
| Device Adapter Interface | the interface between a device adapter and its associated peripheral controller(s). |
| Device Control | a software facility which handles device specific characteristics. |
| Dispatcher | the firmware responsible for dispatching processes in the CPU. |
| Dispatching | a field within the instruction format or a data descriptor which provides relative position information within a segment. |
| Displacement Addressing | a form of direct addressing in which the operand defines a location relative either to the base of the immediate segment or to the current location counter. |
| Dynamic Addressing | addressing which results in resolution, during execution, of references defined within the process group. |
| Editor | that part of the static linker that format and outputs any or all of the information that results from linking a particular procedure. |
| Effective Address | a logical, as opposed to physical, address consisting of a segment table number, a segment table entry, and a segment relative address. These elements show the way to a particular segment segment descriptor, which eventually points to the segment being referenced. |
| Emulation Mode | operation of a computer so as to initiate another computer, and appear to operate in the other computer's |

-continued

| | |
|---|---|
| Exception | an exception occurs when the hardware detects the existence of some condition that has been specified as requiring special handling. |
| Event | anything observed in a system by a process which may be of interest to some other process. |
| Field Class | a set of similar field values each from a different record in the same record class, which are used to store the same property. For example, all the field values for age within the employee record class. |
| Field Value | an element of data associated with a record which represents the value of some property of the entity which is represented by the record. The value may be represented as a character string, a number, a Boolean value, or some data which can be interpreted as the value or which will indirectly lead to the value. |
| Firmware | that part of a hardware unit implementation which utilizes a form of micro-programmed control. |
| G, D Name | the name used by the hardware to refer to a semaphore. G, The G-segment name is the number of the entry in the G-table containing the segment descriptor; D is the relative address in the segment. |
| G-Segment | a segment containing semaphores which may be addressed using the G, D name form and associated mapping facility (the G-table). |
| G-Table | a table used for storage mapping (locating a G-segment) when the G, D name form is used. |
| Gating | a facility for controlling entry to procedures in a (gated) segment through the use of procedure descriptors. |
| General Register | a 32-bit register available to executing processes which generally holds binary or bit string data. Certain general registers can be used for indexing (GR8 through GR15). |
| Index | a data structure which is maintained and operated upon by the system. The structure is visible to the user only in terms of a key which he presents for the purpose of making available or positioning to a specific record occurrence. |
| Indexing | modification of an address by a signed arithmetic value by adding something to something. |
| Index Register | a general register used for indexing (GR8 through GR15). |
| Indirection | a method of addressing whereby an address is used to obtain another address, rather than the actual data. |
| Indirection to Base | the form of indirection whereby a data descriptor containing a base register number and a displacement is found at the address referenced. |
| Indirection to Segment | the form of indirection whereby a data descriptor containing a segment address is found at the address referenced. |
| Indirect Segment Descriptor | a type of segment descriptor which contains information for addressing another segment descriptor, rather than a segment. |
| Instruction | the unit of execution of a central processor visible to a programmer. |
| Instruction Counter | a register associated with an executing process which contains the segmented address of the next instruction of the procedure being executed. |
| Interleave | sequential accessing of memory modules to reduce memory access time. |
| Interrupt | the discontinuance of a process in the system due to an event occurrence. |
| Interrupt Process | a process which is activated in response to an interrupt. |
| Inward Call | when one procedure execution in one ring number calls another procedure to execute in a lower ring number. |
| I/O Controller | a unit which provides the basic control for a specific I/O subsystem. |
| I/O Processor | potentially asynchronous system processes which deal primarily with the movement of data between peripheral storage or I/O devices and main storage. |
| J.P. Tables | a collection of logical addresses for locating a process control block. |
| Job | a unit of work for the system. |
| Job Control Language | a language for describing a job and its component parts. |
| Job Step | the major subdivision of a job leading to the execution of a program defined by a JCL statement. |
| Job Step Table | a system table used to map the first part of a process name, i.e., to locate the process group table. |
| Linked Module | the output of the static linker. It is a consolidated group of compilation units (CU) whose cross-references were resolved by the static linker. |
| Linking | see static linking. |
| Logical Channel | see channel. |
| Logical Processor | the collection of hardware resources and control information necessary for the execution of a process. |

-continued

| | |
|---|---|
| Main Storage | all addressable storage from which instructions can be executed or from which data can be loaded directly into registers. |
| Magnetic Tape Controller | the elements of the peripheral subsystem related to magnetic tape devices. |
| Mass Storage Controller | the elements of the peripheral subsystem related to mass storage devices. |
| Member | a role a record plays in relationship with a set occurrence. A record's current status as a member may be either that of being inserted into a set, or not being inserted. |
| Memory Management | operating system facilities for the allocation, relocation, and disallocation of physical memory. |
| Message | information transmitted from a source or to a destination-neither being a file. |
| Microinstruction | same as microinstruction word, and control store word. |
| Micro-program | a set of machine codes used to implement the control functions of a processor. |
| Multiplex | to share a hard resource, such as memory, usually by time division. |
| Multi-programming | the concurrent execution of two or more programs by a single computer. |
| Native Mode | operation of a computer in its native environment. |
| Offset | in address development, the number of bytes after the beginning of the segment at which an addressed part of the segment starts. |
| Operating System | a system of basic software designed to support the efficient operation of user software. |
| Outward Call | when one procedure executing in one ring number calls another procedure to execute in a higher ring number. |
| Owner | a role a record plays in relationship with a set. A set occurrence exists for the time duration that a record exists with the role of owner. |
| Peripheral Control Unit | a stand-alone micro-programmed processor which executes channel programs to perform I/O operations. |
| Peripheral Subsystem Interface | a standard interface used for transfer and control between free-standing peripheral control units and I/O control units. |
| Physical Channel | see channel. |
| Physical Data Structure | a complete definition of the organization of data as it is physically recorded on media. |
| Physical I/O | that part of the operating system which initiates and controls the transfer of data between memory and peripheral or terminal devices. |
| Physical Storage | hardware used for the storage of data. It is composed of various types of recording media and the recording/reading hardware. |
| P-operation | a machine instruction involving a semaphore which causes a process to enter the wait state or to receive a message. |
| Pointer | an information element used to uniquely identify an entity within an information structure. The content of the pointer may be a unique symbol which identifies the entity or the address of the entity in some address space. |
| Pointer-Database | a pointer whse content is based upon an address space which is different than the normal addressing space of the computer. Typically, database pointers are concerned with address spaces which are larger than hardware supported address, and offer some form of indirection which eases the problem of consolidating currently unused storage. |
| Pointer-Intra Segment | a pointer whose content is the partial virtual memory address of the entity being addressed. The missing segment portion of the virtual memory address is the same as that of the segment of the intra segment pointer and thus is implicitly known. |
| Pointer, Virtual Memory | a pointer whose content is the virtual memory address of the entity being addressed. |
| Privileged Instruction | an instruction which must be executed in ring 0. |
| Procedure | a named software function or algorithm which is executable by a processor without concurrency: a Fortran subroutine, a Cobol program, a PL/1 internal procedure. |
| Procedure Call | a mechanism for creating a stack frame within a stack segment. |
| Procedure Descriptor | a word containing the location and entry point of a procedure. |
| Procedure Segment | the type of segment whose contents represents a procedure, procedures, or part of a procedure. |
| Process | the ordered execution of instructions without concurrency by a processor, either central or i/o. |
| Process Address Space | the memory addresses which may be referenced or to which control may be transferred during a particular process. |
| Process Control Block | a data structure (hardware defined and recognizable) that contains information needed to specify the state of a process at any given time. |
| Process Group | a related set of processes, usually those necessary for the performance of a single job-step. |
| Process Group | that part of the static linker whose actions yield |

-continued

| | |
|---|---|
| Builder | the linked module. |
| Process Group | an operating system facility that makes final |
| Loader | resolutions in a linked module to create an executable process group then it loads the process group into memory and starts its execution. |
| Process Group Table | see P Table. |
| Process Link | an entry in a ready process or waiting process queue. |
| Process State | the dynamic condition of a CPU process e.g., running, ready, waiting, or suspended. |
| Process Switch | the hardware function that disassociates one process from the central processor and associates another. |
| Process Synchronization | the functions that act to coordinate the asynchronous activity among processes. These functions generally involve semaphores and the P and V operations. |
| Processor | a unit capable of receiving data, manipulating it, supplying results, and controlling its sequence of operations in response to stored programs: short for central processor, generic for central processor, peripheral processor, or hardware/software processor. |
| Program | the specification of the procedural and associated information necessary to solve a problem, i.e. the ordered collection of instructions which is executed by the computer and operates on data to perform a user's job or some phase of that job. |
| Program Execution | the activity of a process in conformance to program specification. |
| Protection | the function, enforced by hardware and software, of preventing processes from interferring with each other or sharing each other's address space in an unauthorized manner. |
| P-Table | a hardware defined data structure containing entries, each pointing to the origin of a process control block. The P-table entries point to the total set of PCB's comprising a process group at any given time. Also called process group table. |
| Q/PR/RDY | queue of processes ready i.e. a ready-queue. |
| Queue | an ordered list of entities awaiting information, process or availability. |
| Ready State | a process state in which no processor is associated but all necessary resources, except a processor, are available for changing to the running state. |
| Record | an element of data which represents one real world object. For example, a "personnel" record representing an employee, a "customer" record representing a customer, a "purchase order" record representing a purchase. |
| Record Class | a set of similar records so defined that each record qualifies for only one record class. Examples are all the personnel records, all the customer records, all the purchase order records. |
| Record Descriptor | an information structure which is used in the creation, recognition and destruction of record structures. Record descriptor relates to a single record class. |
| Relative Address | the incremental/decremental location of some object relative to another. |
| Relocation | movement of a segment from one location in main storage to another including the adjustment of all required references to its previous location. |
| Return | the function and operations necessary to resume the action of a procedure at a point immediately following the point where it entered some other procedure. |
| Ring | a protection attribute of a segment that restricts the read, write, and execute access of process to that segment. A level of privilege of a process for read, write or execute. |
| Rolling-in | performing the operation necessary to give control of a processor to a new process. |
| Rolling-out | performing the operations necessary to take away control of a processor by a process. |
| Running State | the dynamic condition of a process (connected to a CPU) that is executing. |
| Scratch Pad Memory | 256 locations in ALU for storing CPU control information-also known as a local store unit. |
| Scheduling | determining the sequence of operations. |
| Scientific Registers | a 64-bit register used in the manipulation of binary floating point numbers. There are four scientific registers in the invention when the system has the scientific option. |
| Segment | a contiguous main memory space treated as a unit. |
| Segmentation | the use of a division of main memory into logical groupings called segments rather than into a single linear store. |
| Segment Base | the current origin of the segment. This is one of the fields in a segment descriptor word. |
| Segment Descriptor | entry in a segment table defining the characteristics of a segment or pointing to a segment descriptor. |
| Segmented Address | see effective address. |
| Segment Number | the identification of a particular segment consisting of a segment table number (selecting one of |

-continued

| | |
|---|---|
| | the segment tables of the process) and a segment table entry of that chosen table. |
| Segment Relative Address | during address development, the final value to be added to the segment base to obtain the absolute address. |
| Segment Table | a table containing segment descriptors used to establish the addressability of a process to its segments. The collection of segment tables of a process defines the address space for that process. |
| Segment Table Entry | an item in a segment table. Each segment table entry is a segment descriptor. |
| Segment Table Word | an entry in a segment table word array pointing to the segment tables of a process. The array is pointed to by one of two address space words in the process control block. |
| Semaphore | data structures used to control communication between processes. |
| Semaphore Block | a data block containing only semaphore descriptor declarations. |
| Set | a "set" is a collection of one or more records. It has one "owner" record which is the definition of the set. It has zero, one or more "member" records. A set may be ordered to give meaning to: <br> "first member" <br> "last member" <br> "next member" <br> "prior member" |
| Set Class | a set class is a named collection of sets based upon rules for: <br> set roles <br> set occurrence selection <br> set ordering <br> A set can be a member of only one set class. A record can be a member of only one set within a set class. |
| Set Descriptor | an information structure which is used in the initiation; insertion, retrieval and removal of records in relationship to set structures. A set descriptor relates to a single set class. |
| Stack | a mechanism that accepts, stores, and allows retrieval of data on a last-in-first-out basis. Comprised of a number of contiguous portions called stack frames. |
| Stack Active Area | the portion of the current stack frame that holds a pointer to the saving area, the caller's instruction counter, parameter space and local variables--in short, the data of the current frame most likely to be useful to execution of the called procedure. |
| Stack Base Words | a group of three words in a process control block which contain the segmented address of the stack segments for rings 0, 1, and 2 associated with the process. |
| Stack Frame | a contiguous part of the stack segment holding the data stored for a single procedure call. |
| Stack Operations | the push-down and pop-up operations of storing and retrieving information to/from the stack. In practice, manipulation of the pointers used to reference the information stored in the stack. |
| Stack Overflow | the action of attempting to store more information into the stack then the available space can hold. This is detected by hardware. |
| Stack Register | see T register. |
| Stack Segment | the segment of a process that contains its stack. |
| Static Linking | an intermediate step between compiling a source procedure and executing the object form of that procedure; linking resolves the external references made to and from that procedure. |
| Status Register | an 8-bit register which specifies the status of the procedure currently being executed. |
| Swapping | releasing the main memory space occupied by a segment by writing the segment out to secondary storage. The actual write to secondary storage may be suppressed if the segment has not been modified since the last time it was read in. |
| Synchronization | having a fixed relationship in time; synchronized execution of two or more processes. |
| System Base | a fixed area in main memory which acts as a root for all information structures. |
| Task | the smallest unit of user-defined work consisting only of a single stream of non-concurrent instructions |
| T Register | a software visible hardware register which contains the segmented address of the top of the procedure stack. |
| Unit Record Controller | the elements of the peripheral subsystem related to unit record devices such as card equipment, paper tape equipment, and line printers. |
| User Process Group | the internal representation of any job step, as opposed to a system process group which exists independently of any job. |
| Vacant Indicator | a hardware structure that indicates that the process which had control of the CP has suspended |

-continued

| | |
|---|---|
| | itself i.e. no CJP in the CPU. Located in Auxiliary Register, of the ALU. |
| Virtual Memory | an addressing concept that allows a programmer to code without regard to physical memory size; virtual memory manager automatically manages the exchange of segments between main memory and secondary storage. |
| V-Operation | a machine instruction intended for interprocess signaling the completion of an event. A V-OP operates on a designated semaphor |

ABBREVIATIONS

| | |
|---|---|
| ACU | address control unit |
| ALU | arithmetic and logic unit |
| AS | address syllable |
| ASW | address space word |
| BAR | boundary address register |
| BCD | binary coded decimal |
| BR | base register |
| CCE | channel command entry |
| CCU | channel control unit |
| CMRN | the callers maximum ring number |
| CCW | channel command word |
| CET | current state entry time |
| CIA | control store interface adapter |
| CJP | currently executing process |
| CPU | central process unit |
| CU | compilation unit |
| CSU | control store unit |
| D | displacement |
| DMU | data management unit |
| DA | device adapter |
| EAR | effective address ring |
| EXW | exception word |
| GR | general register |
| GTW | G-table word |
| IC | instruction counter |
| IFU | instruction fetch unit |
| I/O | input/output |
| IOC | input/output controller |
| IPQW | internal process queue word |
| IR | index register |
| ITBB | indirect to base register |
| ITS | indirect to segment |
| J | job |
| JCL | job control language |
| JTW | J-table word |
| LCT | logical channel table |
| LIFO | last-in-first-out |
| LSU | local store memory or scratch pad memory |
| MBZ | must be zero |
| MOS | metal oxide semiconductor |
| MAXR | the maximum ring number at which a procedure may execute MAXR is found in the segment descriptor of $SEG_{EP}$ |
| MSC | mass storage controller |
| MTC | magnetic tape controller |
| NFS | non-functional status |
| NPRN | new process ring number |
| NJP | new process replacing the currently executing process |
| PCB | process control block |
| PCT | physical channel table |
| PCU | peripheral control unit |
| PL/I | programming language/one |
| PMW | process main word |
| Q/PR/RDY | queue of processes ready |
| RD | read ring |
| RHU | reserved for hardware use |
| RPW | running process word |
| RSU | reserved for software use |
| RTA | ready time accounting |
| RTO | residual time out |
| SBW | stack base word |
| SEG | segment number |
| SKW | stack word |
| $SEG_{EP}$ | the segment which contains the entry point as found in the procedure descriptor |
| $SEG_{PD}$ | the segment which contains the procedure descriptor |
| SR | scientific register |
| SRA | segment relative address |
| STE | segment table entry |
| STN | segment table number |
| STR | status register |
| STW | segment table word |
| STWA | segment table word array |
| T | T-register (stack register) |
| URC | unit record controller |
| WR | write ring |
| WTA | waiting time accounting |

APPENDIX I

The following information is provided as environment for the invention and background information to better understand the invention, although such information is not necessary to practice the invention.

Further Information with Respect to FIG. 1:

1. Emulators (112)

a. Emulators are found in the IBM System/370. See page 265 of a book entitled *Computer Organization and the System/370*, by Harry Katzan, Jr., in 1971 by Van-Nostrand Reinhold Company of New York, New York.

b. Emulators are also described in the following U.S. Patent Nos.
   3,374,466 issued 3/19/68;
   3,543,245 issued 11/24/70;
   3,698,007 issued 10/10/72;
   3,721,961 issued 3/20/73.

2. Computation Unit (111)

a. Computational units are well known in the art and are also known as Arithmetic and Logic Unit (ALU). See the following U.S. Patent Nos.
   3,400,371 issued 9/3/68;
   3,404,378 issued 11/1/68;
   3,238,508 issued 3/1/66;
   3,201,762 issued 8/17/65.

3. Control Unit (130)

a. Typical control units are described in a book entitled *Microprogramming: Principles and Practices*, by Samir S. Husson, published in 1970 by Prentice-Hall Inc., of Englewood Cliffs, New Jersey; see also a book entitled *Computer Organization and Microprogramming*, by Yao-Yaohan Chu published in 1972 by Prentice-Hall Inc., of Englewood Cliffs, N.J. Typical state of the art control units are disclosed in the following U.S. Patent Nos.
   3,400,371 issued 9/3/68;
   3,370,274 issued 2/20/68;
   3,380,025 issued 4/23/68;
   3,268,872 issued 8/23/66;
   3,302,183 issued 1/31/67;
   3,391,394 issued 7/2/68;
   3,302,183 issued 1/31/67;
   3,477,063 issued 11/4/69;
   3,391,394 issued 7/2/68;
   3,646,522 issued 2/29/72.

4. Buffer Store (110)

a. See reference 1, page 2, of this application.

b. See also pages 296-311 of the above referenced book on *Computer Organization and Microprogramming*, by Yao-Yaohan Chu.

c. Typical buffer stores are also disclosed in the following U.S. Patent Nos.
   3,411,142 issued 11/12/68;
   3,609,665 issued 9/28/71;
   3,508,220 issued 4/21/70.

5. Main Memory Synchronizer (109)

a. See reference 4, page 2, of this application.

b. See also U.S. Patent No.
   3,449,723 issued 6/10/69.

6. Associative Memory (132)

a. Associative memories are well known in the prior art, see pages 273-284 of the above referenced book on *Computer Organization and Microprogramming* by Yao-Yaohan Chu; see also the following U.S. Patent Nos.
   3,648,254 issued 3/7/72;
   3,456,243 issued 7/15/69;
   3,253,265 issued 5/24/66;
   3,248,704 issued 4/26/66;
   3,241,123 issued 3/15/66;
   3,170,142 issued 2/16/65.

7. Address Control Unit (ACU) 131 a. See reference 6, page 2, of this application.

8. Input/Output Control Unit (105)

a. Typical I/O control units are disclosed in the following U.S. Patent Nos.
   3,559,187 issued 1/26/61;
   3,593,299 issued 7/13/71;
   3,251,040 issued 5/10/66;
   3,573,741 issued 4/6/71;
   3,444,520 issued 5/13/69;
   3,680,054 issued 7/25/72;
   3,359,543 issued 12/19/67;
   3,651,480 issued 3/21/72;
   3,248,701 issued 4/26/66;
   3,254,330 issued 5/31/66.

9. Peripheral Control Unit (106)

a. See Chapter 10 of the above referenced book on *Computer Organization and Microprogramming*, by Yao-Yaohan Chu.

b. Typical peripheral control units including device adapters are further disclosed in the following U.S. Patent Nos.
   3,742,457 issued 6/26/73;
   3,753,236 issued 7/14/73;
   3,408,632 issued 10/29/68;
   3,614,740 issued 10/19/71.

10. Device Adapters (107)

a. See reference 9, of this page. See also the following U.S. Patent Nos.
   3,573,741 issued 4/6/71;
   3,680,054 issued 7/25/72.

11. Main Memory (102)

a. See references 2-7, inclusive on page 2 of this application.

Background Information Relative to FIG. 13a

In addition to the references already cited in this Appendix, the following are also included:

12. General Registers (1307-1311)

a. Registers are well known in the computer art. Typical ones are disclosed in the following U.S. Patent Nos. Nos
   3,117,307 issued 1/7/64;
   3,108,193 issued 10/22/63;
   3,383,521 issued 5/14/68;
   3,289,010 issued 11/29/66;
   3,258,696 issued 6/28/66.

13. Hardware Control Mask Register (1313)

a. See also U.S. Patent Nos.
   3,351,915 issued 11/7/67;
   3,602,898 issued 8/31/71.

14. Instruction Counter (1312)

a. Instruction counters are well knwon in the computer art. See for example U.S. Patent No.
   3,162,841 issued 12/22/64.

15. Scratch Pad Memory (1315)

a. Typical Scratch Pad Memories are disclosed in the following U.S. Patent Nos.
   3,248,709 issued 4/26/66;
   3,351,909 issued 11/7/67.

16. Instruction Fetch Unit (1319)

a. Instruction fetch units are well known in the computer art. See for example pages 339-347 of the above referenced book on *Mocroprogramming: Principles and Practices*, by Samir S. Husson.

b. Typical instruction fetch units are also disclosed in the following U.S. Patent Nos.
- 3,609,700 issued 9/28/71;
- 3,614,747 issued 10/19/71.

17. Clock Unit and Timing Circuits (1320)

a. The computer art is replete with clock and timing circuits. The following U.S. Patent Nos. disclosed typical clock and timing circuit Nos.
- 3,355,710 issued 11/28/67;
- 3,417,379 issued 12/17/68;
- 3,254,329 issued 5/31/66;
- 2,297,305 issued 3/1/66;
- 2,781,446 issued 2/12/57;
- 3,413,454 issued 11/26/68;
- 3,555,549 issued 11/28/67.

18. Data Management Unit (1321)

a. See the following U.S. Patents for typical data management and control systems Nos.
- 3,618,045 issued 11/2/71;
- 3,665,487 issued 5/23/72;
- 3,639,912 issued 2/1/72;
- 3,495,220 issued 2/10/70;
- 3,599,158 issued 8/10/71.

19. Control Store Unit (1301)

a. Control stores are well known in the computer art. See prior reference books entitled *Microprogramming: Principles and Practices*, by Samir S. Husson and *Computer Organization and Microprogramming*, by Yao-Yaohan Chu.

b. The following U.S. patents also disclose typical control stores:
- 3,380,025 issued 4/23/68;
- 3,469,247 issued 9/23/69;
- 3,160,858 issued 12/8/64.

20. Control Store Interface Adapter (1302)

a. See the following U.S. patents: Nos.
- 3,636,524 issued 1/18/72;
- 3,353,162 issued 11/14/67;
- 3,686,649 issued 2/25/75;
- 3,611,311 issued 11/5/71.

21. Control Store Loader and Control and Load Unit (1303, 1304)

a. Program and microprogrammed loaders are well known in the computer art. See for example pages 284–294 of the above-referenced book on *Computer Organization and Microprogramming*, by Yao-Yaohan Chu.

22. Firmware Computer a. The following U.S. patents further disclose microprogrammed computer processors including microprogrammed control units with which the instant invention may be practiced: Nos.
- 3,400,371 issued 9/3/68;
- 3,656,123 issued 4/11/72.

What is claimed is:

1. In an internally programmed data processing apparatus having a memory comprised of a plurality of segments of addressable space each segment having a segment number associated with one each segment for identifying its associated segment, each of said segments delineated by upper and lower variable bounds, each of said segments being further subdivided into at least one page located at a predetermined displacement address within said segment and having an identifying page number, each of said pages for storing a plurality of files of database records grouped in sets of database records, each set having at least one owner record, each of said pages also including offset address information for locating any one of said database records of a selected one of said sets from a predetermined location in a selected one of said pages; said data processing apparatus also having a system base for locating relative to said system base the absolute location of predetermined ones of said segments, pages, and database records; said data processing apparatus further having an index register for storing a selected database-index address comprised of a database pointer address for forming an address of a predetermined one of said database records, each of said database records having at least one of said database pointers comprised of an area, page and line address, said area address for locating a predetermined file of said database record, said page address for locating a predetermined group of said database records within said file, and said line address for locating the predetermined one of said database records; instruction hardware, responsive to find serial instruction having a first number for locating a first index register storing a first area address, first page address and first line address for locating a first of said database records, said instruction hardware comprising:

a. first means coupled to be responsive to said first area address register and first page address register for indicating whether or not said first page is available in said memory;

b. second means coupled to be responsive to said first means for converting said first area and first page address to a first segment number when said first page is available;

c. third means coupled to be responsive to said second means for converting said first segment number to an absolute address for locating said first page relative to said system base;

d. fourth means coupled to be responsive to said third means for locating within said first page a first indicator for determining the availability of said first of said database records associated with said first indicator; and, e. fifth means coupled to be responsive to said fourth means for loading said first area address, first page address and first line number into said first index register when said first of said database records is available.

2. The apparatus as recited in claim 1 including sixth means coupled to be responsive to said first area address register and first page address register for generating signals indicating an exception when said first page is not available.

3. The apparatus as recited in claim 1 including seventh means responsive to said fourth means for checking a second indicator associated with a second of said database records located in said first page, when said first database record is not available in said first page.

4. The apparatus as recited in claim 1 including eighth means responsive to said fourth means for serially and progressively checking one after the other each indicator in said first page until an indicator is located in said first page whose associated record is available in said first page.

5. The apparatus as recited in claim 4 including ninth means responsive to said fourth and eighth means for serially checking indicators in a second page associated said indicators associated with records in said second page, said checking continuing until an indicator is located in said second page whose associated database record is available in said second page.

6. The apparatus as recited in claim 1 including tenth means responsive to said fifth means for converting said first page and first line number into a first segment number and a first offset address.

7. The apparatus as recited in claim 6 including eleventh means responsive to said sixth means for loading said first segment number and said first offset address into a first base register.

8. The apparatus as recited in claim 7 including twelfth means responsive to said eleventh means for converting said first segment number and first offset address to an absolute address relative to said system base for locating said first database record relative to said system base.

9. In an internally programmed data processing apparatus having a scratch pad memory and a main memory, said main memory comprised of a plurality of segments of addressable space each segment having a segment number associated with one each segment for identifying its associated segment, each of said segments delineated by upper and lower variable bounds, each of said segments being further subdivided into at least one page located at a predetermined displacement address within said segment and having an identifying page number, each of said pages for storing a plurality of files of database records grouped in sets of database records, each set having at least one owner record, each of said pages also including offset address information for locating any one of said database records of a selected one of said sets from a predetermined location in a selected one of said pages; said data processing apparatus also having a system base for locating relative to said system base the absolute location of predetermined ones of said segments, pages, and database records; said data processing apparatus further having an index register for storing a selected database-index address comprised of a database pointer address performing an address of a predetermined one of said database records, each of said database records having at least one of said database pointers comprised of an area, page and line address, said area address for locating a predetermined file of said database record, said page address for locating a predetermined group of said database records within said file, and said line address for locating the predetermined one of said database record; instruction hardware, responsive to a find-serial instruction having a first number for locating a first index register storing a first area address, first page address and first line address for locating a first of said database records, said instruction hardware comprising:

a. first means for generating coded signals indicative of the location of a predetermined one of said at least one page within main memory;

b. second means coupled for being responsive to said first meeans for generating first coded signals indicative of the location of a first predetermined one of said database records within said predetermined one of said at least one page;

c. third means coupled to said second means for storing the first coded signals of said first predetermined one of said database record;

d. fourth means coupled for being responsive to said third means for fetching said first predetermined one of said database record into said scratch pad memory; and, e. fifth means responsive to information in said first predetermined one of said database record fetched into said scratch pad memory for generating second coded signals indicative of an address of a second predetermined one of said database records within said predetermined one of said at least one page.

* * * * *